US011992461B2

(12) United States Patent
Rahmel et al.

(10) Patent No.: US 11,992,461 B2
(45) Date of Patent: May 28, 2024

(54) CONNECTING AND CONTAINER SYSTEM

(71) Applicant: Boehringer Ingelheim Vetmedica GmbH, Ingelheim am Rhein (DE)

(72) Inventors: Marcus Rainer Rahmel, Ingelheim am Rhein (DE); Guido Endert, Cologne (DE); Jonas Ruf, Cologne (DE); Horst Wergen, Cologne (DE)

(73) Assignee: Boehringer Ingelheim Vetmedica GmbH, Ingelheim am Rhein (DE)

( * ) Notice: Subject to any disclaimer, the term of this patent is extended or adjusted under 35 U.S.C. 154(b) by 91 days.

(21) Appl. No.: 17/333,173

(22) Filed: May 28, 2021

(65) Prior Publication Data

US 2021/0290488 A1 Sep. 23, 2021

Related U.S. Application Data

(62) Division of application No. 15/736,955, filed as application No. PCT/EP2016/025061 on Jun. 14, 2016, now Pat. No. 11,026,863.

(30) Foreign Application Priority Data

Jun. 16, 2015 (DE) ..................... 10 2015 007 547.0

(51) Int. Cl.
*A61J 1/20* (2006.01)
*A61J 1/14* (2023.01)
(Continued)

(52) U.S. Cl.
CPC ........... *A61J 1/2051* (2015.05); *A61J 1/1412* (2013.01); *A61J 1/2027* (2015.05); *A61J 1/2048* (2015.05);
(Continued)

(58) Field of Classification Search
CPC .... A61J 1/14; A61J 1/20; A61J 1/2051; A61J 1/1414; A61J 1/2027; A61J 1/2048;
(Continued)

(56) References Cited

U.S. PATENT DOCUMENTS 2,326,414 A * 8/1943 Thompson ............. B65D 25/20 220/4.27
3,744,658 A * 7/1973 Fujio .................... B65D 23/003 215/399
(Continued)

FOREIGN PATENT DOCUMENTS

CL 199700897 ‡ 2/1998
CN 2694803 Y ‡ 4/2005
(Continued)

*Primary Examiner* — Nicolas A Arnett
(74) *Attorney, Agent, or Firm* — David S. Safran; Calderon Safran & Cole, P.C.

(57) ABSTRACT

A connecting system for providing a fluidic connection between containers, the connecting system having at least two connecting arrangements configured to produce the fluidic connection. Each container has an initial state in which the two containers are fluidically separated from one another and a connected state in which the two containers have been fluidically connected together by a relative movement of the containers. A securing device prevents relative movement of the containers in the initial state, and a receptacle is provided in which the securing device can be accommodated for enabling said relative movement. The system is usable in a method for preparing a mixture of substances in which the containers are placed in a connecting orientation with the securing device arranged between the containers in a manner preventing fluidic connection of the containers, and releasing the securing device for enabling fluidic connection the containers by a relative connecting movement.

17 Claims, 33 Drawing Sheets

(51) Int. Cl.
*B65D 21/02* (2006.01)
*B65D 43/02* (2006.01)
*B65D 81/32* (2006.01)
*A61J 1/16* (2023.01)

(52) U.S. Cl.
CPC ........ *A61J 1/2089* (2013.01); *B65D 21/0231* (2013.01); *B65D 43/02* (2013.01); *B65D 81/3211* (2013.01); *A61J 1/16* (2013.01)

(58) Field of Classification Search
CPC ....... A61J 1/2089; A61J 1/16; B65D 21/0231; B65D 43/02; B65D 81/3211; B65D 1/023
See application file for complete search history.

(56) References Cited

U.S. PATENT DOCUMENTS 4,386,720 A * 6/1983 Speedie ............. B65D 47/2025 222/541.6
4,465,183 A * 8/1984 Saito .................. B65D 81/3211 215/DIG. 8
4,514,476 A * 4/1985 Fitzgerald ................ A61B 3/12 429/94
4,576,185 A * 3/1986 Proud .............. A61B 5/150022 604/189
4,823,946 A * 4/1989 Stoeffler ............ B65D 81/3211 215/DIG. 8
4,863,353 A * 9/1989 Manninen ................. F16D 1/06 416/204 R
4,863,454 A * 9/1989 LaBove ................ A61J 1/2089 604/416
4,936,445 A * 6/1990 Grabenkort ........... A61J 1/2089 206/219
4,986,322 A * 1/1991 Chibret .............. B65D 81/3211 141/366
5,000,314 A * 3/1991 Fuller ................ B65D 81/3205 215/DIG. 8
5,170,888 A * 12/1992 Goncalves ......... B65D 81/3211 206/222
5,186,323 A * 2/1993 Pfleger ............... B65D 81/3211 215/DIG. 8
5,209,565 A * 5/1993 Goncalves ......... B65D 81/3211 141/366
5,249,684 A * 10/1993 Sterett ................ B65D 21/0215 220/23.6
5,277,303 A * 1/1994 Goyet ................ B65D 81/3211 215/DIG. 8
5,288,466 A * 2/1994 Burns .............. A61B 5/150343 215/354
5,827,262 A * 10/1998 Neftel ................... A61J 1/2096 604/82
5,879,345 A * 3/1999 Aneas .................. B65D 51/002 215/277
5,941,380 A * 8/1999 Rothman ........... B65D 51/2828 222/129
5,944,175 A * 8/1999 Albisetti ............ B65D 81/3211 215/DIG. 8
6,065,641 A * 5/2000 Laguna Valderrama .................... B65D 81/3211 222/129
6,092,569 A * 7/2000 Simmel ................... G01F 11/24 141/2
6,209,738 B1 * 4/2001 Jansen ................. B65D 51/002 215/258
6,247,586 B1 * 6/2001 Herzog .............. B65D 81/3211 215/DIG. 8
6,367,622 B1 * 4/2002 Hsu .................... B65D 81/3211 206/222
6,450,368 B1 * 9/2002 De LaForcade ......... B65D 1/04 222/145.5
6,481,435 B2 * 11/2002 Hochrainer ............. A61P 11/06 604/416
6,746,438 B1 * 6/2004 Arnissolle ............. A61J 1/2089 604/905
6,986,346 B2 * 1/2006 Hochrainer ............... A61P 5/38 604/86
7,025,200 B2 * 4/2006 Fontana ............... B65D 51/285 206/222
7,040,311 B2 * 5/2006 Hochrainer ............. A61P 37/08 604/86
7,066,323 B1 * 6/2006 Reisman ............ B65D 21/0231 366/130
7,308,915 B2 * 12/2007 Johns ................ B65D 81/3211 141/100
7,377,383 B2 5/2008 Henry
8,151,985 B2 * 4/2012 Owoc ................. B65D 51/002 206/219
8,221,382 B2 * 7/2012 Moy ..................... A61J 1/1475 604/416
8,226,126 B2 * 7/2012 Johns .................... F16L 29/005 285/3
8,763,849 B2 * 7/2014 Benetti .............. A47G 19/2255 220/604
8,870,844 B2 * 10/2014 Perovitch ........... B65D 51/2835 604/411
9,156,589 B2 * 10/2015 Fernandez de Castro .................. B65D 25/08
10,053,277 B2 * 8/2018 Rahmel .................. B65D 43/02
10,196,195 B2 * 2/2019 Guillon .................. B65D 81/32
10,730,682 B2 * 8/2020 Rahmel ................. A61J 1/2089
10,966,904 B2 * 4/2021 Tunesi ................... B65D 71/50
11,026,863 B2 * 6/2021 Rahmel ................. A61J 1/2048
2002/0030064 A1 * 3/2002 Lacout ............... B65D 81/3211 222/478
2002/0066679 A1 * 6/2002 Moscovitz ......... B65D 81/3211 206/221
2004/0228208 A1 * 11/2004 Papania ............. B65D 51/2885 604/82
2005/0115983 A1 * 6/2005 Barr ................... B65D 81/3211 222/94
2006/0049127 A1 * 3/2006 Katz .................. B65D 81/3211 215/DIG. 8
2006/0113201 A1 * 6/2006 Micic ................. B65D 81/3211 206/217
2006/0289316 A1 * 12/2006 Henry ................ B65D 81/3211 206/499
2007/0039975 A1 * 2/2007 Bochtler .............. B65D 71/502 222/61
2007/0088315 A1 * 4/2007 Haindl .................. A61J 1/2089 604/411
2007/0289670 A1 12/2007 Johns et al.
2008/0179334 A1 * 7/2008 Abramson ......... B65D 81/3211 220/4.01
2008/0249499 A1 * 10/2008 Vancaillie ............. A61M 5/162 604/415
2009/0152267 A1 * 6/2009 May ...................... A61J 1/2089 222/145.5
2009/0184116 A1 * 7/2009 Laske ...................... A01K 7/00 220/4.28
2009/0232586 A1 * 9/2009 Diodati ................... F16L 37/32 403/14
2010/0163559 A1 * 7/2010 Towers .................. B65D 51/20 220/254.1
2011/0192846 A1 * 8/2011 Soh ........................ B65D 25/20 220/259.5
2012/0123382 A1 * 5/2012 Kubo .................... A61J 1/2096 604/413
2012/0184938 A1 * 7/2012 Lev ....................... A61J 1/2096 604/414
2012/0296307 A1 * 11/2012 Holt ...................... A61J 1/2051 604/407
2012/0298254 A1 * 11/2012 Brem .................... A61J 1/2096 141/18
2012/0302986 A1 * 11/2012 Brem .................... A61J 1/2096 604/414
2013/0134161 A1 * 5/2013 Fogel ....................... B65D 1/06 220/504

(56) References Cited

U.S. PATENT DOCUMENTS

2013/0289517 A1* 10/2013 Williams .............. F16L 37/098 604/500
2014/0124394 A1* 5/2014 Guillon .................. B65D 81/32 53/452
2014/0131229 A1* 5/2014 Tippit ................ B65D 81/3211 206/219
2015/0114963 A1* 4/2015 Billett .................... A47G 23/03 220/738
2016/0029846 A1* 2/2016 Zickler .............. B65D 81/3205 206/219
2016/0228331 A1* 8/2016 Tremblay .............. A61J 1/2096
2016/0325913 A1* 11/2016 Kim .................... B29C 49/4273
2016/0368694 A1* 12/2016 Rahmel .............. B65D 81/3211
2016/0368695 A1* 12/2016 Rahmel ................. A61J 1/2089

FOREIGN PATENT DOCUMENTS

CN 2694803 Y 4/2005
DE 25 29 341 A1 ‡ 1/1977 ......... B65D 81/3222
DE 25 29 341 A1 1/1977
DE 4436862 C1 ‡ 2/1996 ......... B65D 81/3211
DE 4436862 C1 2/1996
DE 692 06 354 T2 5/1996
DE 692 06 354 T2 ‡ 5/1996 ............ A61J 1/2089
DE 200 13 272 U1 3/2001
DE 200 13 272 U1 ‡ 3/2001 ......... A65D 81/3211
DE 101 43 537 A1 4/2003
DE 101 43 537 A1 ‡ 4/2003 ......... B65D 51/2835
DE 10 2010 025 824 A1 1/2012
DE 10 2010 025 824 A1 ‡ 1/2012 ......... B65D 21/0219
EP 1 447 334 A1 ‡ 8/2004 ........... B65D 51/249
EP 1 447 334 A1 8/2004
EP 2 455 058 A1 5/2012
EP 2 455 058 A1 ‡ 5/2012 ............ A61J 1/2096
FR 2 271 138 A1 ‡ 12/1975 ............. B65D 81/32
FR 2 271 138 A1 12/1975
FR 2 790 948 A1 9/2000
FR 2 790 948 A1 ‡ 9/2000 ............ A61J 1/2089
JP S61-113235 A 5/1986
JP H04329957 A 11/1992
JP H04329957 A ‡ 11/1992
JP H11227774 A 8/1999
JP 2000313484 A 11/2000
JP 2001328676 A 11/2001
JP 2002165864 A 6/2002
JP 2003192041 A 7/2003
JP 2007144231 A 6/2007
JP 2007176581 A 7/2007
JP 2007176581 A ‡ 7/2007
JP 2007-204105 A 8/2007
JP 2007-222243 A 9/2007
JP 2008284347 A 11/2008
JP 2012-140160 A 7/2012
WO 97/10156 A1 3/1997
WO WO-97/10156 A1 ‡ 3/1997 ............ A61J 1/2089
WO 98/02129 A1 1/1998
WO WO-98/02129 A1 ‡ 1/1998 ............ A61J 1/2089
WO 99/37190 A1 7/1999
WO WO-99/37190 A1 ‡ 7/1999 ........... B65D 51/249
WO 99/44901 9/1999
WO 99/61325 A2 12/1999
WO WO-99/61325 A2 ‡ 12/1999 ......... B65D 21/0231
WO 2004/031047 A1 4/2004
WO WO-2004031047 A1 ‡ 4/2004 ......... B65D 81/3222
WO 2006/072065 A2 7/2006
WO WO-2006/072065 A2 ‡ 7/2006 .............. A61P 31/00
WO 2007/027567 A1 3/2007
WO WO-2007027567 A1 ‡ 3/2007 ............ A61J 1/2096
WO 2010/034340 4/2010
WO 2011/050333 A1 4/2011
WO WO-2011/050333 A1 ‡ 4/2011 ............ A61J 1/2096
WO 2011/091542 A1 8/2011
WO WO-2011/091542 A1 ‡ 8/2011 ............ A61J 1/2096
WO 2012/013206 A1 2/2012
WO WO-2012/013206 A1 ‡ 2/2012 ........... B65D 51/249
WO 2013/104550 A1 7/2013
WO WO-2013/104550 A1 ‡ 7/2013 ......... A61K 39/0241
WO 2014/022909 A1 2/2014
WO WO-2014/022909 A1 ‡ 2/2014 ............ A61J 1/2096
WO 2014106304 A1 7/2014
WO 2016/157025 A1 10/2016
WO WO-2016/157025 A1 ‡ 10/2016 ................ A61J 9/00

* cited by examiner
‡ imported from a related application

CONNECTING AND CONTAINER SYSTEM

CROSS-REFERENCE TO RELATED APPLICATIONS

This application is a division of commonly-owned, co-pending U.S. patent application Ser. No. 15/736,955 filed Dec. 15, 2017, which is a 371 of International Patent Application No. PCT/EP2016/025061 filed Jun. 14, 2016, which claims the benefit of priority to German Patent Application No. 10 2015 007 547.0 filed Jun. 16, 2015, the contents of which are incorporated herein by reference in their entirety.

BACKGROUND OF THE INVENTION

Field of the Invention

The present invention relates in principle to the provision of a fluidic connection. In particular, the present invention relates to a container, a connecting system, a container system, a container system and a method for providing a fluidic connection.

In the medical sphere it is regularly necessary to transfer substances from one container into another. For example, mixtures of medicaments or substances are produced in a mixing flask, by transferring first the contents of one container and then of a second container into the mixing flask, then sealing the mixing flask, and producing a mixture by agitation.

In some cases, which are also a focus of the present invention, substances stored in different containers have to be mixed under sterile conditions or while preventing the ingress of foreign substances. The present invention thus also relates in particular to the provision of a sterile fluidic connection or a connection which prevents the ingress of foreign substances such as pathogens.

Description of Related Art

In this field, International Patent Application Publication WO 2013/104550 A1, for example, discloses a kit for the production of a combined vaccine, wherein two flasks each have a septum and the kit comprises a double needle for piercing both septa and thereby providing a continuous fluidic connection between the flasks. However, it has been found that the provision of a fluidic connection by means of a double needle or the like leads to a relatively high flow resistance, which may make a transfer between the flasks a slow process. There is also the possibility that a transfer will take place only partially, with the result that the desired mixing ratio is not achieved.

SUMMARY OF THE INVENTION

The problem on which the present invention is based is therefore to indicate a connecting system, a container system, a method and a use, by which the production of a mixture can be simplified or speeded up and/or to enable it to be used universally with improved hygiene in the on-site preparation of a mixture.

This problem is solved by a container, a container system and a method according to the invention as described herein.

In a first aspect the present invention relates to a container with a connecting arrangement for fluidically connecting the container to another container, wherein in an initial state the connecting arrangement is fluidically sealed in an opening region and can be opened in order to produce the fluidic connection, the opening region being covered by a cap-like cover device and/or another connecting arrangement.

It is also provided that the cover device or the other connecting arrangement is sealingly held on the container, thereby forming a sealed chamber, and that the container comprises a sealing arrangement surrounding the opening region which seals off a volume in direct contact with the opening region from a volume of the chamber separated from the opening region.

Alternatively, or additionally, it is envisaged that the container comprises a sealing arrangement which uninterruptedly seals off a volume encompassing the opening region by means of the cover device or the other connecting arrangement when the cover device or the other connecting arrangement is moved relative to the connecting arrangement.

In another aspect which may also be implemented independently, the present invention relates to a connecting system for providing a fluidic connection between containers, wherein the connecting system comprises at least two connecting arrangements configured to provide the fluidic connection, namely a first connecting arrangement and a second connecting arrangement, which in an initial state are each fluidically sealed and can be opened in an opening region in order to provide the fluidic connection.

Preferably, the connecting arrangements form a sealed chamber and comprise a sealing arrangement, while by means of the sealing arrangement an inner volume in direct contact with the opening regions is sealed off from an outer volume of the chamber which is separated from the opening regions.

Alternatively, or additionally, it is envisaged that the connecting system comprises a sealing arrangement which uninterruptedly seals off a volume in direct contact with the opening regions when the connecting arrangements are moved relative to one another.

As a result of the double sealing with an antechamber (separate or first volume) and a second volume encompassing the opening region and/or the sealing action obtained during movement, it is possible to obtain a more reliable sterile seal or closure of the opening region.

In another aspect which may also be implemented independently, the present invention relates to a connecting system for providing a (continuous) fluidic connection, preferably between containers, the connecting system comprising at least two connecting arrangements configured to provide the fluidic connection, the connecting arrangements each comprising an opening region which is fluidically sealed in an initial state and is, in particular, film-shaped, brittle, fragile and/or unstable, the opening regions each being covered in sterile or sterilizable manner.

Advantageously, the double closure—opening region and covering of the respective connecting arrangement—makes it possible to ensure hygienic transporting, hygienic storage and/or the hygienic production of the fluidic connection, even on site.

In another aspect which may also be implemented independently, the present invention relates to a container system having at least two containers, preferably bottles, and the connecting system according to the above-mentioned aspect, wherein the containers each comprise at least one connecting arrangement of the connecting system for producing a fluidic connection between the containers.

In this way, it is possible to obtain a hygienic fluidic connection of the containers and mixing of the container contents.

In another aspect which may also be implemented independently, the present invention relates to a method of providing a fluidic connection between connecting arrangements and/or containers by means of the connecting arrangements, wherein the connecting arrangements are fluidically connected in an initial state, and wherein a first connecting arrangement is opened by another, second connecting arrangement by fitting the connecting arrangements into one another and/or by axial movement along a common axis.

In this way, it is also possible to achieve a rapid and reliable fluidic connection of the containers and mixing of the container contents.

In another aspect which may also be implemented independently, the present invention relates to a use of a container system wherein a first container comprises a first substance, particularly a first vaccine against a first disease, while a second container comprises a second substance, particularly a second vaccine against a second disease different from the first, for the preparation of a mixture of substances, particularly for the preparation of a combined vaccine for simultaneous immunization against different diseases, wherein the containers are fluidically connected to one another by means of the connecting arrangements, so that the substances are mixed together, particularly to form the combined vaccine.

In this way, substances which are incompatible with one another, particularly vaccines, can be hygienically mixed together, immediately before being used and administered jointly, thereby saving time and reducing stress.

In another aspect which may also be implemented independently, the present invention relates to a container system with two containers which are fluidically separated from one another in an initial state and can be fluidically connected to one another by a relative movement of the containers, while a securing device prevents relative movement in an initial state.

Preferably, it is envisaged that the container system has a preferably pocket-like receptacle for the securing device, in which the securing device can be accommodated as a result of or during the relative movement.

As a result, release and use may take place without the production of separate parts. It has been found that pull-off tabs are occasionally swallowed by animals and may lead to injury. The present invention therefore enables both comfortable and safe operation.

In another aspect which may also be implemented independently, the present invention relates to a method for producing a mixture of substances, preferably a combined vaccine, whereby substances are provided separately from one another in two containers that can be fluidically connected to one another and the containers can be fluidically connected by a movement of the containers relative to one another, preferably an axial relative movement in relation to a central axis or axis of symmetry of the container system.

It is envisaged that a receptacle is provided and a securing device is arranged or formed between the containers to block the relative movement, and in that the securing device is actuated and the securing device is pushed into the receptacle by the actuation and relative movement. This therefore enables both comfortable and safe operation.

The connecting system is preferably suitable and particularly advantageous for providing a fluidic connection between containers, but may Alternatively, or additionally also be used for some other fluidic connection or attachment, for example, of a container to some other apparatus, or may be used quite independently of any containers.

The proposed connecting system preferably comprises at least or precisely two connecting arrangements. The connecting arrangements are preferably formed to be complementary and/or to correspond to one another. This has the advantage that the fluidic connection can only be produced with connecting arrangements that fit one another. The preferably complementary and/or corresponding configuration of the connecting arrangement also has the advantage that the connecting arrangements fit one another in such a way that the fluidic connection can be produced.

The connecting arrangements are preferably fluidically sealed in each case in an initial state. This makes it possible to produce a mixture as required or on the spot, and to use containers which each comprise the respective connecting arrangements, but also to use them separately or independently of one another.

It is provided that the connecting arrangements are configured for mutual opening, the continuous fluidic connection being produced by the mutual opening of the connecting arrangements.

Preferably, the first connecting arrangement is configured for opening another, second connecting arrangement. It is also preferable that the second connecting arrangement should be configured for opening the first connecting arrangement. This enables mutual opening of the connecting arrangements.

According to another aspect of the present invention which may also be implemented independently, the proposed connecting system comprises a plurality of containers, each comprising both one of the connecting arrangements and also a withdrawal/removal opening.

According to another aspect of the present invention which may also be implemented independently, the fluidic connection can be produced by deformation of at least one of the connecting arrangements, preferably by destruction of an opening region of the connecting arrangements by deforming the connecting arrangement outside an opening region.

It is envisaged, in particular, that the connecting arrangements each serve as, comprise or are embodied as means for opening the respective other connecting arrangement. Such means are preferably secured or fixedly connected to or formed in one piece with the respective connecting arrangement. This advantageously makes it possible to produce the fluidic connection without the use of tools (apart from the connecting arrangements themselves) and particularly enables uncomplicated handling. Advantageously, in particular, there is no need for any separate tools that have to be moved or operated separately from the connecting arrangements, and for this reason the proposed connecting system has low complexity, is cheap to manufacture, as well as being reliable and robust.

Preferably, the fluidic connection and/or a mechanical connection of the connecting arrangements or containers is permanent and/or non-releasable, once produced. Advantageously this can effectively prevent even partial mixing and/or the ingress of foreign substances during or after the production of the fluidic connection. Thanks to the preferably permanent and/or non-releasable fluidic connection there is no need for the use of septa or the like, even when sterility is required, to produce the fluidic connection. Therefore, a relatively large opening or an opening with a large cross-section compared with a needle can be obtained, allowing faster transfer and mixing of the substances.

A connection is non-releasable in the sense of the present invention particularly when the connection can only be opened up again by damaging or destroying the structure, not manually and/or only using tools. A non-releasable connection is particularly a connection produced using snap-fit hooks. However, other solutions are also possible here.

Preferably, at least one, preferably both, of the connecting arrangements (each) comprises an opening region to be opened by another of the connecting arrangements. Particularly preferably, the opening region comprises or is formed with or by a film-shaped portion, a frangible point, a weakened area, a tapering of the wall, a film, particularly a sealing film, membrane, membrane-shaped portion and/or other construction of a part or portion of the connecting arrangement provided by constructive or mechanical or physical measures or arrangements, which enables an opening to be made by the action of another connecting arrangement, particularly by destruction, bursting, tearing and/or detachment of the opening region, without otherwise adversely affecting the function and structure of the connecting arrangement. In particular, the (film-shaped) opening region is a mechanically weak or weakened wall portion. An opening region may be breakable, fragile and/or brittle and/or may be, form or comprise a frangible point. The use of the opening region has the advantage that an opening with a relatively large cross-section of passage can be produced simply and quickly. This enables rapid mixing and a homogeneous mixing result, even when the containers are at least substantially filled with liquid and/or solid substances.

The connecting arrangement or arrangements is or are preferably designed for one-time and/or irreversible opening, particularly with or by means of the opening region or regions. An opening formed with or by means of or in the connecting system is thus preferably not reclosable.

An opening is non-reclosable or irreversibly opened in the sense of the present invention particularly when it can only be reclosed using special tools and/or by replacing defective parts or adding new parts. A destroyed sealing film as a preferred form of an opened opening region is preferably deemed to be non-reclosable or irreversibly opened in the sense of the present invention even when the destroyed sealing film could theoretically be replaced and re-instated using corresponding equipment.

The proposed connecting system is hereinafter explained in more detail by reference to two connecting arrangements, the first connecting arrangement and the second connecting arrangement. This does not necessarily imply an opening sequence but serves primarily to differentiate the connecting arrangements. It is thus particularly possible to produce the second connecting arrangement separately and independently from the first connecting arrangement.

The connecting arrangements are preferably different and/or are configured differently for opening the other respective connecting arrangement. Thus, preferably, different mechanisms are used for opening the different connecting arrangements, or the connecting arrangements are designed for this purpose.

The first connecting arrangement preferably comprises a first opening region. The second connecting arrangement preferably also comprises an opening region, hereinafter referred to as the second opening region. This serves to differentiate between them and preferably does not imply either a sequence or the possibility of producing the second opening region without the first.

The second connecting arrangement is preferably configured to open the first connecting arrangement by breaking, severing or destroying the first frangible point. Alternatively, or additionally the first connecting arrangement is configured to open the second connecting arrangement by breaking, severing or destroying the second opening region. The connecting arrangements can thus be opened mutually by one connecting arrangement breaking, severing and/or destroying the opening region of the other connecting arrangement.

In a particularly preferred aspect of the present invention which may also be implemented independently, the second opening region of the second connecting arrangement can be pierced by the first connecting arrangement. It is also preferable if the first opening region of the first connecting arrangement can be pierced by means of the second connecting arrangement.

Alternatively, or additionally, the first opening region of the first connecting arrangement can be opened by deformation of the first connecting arrangement by means of the second connecting arrangement, particularly a tension cracking, tearing, bursting and/or detachment of the first opening region caused by the deformation.

Preferably, the connecting system is configured in a first embodiment to initially open the opening region of the first connecting arrangement with the second connecting arrangement by means of a severing element and then to open the second opening region of the second connecting arrangement by piercing the second opening region with the first connecting arrangement.

Preferably, the connecting system is configured in a second embodiment to initially open the second opening region of the second connecting arrangement by piercing the second opening region with the first connecting arrangement and then to open the opening region of the first connecting arrangement by deforming the first connecting arrangement with the second connecting arrangement.

The embodiments may also be combined with one another, for example, by first opening the opening region of the first connecting arrangement with the second connecting arrangement by means of a severing element, then opening the second opening region of the second connecting arrangement by piercing the second opening region with the first connecting arrangement and subsequently further opening the opening region of the first connecting arrangement with the second connecting arrangement by deforming the first connecting arrangement with the second connecting arrangement.

The connecting arrangement may also mutually pierce one another and/or one of the connecting arrangements may pierce the other connecting arrangement and the other connecting arrangement may open the one connecting arrangement by a deformation process.

The first and/or second connecting arrangement(s) preferably comprise (in each case) a mouth-like portion. The mouth-like portion may be formed in the shape of a neck and/or collar and/or a ring or as a tube section or the like. The mouth-like portion is particularly configured for conveying fluid after opening.

The mouth-like portion is preferably configured for producing, forming or surrounding the fluidic connection. For this purpose the mouth-like portion may (in each case) be closed in an initial state. In particular, the (respective) mouth-like portion is closed off with the opening region, preferably so as to be openable once and/or irreversibly and/or in fluidtight manner. The mouth-like portion may have an open or outer edge on which the opening region is preferably sealingly fixed, arranged or formed.

The mouth-like portion preferably surrounds the (respective) opening region. In particular, a portion of the connecting arrangement comprising the opening region is connected to the mouth-like portion, for example, as a result of a sealing film being sealed onto the open edge of the mouth-like portion. It is possible, but preferably not necessary, for the opening region to be located inside the mouth-like portion. The term “surrounds” in the sense of the present invention preferably means, in connection with the opening region, that the opening region or the portion of the (respective) connecting arrangement forming the opening region is (in an initial state) connected in fluid-tight manner to the mouth-like portion circumferentially or in some other way on all sides.

Preferably, the second connecting arrangement comprises a mouth-like portion which surrounds the opening region thereof, while it is also preferable that the connecting arrangement is configured to pierce this opening region. In this way, the second connecting arrangement can be opened.

Preferably the opening region of the first connecting arrangement is pierced with a mouth-like portion and/or with a separating, perforating or piercing element of the second connecting arrangement. The mouth-like portion or the opening region of the second connecting arrangement may thus be configured as a means or tool for opening the first connecting arrangement.

Alternatively, or additionally the second connecting arrangement is configured for deforming the mouth-like portion of the first connecting arrangement, so that the deformation causes breakage, bursting, tearing and/or detachment of the opening region of the first connecting arrangement, particularly by rotating the connecting arrangements relative to one another. Alternatively, or additionally, the first connecting arrangement is configured for deforming the mouth-like portion of the second connecting arrangement, so that the deformation causes breakage of the opening region of the second connecting arrangement, particularly by rotation of the connecting arrangements relative to one another.

In the concept described, basically it is functionally possible to replace the first connecting arrangement with the second connecting arrangement.

Preferably, the mouth-like portion of one of the first and second connecting arrangements is configured to be in alignment in the mouth-like portion of the other one of the first and second connecting arrangements, preferably so that the opening region of the other one of the first and second connecting arrangements can be pierced and/or the other one of the first and second connecting arrangements can be opened.

In particular, the connecting arrangements are thus structures each having a mouth-like portion, which is also closed off in each case with a closure comprising an opening region, particularly a sealing film. In addition, the mouth-like portions are formed to be different and complementary, such that the mouth-like portion of one of the connecting arrangements is able to break the opening region of the other connecting arrangement. In this way, at least one of the connecting arrangements is opened.

The connecting system is preferably constructed such that, in order to produce the continuous fluidic connection, all that is required is to open the two connecting arrangements or to break through the two frangible points of the connecting arrangements. It is thus preferable if the continuous fluidic connection is provided for the first time by opening both connecting arrangements and if opening only one of the connecting arrangements or opening neither one nor the other connecting arrangement results in a fluidic blockade or fluidic shut-off.

A continuous fluidic connection in the sense of the present invention means, in particular, that a passage is formed through which a fluid can flow. Preferably, this passage is formed by the mutual opening of the connecting arrangements.

Particularly preferably, both connecting arrangements comprise mouth-like portions, which are non-round in cross-section and can be arranged one inside the other and are configured so that rotation of the mouth-like portions against one another leads to deformation of at least one of the mouth-like portions, so as to break an opening region surrounded by the deformed mouth-like portions or adjoining the deformed mouth-like portions, particularly at least one internal opening region or the one belonging to the internal mouth-like portion.

In particular, neck-like mouth-like portions may be configured such that, by pushing them inside one another and rotating them against one another, preferably about an, in particular, common central axis, an outer side of an inwardly arranged mouth-like portion comes into contact with the inner side of an outwardly arranged mouth-like portion, so that a force thus generated re-shapes or deforms one or both of the mouth-like portions. In particular, the mouth-like portions may each be oval in cross-section and/or may be pushed inside one another in a similar orientation, at least to begin with, in order to bring about (mutual) deformation or re-shaping as rotation takes place. In this way, a longitudinal dimension may be compressed and/or a transverse dimension may be extended, thus causing a tensile fracture, burst, tear and/or detachment of the opening means, preferably at least of the inner connecting arrangement, resulting in the opening.

Particularly preferably, the opening region is configured to be bent, pulled and/or stretched by the deformation. In particular, the opening region is formed as a film or sealing film which is configured to tear, when the mouth-like portion on which it is arranged or provided is deformed, thereby opening the connecting arrangement.

According to a further aspect of the present invention, by bringing the first connecting arrangement and the second connecting arrangement towards each other, first of all only one of the first and second opening regions is broken, particularly by piercing, and the continuous fluidic connection is only produced as the connecting arrangements are brought closer together, by fracture of the other one of the first and second opening regions.

There are preferably at least two different possible ways of breaking through the opening regions or frangible points of the different connecting arrangements and thereby carrying out mutual opening of the connecting arrangements.

In a first variant, first of all a connecting arrangement is pushed into the other connecting arrangement with its mouth-like portion, thereby breaking through the opening region of the other connecting arrangement and then deformation of the pushed-in connecting arrangement is carried out by rotating the connecting arrangements against one another, leading to fracture of their opening regions and as a result producing the continuous fluidic connection.

In a second variant, a connecting arrangement comprises a severing element with which the opening region of the other connecting arrangement is first of all broken and thus the opening is carried out. Only after this is the mouth-like portion of the other connecting arrangement, the opening region of which has already been opened by the severing element, pushed into the mouth-like portion of one connecting arrangement, thereby causing fracture of the opening region of the one connecting arrangement. Also, the continuous fluidic connection is formed as a result, by the mutual opening.

What is common to both these variants is that a mouth-like portion of a connecting arrangement (hereinafter always referred to as the first connecting arrangement) is used to break through an opening region or to open an opening region of another connecting arrangement (hereinafter always referred to as the second connecting arrangement), preferably by pushing into the mouth-like portion of this other connecting arrangement.

According to another aspect of the present invention which may thus be implemented independently, the connecting arrangements can be connected to one another, preferably non-releasably and/or by latching. Preferably the non-releasable connection of the connecting arrangement is made even before the opening of at least one of the first and second connecting arrangements. In particular, the connecting arrangements are configured so that a non-releasable connection first of all has to be made between the connecting arrangements before the continuous fluidic connection can be produced.

Preferably, the connecting arrangements have different connecting positions, particularly latching positions or locking stages, with one another. The connecting arrangements are preferably configured to open none or only one of the first and second connecting arrangements on reaching a first connecting position and to provide the continuous fluidic connection and/or the opening of the two connecting arrangements on reaching another, second connecting position.

Thus, there may be at least two connecting positions which are assumed one after the other when the connecting arrangements are pushed or fitted one inside the other. At a connecting position which is reached first in time and/or distance, a non-releasable connection is produced between the connecting arrangement and the continuous fluidic connection is only produced at the second connecting position. This advantageously prevents the connecting arrangements from being separated from one another again after one or both of the connecting arrangements have been opened. In this way, leaks and/or contamination can be prevented.

The connecting system is preferably self-sealing as a result of the formation of the fluidic connection.

Preferably, the formation of the fluidic connection with the proposed connecting system thus particularly provides a fluidic passage which is sealed off from the environment.

To form the seal, preferably at least one opening region acts as a seal as a result of or after the formation of the fluidic connection. In particular, it may be provided that the second connecting arrangement comprises an opening region which acts as a seal, sealing lip or the like at least at the edges when it has been pierced with the mouth-like portion of the first connecting arrangement. Alternatively, or additionally, however, another seal, particularly a sealing ring or a sealing lip, may be provided.

In another aspect which may thus be implemented independently, the present invention relates to a container system having containers, particularly bottles, each with a removal opening, particularly a septum, which are additionally configured to provide a fluidic connection independently of the removal openings. For this purpose, a connecting arrangement is provided, in particular, preferably on the sides remote from the removal opening. For the fluidic connection of a container, in addition to a removal opening or removal device such as a septum, a rotary closure or some other, preferably resealable, closure, it has proved particularly advantageous to provide the connecting arrangement at another position, particularly, in the case of a bottle, on the opposite end from the neck of the bottle. This makes it possible to produce the continuous fluidic connection with the proposed connecting system, without affecting the function of the removal opening. The containers in this case advantageously remain suitable for use individually and separately from one another.

In another aspect which may thus be implemented independently, the present invention relates to a container system with the proposed connecting system, in which a first container comprises the first connecting arrangement and a second container comprises the second connecting arrangement of the proposed connecting system. It is particularly preferable that at least one of the containers comprises a removal opening and, at an end remote from or opposite to the removal opening, the connecting arrangement of the proposed connecting system. In this way, the containers can be fluidically connected by means of the proposed connecting system, particularly for mixing the substances, while a, for example, standardized, removal opening is neither blocked nor otherwise affected.

The first and the second container preferably each comprise a removal opening and, at an end remote from or opposite to the removal opening, particularly on the respective base of the bottle, one of the proposed connecting arrangements. As a result, the containers can be fluidically connected to one another at the end remote from the removal opening by means of the proposed connecting system.

By the formation of the fluidic connection, a new combined container is preferably obtained with a combined capacity amounting to the capacities of both containers and/or with a total of two removal openings. This has the advantage that the containers can theoretically also be used separately from one another with the respective removal openings, but the contents of the containers may also be combined and mixed together by forming a continuous fluidic connection between the containers with the proposed connecting system.

The container system may also comprise at least one container which comprises the first connecting arrangement at a first end and the other, second connecting arrangement at a second, other, particularly opposite end. The two connecting arrangements are each configured to form a fluidic connection. The container may have, form and/or enclose a volume in which preferably a substance is or can be arranged. This advantageously makes it possible to join more than two containers together fluidically or to mix more than two different substances. For this purpose, the container comprises the two connecting arrangements, so that another container can be fluidically connected at both ends by means of the proposed connecting system. This container preferably forms an adapter between other containers of the container system, but may also be used with only one further container in order to provide a fluidic connection between them and/or may also be produced separately and/or form an independent aspect of the invention.

In another aspect which may thus be implemented independently, the present invention relates to the use of the proposed container system, wherein a first container comprises a first substance, particularly a first vaccine against a first disease, wherein a second container comprises a second substance, particularly a second vaccine against a second disease different from the first, wherein the containers in each case comprise a removal opening and in each case comprise, in addition to the respective removal opening, a connecting arrangement for providing a fluidic connection between the containers, for the preparation of a mixture of substances, particularly for the preparation of a combined vaccine for simultaneous immunization against different diseases, wherein the containers are fluidically connected to one another by means of the connecting arrangements, so that the substances are mixed together, and particularly form the combined vaccine.

The proposed container system is particularly preferably used for the combined administration of medicaments. In particular, it is possible to store vaccines which are not stable in the long term with one another in separate containers and to connect these containers fluidically by means of the proposed connecting system before use, thus enabling a rapid and efficient formation of a mixture, without affecting removal openings such as septa. Alternatively, the respective vaccines may also be used separately from one another through the removal openings, if no fluidic connection has been formed by means of the connecting system.

Containers or bottles and/or connecting arrangements in the sense of the present invention are preferably at least substantially dimensionally stable, rigid or semi-rigid and/or at least substantially formed from plastics material, or plastics material comprising, in particular, polyethylene, HD-PE, LD-PE or polypropylene.

A "bottle" in the sense of the present invention is preferably a closable container for transporting and storing fluids, particularly liquids, gases and pourable solids such as powders. A bottle in the sense of the present invention preferably has a diameter which is smaller than its height. A bottle in the sense of the present invention preferably has an at least substantially conically tapering end, also referred to as the neck of the bottle. The neck of the bottle preferably ends in an opening which is, in particular, round, closable and openable for the removal of its contents, also referred to as the removal opening. Bottles in the sense of the present invention are preferably narrow-necked bottles and/or vials. In narrow-necked bottles the diameter or the internal width of the removal opening is less than the average internal diameter of the storage space formed by the bottle, preferably less than 70%, particularly less than 50%. However, other solutions are also possible here.

A "connecting arrangement" in the sense of the present invention is preferably a device which is configured to provide the fluidic connection and, preferably, to provide a mechanical connection while forming the fluidic connection. In particular, it is a fluid coupling, a flange, a coupling member, an attachment member, a plug connection, a male and/or female connector, particularly a plug connector, or a part thereof.

A "connecting arrangement" in the sense of the present invention may be a portion/region of a container, particularly a bottle, or the connecting arrangement is (in each case) connected to a container, particularly by material, frictional and/or interlocking connection. Particularly preferably the connecting arrangement is at least partially formed by or in one piece with the container or the bottle. Alternatively, or additionally the connecting arrangement adjoins a container or a bottle or is otherwise suitable for fluidically attaching or connecting the interior of the container or the bottle.

A connecting arrangement is preferably "fluidically sealed", in the sense of the present invention, when the escape or passage of fluid, particularly liquid, is prevented or when a fluid or liquid barrier prevents the escape or passage of fluid, particularly liquid.

Connecting arrangements are "insertable in one another" in the sense of the present invention particularly when a part or portion of one of the connecting arrangements can be arranged inside the other connecting arrangement or a part or portion thereof. In particular, at least a portion of one of the connecting arrangements can be pushed, laid, inserted or otherwise introduced into the other or corresponding connecting arrangement. Connecting arrangements are inserted in one another particularly when they overlap radially at least partially, substantially or completely in relation to a (common) axis of symmetry and/or central axis, or an inner portion of the one connecting arrangement is (completely) surrounded or embraced (radially) by an outer portion of the other connecting arrangement.

An "axial movement" along a common axis in the sense of the present invention is preferably a movement which is non-helical, non-rotational, at least substantially or solely linear and/or solely axial and/or a movement which does not require a complete rotation or revolution. The connecting arrangements are preferably adapted to be fitted into one another, inserted in one another and/or fitted together in an at least substantially linear manner to produce the non-releasable and/or fluidic connection.

"Opening" in the sense of the present invention particularly denotes providing access to the interior of a container or a bottle or the volume contained by a container or bottle, by forming an opening, an orifice, a passage, a hole or the like, particularly so that a fluid, particularly a liquid, can enter and/or leave.

An "opening region" in the sense of the present invention is in particular a region which is configured for opening, i.e., is constructed so as to form an opening, an orifice, a passage, a hole or the like or fluidic access for the interior or for the volume contained by a container. The opening region is preferably fluidically closed and fluidically openable. It may be a closed off hole, a closed and openable wall orifice, a closed and openable passage, a closed and openable closure or the like.

A "film-shaped opening region" is preferably a portion which is particularly of thin-walled or flat construction to form an opening. A film-shaped opening region is preferably an opening/region which is sealed or closed off by a film-shaped, membrane-shaped, flat, thin, breakable and/or fragile structure.

"Pierceable" in the sense of the present invention is, in particular, a structure which can be broken through or perforated by means of an object, particularly a point, so that a connection can be made from one (flat) side to the opposite side. The piercing preferably produces an opening. In particular, a pierceable opening region is destroyed on piercing and permanently opened thereby.

"Sealing" in the sense of the present invention indicates in particular that the escape and/or ingress of substances is prevented by a barrier.

"Self-sealing" in the sense of the present invention denotes in particular that a sealing action is produced without separate aids, with intrinsic means and/or automatically, fully automatically, coincidentally or without the need for any separate steps.

"Sterile self-sealing" in the sense of the present invention denotes, in particular, self-sealing, thereby forming a barrier against the ingress of pathogens such as bacteria or viruses, so as to at least substantially prevent the ingress and/or escape of bacteria. In particular, the seal, the sealing clearance and/or contact pressure are designed so that any leaks that may potentially remain have a maximum cross section which blocks the passage of pathogens such as bacteria or viruses.

"Fluid-tight" in the sense of the present invention is in particular a seal which at least substantially prevents the entrance or exit of fluids, particularly liquids.

"Gas-tight" in the sense of the present invention is, in particular, a seal which at least substantially prevents the entrance or exit of gases.

A "material construction" in the sense of the present invention denotes in particular a composition and/or a structure and/or a morphology and/or an arrangement of different structures, different materials or the like.

A "laminar construction", also a sandwich construction, multi-layered construction, particularly a composite construction, a composite material and/or a laminated compound material in the sense of the present invention denotes in particular a structure comprising different layers which are preferably joined together and/or adjoining one another, can be logically sub-divided or delimited from one another, are arranged with their flat sides facing one another or arranged against one another, comprising flat elements or portions which can be differentiated by their physical or chemical properties.

"At the edges" in the sense of the present invention or an "edge portion" in the sense of the present invention is in particular a region spaced from a center, middle or center of gravity, or a region which has an edge, a margin, an end or a boundary, adjoins the latter or faces the latter. In particular, it is a portion of a preferably flat structure at its circumferential edge, in particular of an encircling or annular shape or the like.

A "central portion" in the sense of the present invention is, in particular, a portion at a spacing from an end, edge and/or margin, and/or comprises, encompasses or extends around a center, a middle point or center of gravity.

"Destroying the opening region" in the sense of the present invention denotes in particular the irreversible changing of the opening region, thereby impacting its previous function as a seal, wall, sealing member and/or closure or so that the previous function is no longer performed, particularly as a result of machining, shaping, deformation, tearing, separation or by some other method. The opening region may be opened and/or the fluidic connection may be produced thereby.

"Cutting through the opening region" in the sense of the present invention denotes in particular separating the material of the opening region from one side to another, particularly an opposite side, and/or dividing them and/or severing them by cutting, shearing, piercing or some other method.

"Remaining intact" in the sense of the present invention denotes in particular the maintenance of a previously existing function. An intact opening region has and retains, in particular, the function or functions of closing off, sealing and/or forming a barrier against the ingress and/or escape of pathogens, fluids, liquids, gases or the like.

A fluid for the purposes of the present invention is preferably a flowable substance. A fluid is particularly flowable such that it is able to pass through a fluidic connection. In particular, a fluid for the purposes of the present invention is a liquid, a suspension, a flowable solid, such as a powdered or granulated material, and/or a gas in liquid or gaseous form. Particularly preferably, at least one of the substances is liquid, particularly both or at least two substances.

A "fluidic connection" in the sense of the present invention is preferably an arrangement configured for the passage of a fluid, particularly a liquid, a gas or a flowable solid. In particular it is a transit region, a passage or channel.

A "fluidic passage" in the sense of the present invention is in particular a means which is configured for the passage of a fluid, particularly a liquid, a gas or a flowable solid. In particular, it is a transit region, a connection or a channel which is preferably (tightly) sealed off from the environment or a side remote from the passage on a wall that forms the passage.

Preferably, an opening region in the sense of the present invention is "brittle" if, particularly on account of its composition and/or construction, it is suitable for and designed to tear close to its elastic limit without or with very little plastic deformation (brittle facture). In particular, the opening region has an elastic limit of less than 200 $N/mm^2$ and/or a tensile strength of less than 100 $N/mm^2$, preferably less than 60 $N/mm^2$ and/or a quotient of elastic limit and tensile strength of less than 1, preferably less than 0.7 or 0.5. This can be achieved in particular by structuring and/or combining, joining or laminating different materials. The opening region may be formed by a laminate of several films, of which preferably one film contains aluminium or consists of aluminium or is metallic. Particularly preferably, the opening region is at least partly metallic. Preferably, the opening region is formed with or from a composite material which preferably has a preferably flat or film-shaped layer of aluminium.

An "unstable opening region" in the sense of the present invention is preferably a region which is mechanically less stable than the parts surrounding it and/or which can be destroyed manually or by the application of force, particularly in the manner of a frangible point.

"Outside the opening region" in the sense of the present invention means that this is a region or portion which is separate from the opening region but is preferably directly or indirectly adjacent to the opening region, particularly such that deformation in this region causes stretching of the opening region.

"Deformable" in the sense of the present invention is preferably elastic or plastic deformability. The connecting arrangement(s) or mouth-like portions are preferably elastically deformable, thus causing plastic/irreversible deformation of the opening region. The connecting arrangement(s) or mouth-like portions may, however, also be plastically deformed/deformable.

Parts or portions are said to "corresponding to one another" in the sense of the present invention particularly when they are of similar and/or complementary construction to one another, when they fit into one another, resemble one another, are arranged similarly, have similarly oriented structures of similar shape and/or are configured to interact with one another in order to produce a function or effect.

"Rotating relative to one another" in the sense of the present invention denotes in particular a rotary movement of a part, preferably a connecting arrangement or a container or a bottle with a connecting arrangement, relative to another part, preferably another connecting arrangement or another container or another bottle.

"Rotating against one another" in the sense of the present invention denotes in particular a rotary movement of two parts, preferably a connecting arrangement or a container or a bottle with a connecting arrangement, relative to another part, preferably another connecting arrangement or another container or another bottle, preferably in different or opposite directions of rotation.

A "mouth-like portion" in the sense of the present invention is in particular a portion or part which comprises or forms an opening, an opening edge, a mouth or a neck, preferably with an opening at its end, or some other tubular portion or a passage with a radially surrounding wall which terminates in an opening, which is preferably open at its end and/or forms an opening at at least one end.

In the sense of the present invention the term "thin walled" denotes in particular a structure which is flat or planar in cross section with a wall thickness on average less than 2 mm, 1.5 mm, 1 mm and/or less than 0.5 mm or 0.3 mm, particularly preferably less than 200 μm, particularly less than 150 μm.

A "closure device" in the sense of the present invention is preferably a part of, or at least substantially forms, an opening region. The closure device here is, in particular, a flat or planar arrangement or closure plate. Thus, a closure device has, in particular, a material thickness that exceeds its longitudinal extent, preferably by a factor of at least 2, 3, 4 or 5.

The closure device is preferably formed in one piece, particularly in one piece with the frangible point, particularly the thin point. The closure device together with the frangible point may form an opening region or a part thereof. Preferably, the frangible point forms the film-shaped, brittle and/or unstable part of the opening region or renders the opening region film-shaped, brittle and/or unstable. For this reason, the frangible point is preferably sufficiently fragile to form an opening by tearing under mechanical load.

The connecting arrangement is preferably formed from plastics, particularly a thermoplastic material, particularly by injection molding. The opening region is preferably predominantly formed by the closure device, particularly over more than 70%, 80%, 90% or 95% of its area. Thus, compared with the surface area of the closure device, the frangible point takes up an area of less than 10%, particularly less than 5%.

The closure device may be S-shaped in cross-section longitudinally of the main dimension. The closure device may have ribs or other reinforcing elements to stiffen it. The closure device is preferably sufficiently stable or rigid that it cannot be deformed, or can only be deformed to an insignificant degree, by the frangible point. The result of this is that a force acting on the frangible point does not deform the closure device or deforms it only insignificantly, particularly by compression, thus ensuring that the frangible point breaks or tears more easily.

A "frangible point", particularly a thin point, in the sense of the present invention is preferably a film-shaped, brittle and/or instable or fragile area or opening region or a film-shaped, brittle and/or unstable or fragile part of the opening region.

The frangible point is preferably embodied and designed to be broken or torn by mechanical stress in order to form an opening. In particular, the frangible point interacts with the closure device, while the frangible point can be tensioned relative to the closure device in such a way that the resulting tensions, shear forces and the like lead to breakage of the frangible point. The frangible point thus is or forms, in particular, a weakened point or a portion with a mechanically weakened structure compared with surrounding or adjacent areas.

The frangible point is preferably provided completely or partly circumferentially at or within the mouth-like portion or holding portion. The frangible point may be in the shape of a bead or web. In particular, the frangible point forms a connecting strip to the closure device, particularly from the holding portion or mouth-like portion.

A "chamber" in the sense of the present invention is preferably a structure or volume which is tightly sealed or sealable in all directions. The chamber may, however, be openable in principle, for example, by a connecting arrangement or by opening a sealing arrangement or the like.

A "volume" or "volume formed" in the sense of the present invention preferably denotes a region or a (partial) chamber which is at least substantially or entirely surrounded. The term "volume" may thus be replaced by the term chamber or partial chamber, if required. Moreover, a distinction is made between an inner volume and an outer volume; preferably, this is functionally intended to convey that the inner volume can be reached by passing through the outer volume. Preferably, the outer volume surrounds the inner volume. However, this is not absolutely essential, as in other embodiments the outer volume may form an antechamber to the inner volume. Preferably, the outer volume forms an outwardly sealed antechamber, while the inner volume is adjacent to the outer volume and is sealed off from it, so that the outer volume shields the inner volume from the environment.

A "container blank" in the sense of the present invention is preferably a tubular structure with at least two openings, one opening being or forming a removal opening for later opening and/or closing or filling and/or removal. Another opening is of a temporary nature and is sealed off during the manufacturing process of the container, particularly preferably by the leaktight use or incorporation of a connecting arrangement. The connecting arrangement as such can then form part of the container and enable later opening of the container in the region.

A container blank in the sense of the present invention comprises the opening for the insertion or fitting of a connecting arrangement, preferably on a side which is opposite or remote from the removal opening. However, other solutions are also possible. In addition, a container blank may also comprise only one opening for insertion or fitting of the connecting arrangement. In this case, the container obtained after assembly has only one opening in the form of the opening region of the connecting arrangement. The container blank preferably comprises a bottle-like site which has an at least substantially conically tapering portion or shoulder region which transitions into a bottle neck. The bottle neck then preferably forms, or comprises, the removal opening.

A "sealing portion" in the sense of the present invention is preferably a region which is configured and/or arranged for sealing abutment. In particular, it is a sealing lip, a sealing strip or the like. A sealing portion may comprise a sealing surface which is formed by a surface region of the sealing portion and provides the direct sealing effect. In particular, a sealing effect is achieved by means of sealing surfaces bearing directly on one another. For this purpose, the sealing surfaces preferably bear on one another under tension or pressure, for example, in the form of a press fit or the like. The sealing surfaces are preferably formed by the material of the sealing portion or the surface of the sealing portion. However, there are also other possibilities, for example, using seals in the region of the sealing portion.

A "support portion" in the sense of the present invention preferably interacts with an opening region or a frangible point such that opening of the opening region or breaking or tearing of the frangible point, by mixed-mechanical support, support from below, particularly acting as a bearing or counter-bearing, is avoided. In particular, this is thus a device which diverts or keeps mechanical stress away from fragile, unstable areas, so as to impede or prevent accidental opening. The support portion is particularly configured to relieve stress from the frangible point.

A "securing device" in the sense of the present invention is preferably a means for preventing movements, particularly relative movements of connecting arrangements and/or containers, or other actuations which would or could lead to the opening of an opening region. In particular, it is a securing ring or the like, for blocking a, preferably axial, movement of connecting arrangements to one another and to enable such movement during actuation or removal. The securing device preferably comprises a blocking part which, as a working part or working portion of the securing device, is directly responsible for a blockade, particularly of a movement, being implemented or removed.

A "guide device" in the sense of the present invention is preferably a mechanism or a part thereof which guides a relative movement of connecting arrangements to one another, particularly bayonet-like. This preferably enables a bayonet connection to be obtained. A bayonet connection, also known as a bayonet closure, preferably is a mechanical connection of two at least substantially cylindrical and/or rotationally symmetrical parts, particularly rotationally symmetrical with respect to a central axis or axis of symmetry.

The connection is produced by means of the guide devices by a pushing in and turning movement. Parts are inserted axially in one another and after being pushed in axially until they reach a stop they are rotated relative to one another, thus producing an interlockingly engaging blockade in the axial direction. This preferably produces the fluidic connection.

A first guide device for this purpose is preferably a slot, a groove or other guide device with an at least substantially right-angled configuration, beginning with a part that extends axially or parallel to the central axis or axis of symmetry, and an adjoining part which extends at least substantially at right-angles to the previous direction. The portion that follows the axially extending portion thus extends preferably at least substantially in a plane perpendicular to the central axis or axis of symmetry. Another or second guide device, and/or guide device corresponding to the first, is preferably a button, peg, strip or other part corresponding to the other guide device, thus corresponding particularly to the groove, slot or the like. Overall, the guide devices thus preferably form a sliding guide.

The containers are preferably produced separately from one another for the provision of the fluidic connection. This enables them to be universally applicable.

The aspects of the present invention mentioned above and described in the following specific description may also be implemented and advantageous individually and in various combinations.

Further details, advantages and properties of the present invention will become apparent from the following description of preferred embodiments with reference to the accompanying drawings.

DETAILED DESCRIPTION OF THE INVENTION

Figure 1:
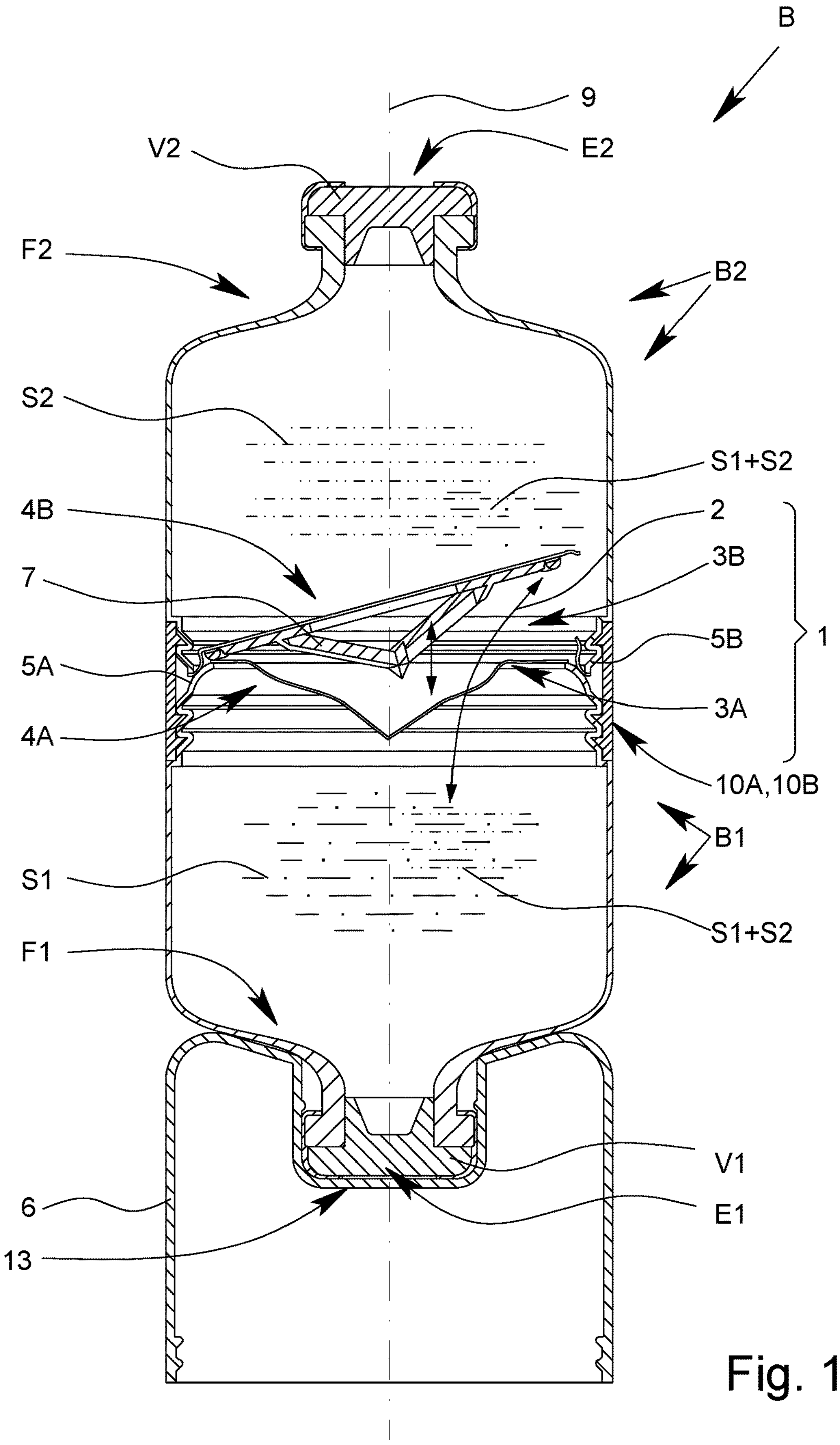
FIG. 1 shows a longitudinal section through a container system with the proposed connecting system and with the fluidic connection made.

In the following description of preferred embodiments by reference to the drawings, the same or corresponding reference numerals (with or without an apostrophe) have been used for the same or similar components or parts, where similar or identical advantages and properties may be achieved even if the associated description has not been repeated.

FIG. 1 shows in schematic section a proposed container system B with a first container B1 and a second container B2.

The container system B preferably comprises a proposed connecting system 1. The connecting system 1 is preferably configured to produce a fluidic connection 2, preferably between the first container B1 and the second container B2 of the container system B.

The connecting system 1 preferably comprises a number of connecting arrangements 3A, 3B, particularly a first connecting arrangement 3A which is associated with a first container B1 of the container system B and/or a second connecting arrangement 3B which is associated with the second container B2 of the container system B. Preferably, the first container B1 comprises the first connecting arrangement 3A and the second container B2 comprises the second connecting arrangement 3B or vice-versa.

The containers B1, B2 are preferably used for storing substances S1, S2, particularly for storing a first fluid and a second fluid and/or different vaccines. In particular, the containers B1, B2 are wholly or partly filled with one or more different substances S1, S2 or vaccines. Alternatively, or additionally the container or containers B1, B2 may also hold and/or store other substances S1, S2, preferably a solid. It is possible for only one substance S1, S2 to be a fluid, particularly a liquid. The fluid substance S1, S2 may be configured to form a solution or a suspension with the other substance S1, S2.

The proposed container system B is preferably used to prepare a medicament, particularly a combined medicament, combined vaccine or the like. However, there are other possible and advantageous applications for the proposed container system B.

Preferably, the first container B1 comprises a removal opening E1 and/or the second container B2 comprises a removal opening E2. Particularly preferably, both or at least two containers B1, B2 of the proposed container system B each comprise a removal opening E1, E2.

A removal opening E1, E2 in the sense of the present invention is preferably configured to dispense or to make it possible to remove the contents of the respective container B1, B2.

At least one and preferably several or all of the removal openings E1, E2 are preferably repeatedly useable, utilizable several times, re-sealable, re-usable and/or comprise a closure element V1, V2 which preferably allows opening and closing for the purpose of stepwise removal. This may be achieved by means of a septum.

Preferably, the removal openings E1, E2 are closed or closable and/or are primary means for removing substance S1, S2 from the containers B1, B2.

In the embodiment shown, preferably at least one of the removal openings E1, E2 and particularly both removal openings E1, E2 are closed off by so-called septa. A septum is a device with a rubber-like closure element V1, V2, particularly a rubber stopper or injection stopper, which is suitable for piercing by means of an injection needle for removal of its contents, the septum automatically closing the (respective) removal opening E1, E2 by elastic resilience after the injection needle has been removed. A septum, also referred to as a piercing membrane, preferably has a thin area, particularly in the center, this thin area being suitable for piercing in order to take up injection liquid using an injection needle. The injection stopper or the septum is preferably secured to the neck of the bottle or the removal opening E1, E2 by means of a flanged cap, preferably made of aluminium.

Preferably, one, both or all the containers B1, B2 are (each) injection ampoules or vials, for example, so-called multi-dose containers, particularly for vaccinating a number of animals with one dose each.

In the containers B1, B2, substances S1, S2 in the form of powdered medicaments, solutions or suspensions or vaccines may be transferred in this form.

The containers B1, B2 may (each) have a capacity of more than 10 ml, preferably more than 50 ml, 100 ml or 200 ml and/or less than 2 litres, preferably less than 1.5 liters or 1 liter, particularly less than 750 ml (each or after connection).

As shown in FIG. 1, the closure element V1, V2 is preferably sealingly connected to the respective removal opening E1, E2, preferably pressed on, particularly by means of a pressing ring or compression ring or a flanged cap. However, other solutions are also possible here, for example, an adhesive bond, welded joint, a connection produced by injection molding or the like.

It is certainly preferable that the containers B1, B2 of the proposed container system B should each have a removal opening E1, E2, but not all the containers B1, B2 of the container system B must have a removal opening E1, E2.

Advantageously, the use of removal openings E1, E2 on a number of containers B1, B2 makes it possible to use the respective substance S1, S2 from the respective container B1, B2 independently of the use of the connecting system 1.

Advantageously, the container system B therefore allows both separate use of the containers B1, B2 and also their use in conjunction with the fluidic connection 2 provided by the connecting system 1.

The containers B1, B2 are preferably fluidically connectable to one another so that the fluidic connection 2 between the volumes formed or held by the containers B1, B2 results in a joint interior being formed by the containers B1, B2 connected by the connecting system 1. The joint interior is particularly characterized in that the continuous fluidic connection 2 has a hydraulic cross section of more than 2 square millimetres, preferably more than 5 or 10 square millimetres, particularly more than 1, 2 or 3 square centimetres, or there is no constriction between the containers B1, B2, once the fluidic connection 2 has been made, which falls below such a hydraulic cross section or wherein the fluidic connection 2 has at least such a hydraulic cross section.

The container or containers B1, B2 is or are preferably configured as bottles. Particularly preferably, the containers B1, B2 (each) comprise a bottle neck F1, F2 which forms the removal openings E1, E2 or is adjacent thereto. A bottle neck F1, F2 may, starting from a terminal edge or mouth of the removal opening E1, E2, encompass an enlargement of the (hydraulic) cross section by more than a factor 1.5, particularly by more than a factor 2 or 2.5. However, the removal openings E1, E2 may also be differently constructed.

The containers B1, B2 preferably comprise the removal opening E1, E2 and the connecting arrangement 3A, 3B at different, opposite, diametrically opposed sides, ends, axial ends and/or in the neck region on the one hand and in the base region on the other hand. In particular, the removal opening E1, E2 is formed by the bottle neck F1, F2 and the connecting arrangement 3A, 3B is provided in the base region or at the opposite end from the bottle neck F1, F2. This has proved advantageous as it ensures that, when the connecting arrangements 3A, 3B are used, the removal opening(s) E1, E2 remain(s) accessible and unaffected in its (their) function.

The connecting arrangements 3A, 3B are preferably not intended for removal but for a one-time or irreversible provision of a durable fluidic connection 2, or are not reclosable.

The present invention is explained by means of the particularly preferred use for connecting to containers B1, B2, particularly bottles. However, it is possible and advantageous to use the proposed connecting system 1 in other areas as well, for example, for fluidically connecting a container B1, B2 to other systems, for example, for the rapid removal of the substance S1, S2.

Figure 2:
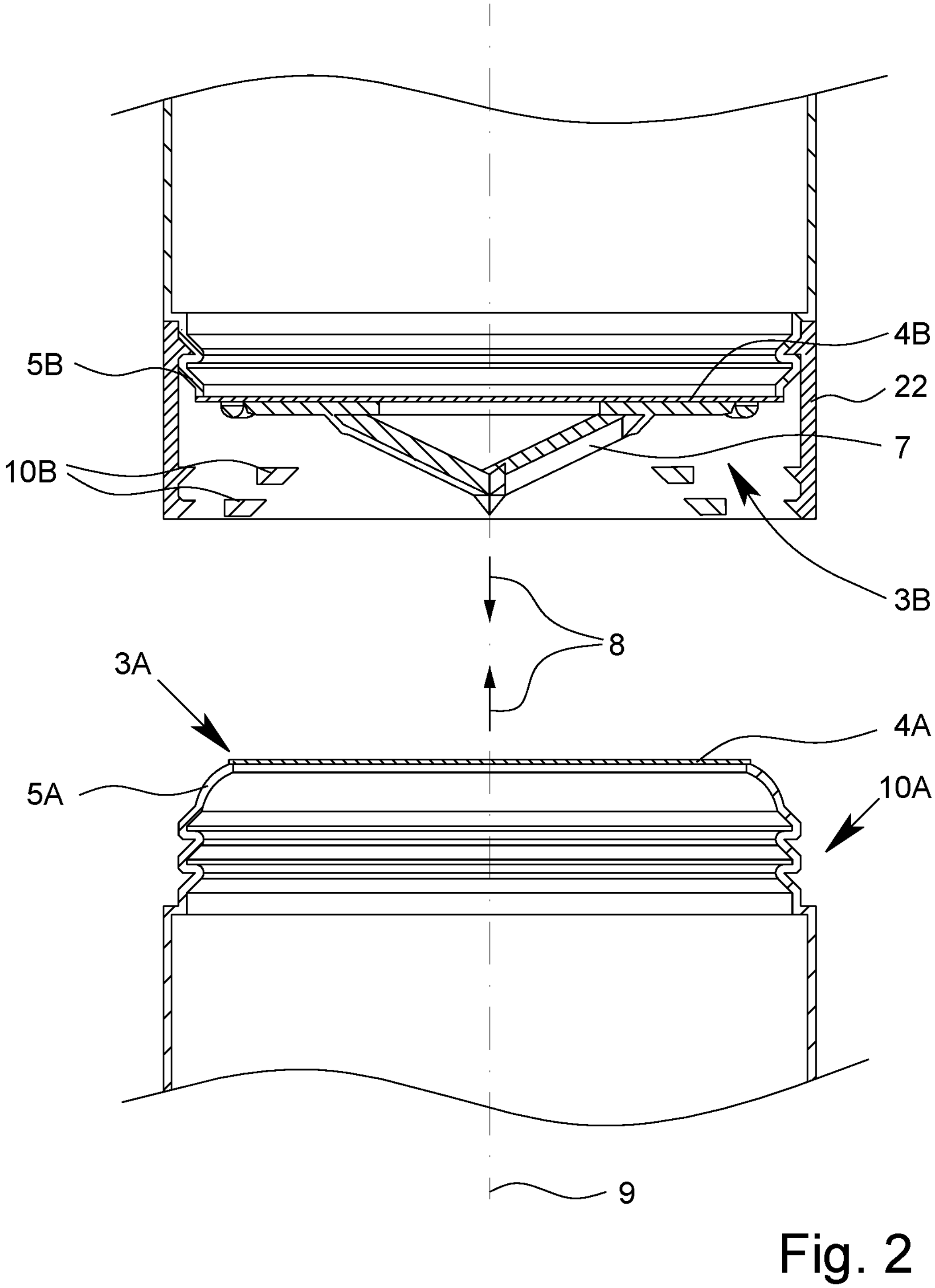
FIG. 2 shows a longitudinal section through the proposed connecting system in a first embodiment in a starting position.

FIG. 2 shows in longitudinal section a proposed connecting system 1 according to the first embodiment in a starting position or in the unconnected state.

Figure 3:
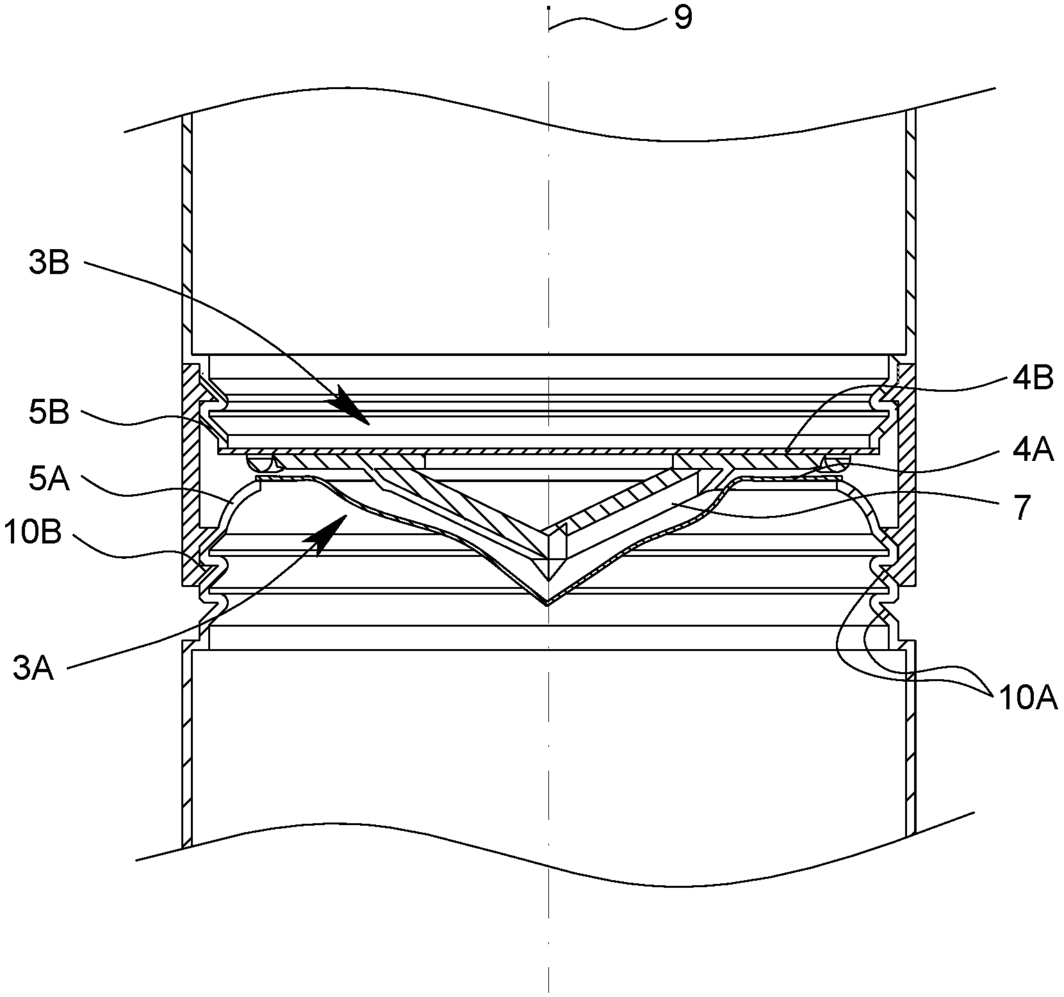
FIG. 3 shows a longitudinal section through the proposed connecting system of the first embodiment in a first connecting position.

FIG. 3 shows in longitudinal section the proposed connecting system 1 according to the first embodiment in a first connecting position in which preferably the fluidic connection has not yet been made but one of the opening regions 4A, 4B has already been opened.

Figure 4:
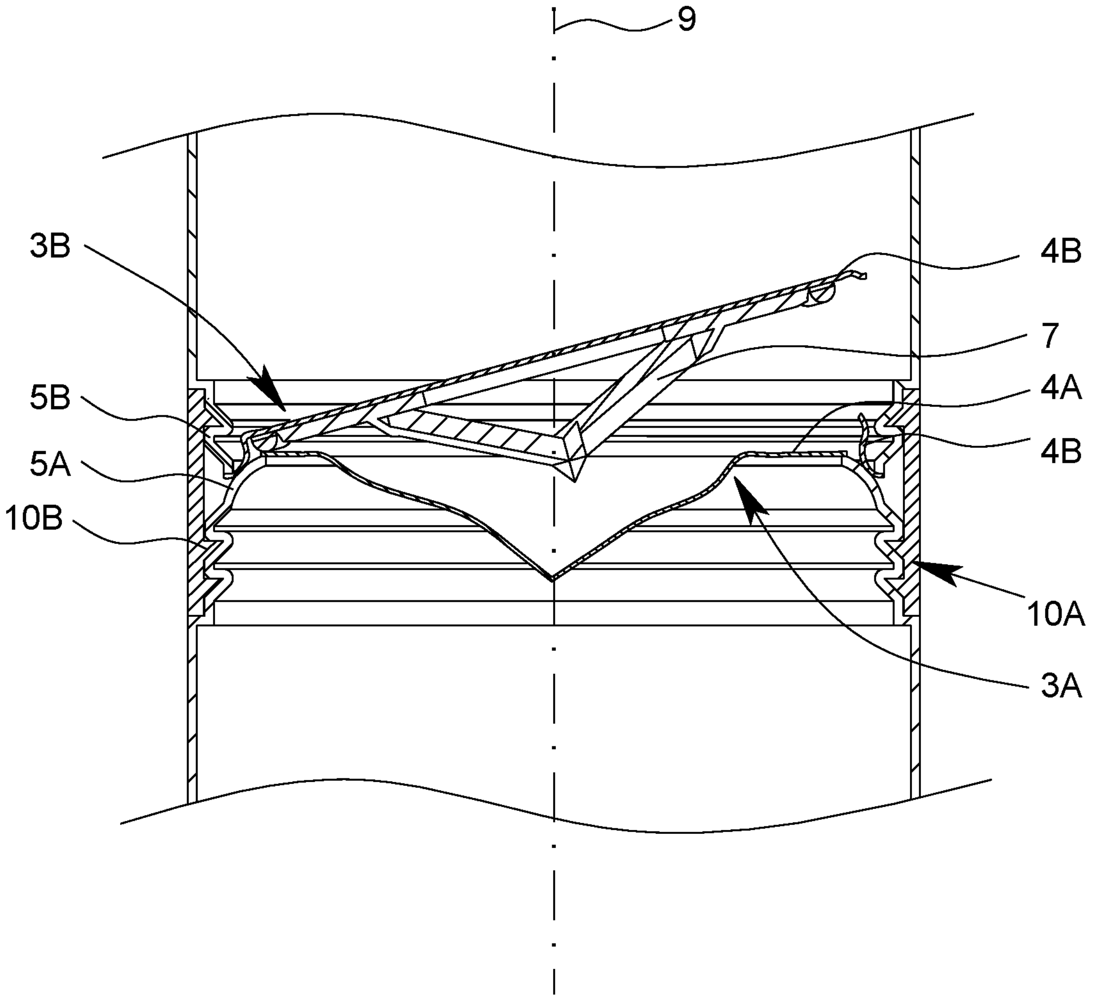
FIG. 4 shows a longitudinal section through a proposed connecting system of the first embodiment in a second connecting position.

FIG. 4 shows in longitudinal section a proposed connecting system 1 according to the first embodiment in a second connection position in which a fluidic connection 2 is produced. This is the position which is also shown in FIG. 1.

The proposed connecting system 1 preferably comprises a plurality of connecting arrangements 3A, 3B, particularly preferably at least the first connecting arrangement 3A and the second connecting arrangement 3B, which are preferably configured to be at least partially complementary to one another or corresponding to one another.

The first connecting arrangement 3A preferably comprises an opening region 4A. The second connecting arrangement 3B preferably comprises an opening region 4B.

Preferably, the containers B1, B2 comprise the opening regions 4A, 4B or the opening regions 4A, 4B form a part of the respective connecting arrangement 3A, 3B which is associated with the respective container B1, B2 or forms a part thereof.

Preferably, one or both opening regions, 4A, 4B are regions or portions of the respective connecting arrangement 3A, 3B which are configured to produce the fluidic connection 2 (durably and/or irreversibly), particularly by (irreversible) destruction thereof. For this purpose the opening region or regions 4A, 4B may have a (mechanical) weakened area or frangible point or may be configured as a weakened area or frangible point. The opening regions 4A, 4B, may be identical, similar or different in construction, particularly with respect to the reduced material and/or the shape of the opening regions 4A, 4B.

In particular, the opening regions 4A, 4B are configured to be (mechanically) destroyed or pierced in order to provide the fluidic connection 2. For this purpose an opening region 4A, 4B according to the present invention may be configured to be destroyed, perforated and/or torn open under mechanical load in order to enable or produce the fluidic connection 2.

In the embodiment shown, the opening regions 4A, 4B are formed by film-shaped or membrane-shaped wall portions of the respective connecting arrangement 3A, 3B. In particular, one or more of the opening regions 4A, 4B is or are sealing films. In principle, the opening regions 4A, 4B may, however, be formed by weakening the material that forms the respective connecting arrangement 3A, 3B and/or may be formed in one piece with the respective connecting arrangement 3A, 3B.

The opening regions 4A, 4B are preferably configured as wall portions of the (respective) connecting arrangement 3A, 3B. The opening regions 4A, 4B are preferably regions of low wall thickness which have been weakened in some way by comparison with the adjacent regions. Preferably, the opening regions 4A, 4B have a material thickness which is less than a material thickness of the adjacent regions, particularly walls, of the (respective) connecting arrangement 3A, 3B. The (respective) opening regions 4A, 4B are thus preferably thinner, more film-shaped and/or membrane-shaped by comparison with the adjacent regions.

The opening region or regions 4A, 4B preferably comprise or comprises one or more frangible points, particularly indentations, thin areas, brittle regions or portions. In particular, the second connecting arrangement 3B or its opening region 4B comprises a frangible point corresponding to the mouth-like portion 5A of the first connecting arrangement 3A. This assists with or favors the destruction or piercing of the opening region 4B of the second connecting arrangement 3B, even if, by the use of the mouth-like portion 5A for this purpose, a separating force acting on the opening region 4B acts or is distributed over a larger area.

In the embodiment shown in FIGS. 2 to 5, the opening regions 4A, 4B are each formed by sealing films which are welded, adhesively bonded, sealed or in some other way tightly connected, particularly in water-tight manner, to the respective connecting arrangement 3A, 3B, preferably the mouth-like portion 5A, 5B thereof.

Particularly preferably, the opening regions 4A, 4B are formed by a multilayer or laminar material, particularly a plastics/metal film composite or sandwich material. The opening regions 4A, 4B, however, may also be embodied differently, for example, by the use of several layers and/or a brittle or porous material, so as to have only a limited elasticity, so that even under slight mechanical stress the opening regions 4A, 4B are torn or otherwise destroyed.

The opening region or regions 4A, 4B are preferably configured to tear when mechanically stressed and thereby produce the fluidic connection 2. Preferably, the opening regions 4A, 4B have a material with a modulus of elasticity of more than 2000 $N/mm^2$, preferably more than 4000 $N/mm^2$, particularly more than 6000 $N/mm^2$. Alternatively, or additionally, the opening regions 4A, 4B may have a tensile strength of less than 100 $N/mm^2$, preferably less than 80 $N/mm^2$, more particularly less than 60 $N/mm^2$. The modulus of elasticity and the tensile strength may be determined according to EN ISO 6892-1, ISO 6892, ASTM E 8, ASTM E 21, DIN 50154, DIN 50125 and/or ISO 527, ASTM D 638.

It is also preferable that the opening region or regions should have a material thickness of less than 100 μm, preferably less than 70 μm, particularly less than 50 μm and/or more than 5 μm, particularly more than 10 μm.

The first connecting arrangement 3A, 3A' preferably comprises the first, particularly film-shaped, opening regions 4A, 4A' and/or the second connecting arrangement 3B, 3B' preferably comprises a second, particularly film-shaped opening region 4B, 4B'. Advantageously, this simultaneously ensures secure closure 14 of the respective connecting arrangements 3A, 3A', 3B, 3B' and reliable and simple opening of the respective opening regions 4A, 4A', 4B, 4B'.

The first connecting arrangement 3A, 3A' is preferably configured to open the second connecting arrangement 3B, 3B' by piercing or destroying the second opening region 4B, 4B'. Alternatively, or additionally the second connecting arrangement 3B, 3B' is preferably configured to open the first connecting arrangement 3A, 3A' by piercing or destroying the first opening region 4A, 4A'. Advantageously, the fluidic connection 2 may thus be produced manually or without the use of tools. The interiors of the containers B1, B2, B3 are preferably connectable by means of the connecting arrangements 3A, 3A', 3B, 3B' without any further aids or tools.

Preferably, to produce the fluidic connection 2, the opening region 4A, 4A', 4B, 4B' of the second connecting arrangement 4B, 4B' may be pierced with the first connecting arrangement 4A, 4A' and preferably the first opening region 4A, 4A' of the first connecting arrangement 3A, 3A' may be pierced with the second connecting arrangement 3B, 3B', particularly a severing element 7 thereof. The fluidic connection 2 may thus be produced by mutual perforation or piercing.

The connecting arrangements 3A, 3A', 3B, 3B' preferably have mouth-like portions 5A, 5A', 5B, 5B', which are formed such that the mouth-like portion 5A, 5A', 5B, 5B' of one of the first and second connecting arrangements 3A, 3A', 3B, 3B' may be aligned with the mouth-like portion 5A, 5A', 5B, 5B' of the other one of the first and second connecting arrangements 3A, 3A', 3B, 3B', so that preferably the opening region 4A, 4A', 4B, 4B' of the other one of the first and second connecting arrangements 3A, 3A', 3B, 3B' can be pierced and/or the other one of the first and second connecting arrangements 3A, 3A', 3B, 3B' can be opened.

The opening region 4A preferably comprises the mouth-like portion 5A and/or the opening region 4B comprises the mouth-like portion 5B. The mouth-like portions 5A, 5B preferably delimit the opening regions 4A, 4B. The mouth-like portions 5A, 5B may be formed in one piece with and/or as a wall portion of the respective connecting arrangement 4A, 4B. Preferably, the mouth-like portions 5A, 5B have open edges or are formed in the shape of collars or necks, the respective opening region 4A, 4B preferably being surrounded or delimited by the respective mouth-like portions 5A, 5B. The mouth-like portions 5A, 5B or the open edges thereof preferably adjoin the opening regions 4A, 4B or delimit them, or vice-versa. Particularly preferably, an open edge of the respective mouth-like portion 5A, 5B forms a (circumferential) fixing portion for an opening region 4A, 4B which is more particularly film-shaped or formed by a film.

The container system B, in another aspect of the present invention which may also be implemented independently, comprises a cover device 6 which is configured to hold one of the containers B1, B2, particularly to act as a foot for it. Advantageously, the cover device 6 may alternatively, or additionally serve for, particularly sterile, covering of one of the containers B1, B2 and/or one of the connecting arrangements 3A, 3B. This aspect will be discussed in more detail hereinafter.

The connecting arrangement 3A, 3B and the method for producing the fluidic connection therewith is explained in more detail hereinafter in a first embodiment illustrated in FIGS. 2 to 5.

In the first embodiment the first connecting arrangement 3A is configured for opening the opening region 4B of the second connecting arrangement 3B. It is particularly preferable that the mouth-like portion 5A of the first connecting arrangement 3A should be adapted to be inserted or pushed into the mouth-like portion 5B of the connecting arrangement 3B such that during the insertion or introduction the opening region 4B of the second connecting arrangement 3B is opened.

In the embodiment shown, the first connecting arrangement 3A, 3A' or the first mouth-like portion 5A, 5A' is a preferably male coupling element and/or the second connecting arrangement 3B, 3B' or the second mouth-like portion 5B, 5B' is a, preferably female, coupling element, particularly forming a fluid coupling.

In particular, it is provided that one end or an open edge of the mouth-like portion 5A has an outer circumferential edge which can be arranged inside an inner circumferential edge of the mouth-like portion 5B.

Preferably, the outer circumferential edge of the mouth-like portion 5A of the first connecting arrangement 3A corresponds to the inner circumferential edge of the mouth-like portion 5B of the second connecting arrangement 3B or resembles it, or vice versa. In particular, the mouth-like portion 5A of the first connecting arrangement 3A comprises, at least laterally or at a transition to the opening region 5A, an external diameter which is less than an internal diameter of the mouth-like portion 5B of the second connecting arrangement 3B, preferably at least at a terminal edge or at a transition to the opening region 5B. In the embodiment shown in FIGS. 2 to 5, the mouth-like portion 5A, 5B is preferably neck-shaped and/or at least substantially round in cross section.

Unless otherwise stated, the term cross-section in the sense of the present invention always refers to a section or a sectional representation at right angles to the longitudinal axis or axis of symmetry 9 of the respective container B1, B2 and/or the respective connecting arrangement 3A, 3B.

The second connecting arrangement 3B of the first embodiment preferably comprises a severing element 7 which is preferably configured to pierce, sever, cut or generally destroy the opening region 4A of the first connecting arrangement 3A. In particular, the severing element 7 comprises or is formed by a piercing device, a point, a blade, a wedge or generally a cutting and/or severing device.

The severing element 7 is preferably arranged and/or attached on the opening region 4B of the second connecting arrangement, particularly directly. The severing element 7 is preferably arranged on an outer side of the second connecting arrangement 3B or on a side or outer side remote from the interior of the container B2. The severing element 7 is preferably arranged so that by bringing the connecting arrangement 3B of the severing element 7 close to the opening region 4A of the first connecting arrangement the severing element 7 applies a force to the opening region 4A which leads to the destruction and opening of the opening region 4A, preferably without opening or destroying the opening region 4B of the second connecting arrangement 3B.

In particular, the severing element 7 is a device which concentrates a force acting on the opening region 4A or distributes a counter-force acting on the second connecting arrangement 3B or on the opening region 4A such that the opening region 3B of the second connecting arrangement 3B remains intact when the opening region 4A is opened by being destroyed by the severing element 7.

In a variant (not shown) the severing element 7 is arranged on an inner side of the connecting arrangement, within or inside the interior of the container B1 or (viewed from outside) arranged behind the opening region 3B of the second connecting arrangement 3B. Preferably, the opening region 4A, 4A' of the first connecting arrangement 3A is destroyed by the severing element 7 as the mouth-like portion 5A is pushed into the mouth-like portion 5B of the second connecting arrangement 3B. For this purpose the severing element 7 is provided, particularly directly (on the inside or on the side remote from the first connecting arrangement 3A) behind the opening region 4B of the second connecting arrangement 3B.

Preferably, the severing element 7 is immovably arranged or fixed on the second connecting arrangement 3B, particularly (directly) on, in front of or behind the opening region 4A.

FIG. 2 shows the proposed connecting system 1 in a starting position in which the opening regions 4A, 4B or the containers B1, B2 are closed or sealed. In particular they are (in each case) bottles or bottle-like containers B1, B2, the bottom opening regions 4A, 4B of which are closed in the starting position.

As shown by the arrow 8 indicating movement, the first connecting arrangement 3A and the second connecting arrangement 3B may be moved towards one another or pushed into one another. For this purpose the connecting arrangements 3A, 3B are preferably moved axially towards one another with respect to a central axis or axis of symmetry 9. The central axis or axis of symmetry 9 is preferably a central axis or axis of symmetry 9 of the mouth-like portion or portions 5A, 5B and/or of the opening region or regions 4A, 4B and/or of the container or containers B1, B2.

The containers B1, B2, the connecting arrangements 3A, 3B, the opening regions 4A, 4B and/or the mouth-like portions 5A, 5B may thus be formed substantially symmetrically with respect to the central axis or axis of symmetry 9. An axially symmetrical and/or rotationally symmetrical construction of the mouth-like portions 5A, 5B is preferred, as this enables the connecting arrangements 3A, 3B to be used independently of their rotary position. However, other solutions are also theoretically possible, particularly ones in which the mouth-like portions 5A, 5B are rotationally asymmetrical or non-round and preferably a guide is provided which is configured to define a rotary position of the connecting arrangements 3A, 3B relative to the central axis or axis of symmetry 9. This will be discussed in more detail in connection with the second embodiment.

As can be seen in FIG. 3, as the connecting arrangements 3A, 3B come closer to one another the severing element 7 is applied to the opening region 4A, preferably with a point 7A and by further movement of the connecting arrangements 3A, 3B towards one another, pushed through the opening region 4A. In this way the opening region 4A is destroyed or the connecting arrangement 3A and/or the container B1 is opened.

Figure 16:
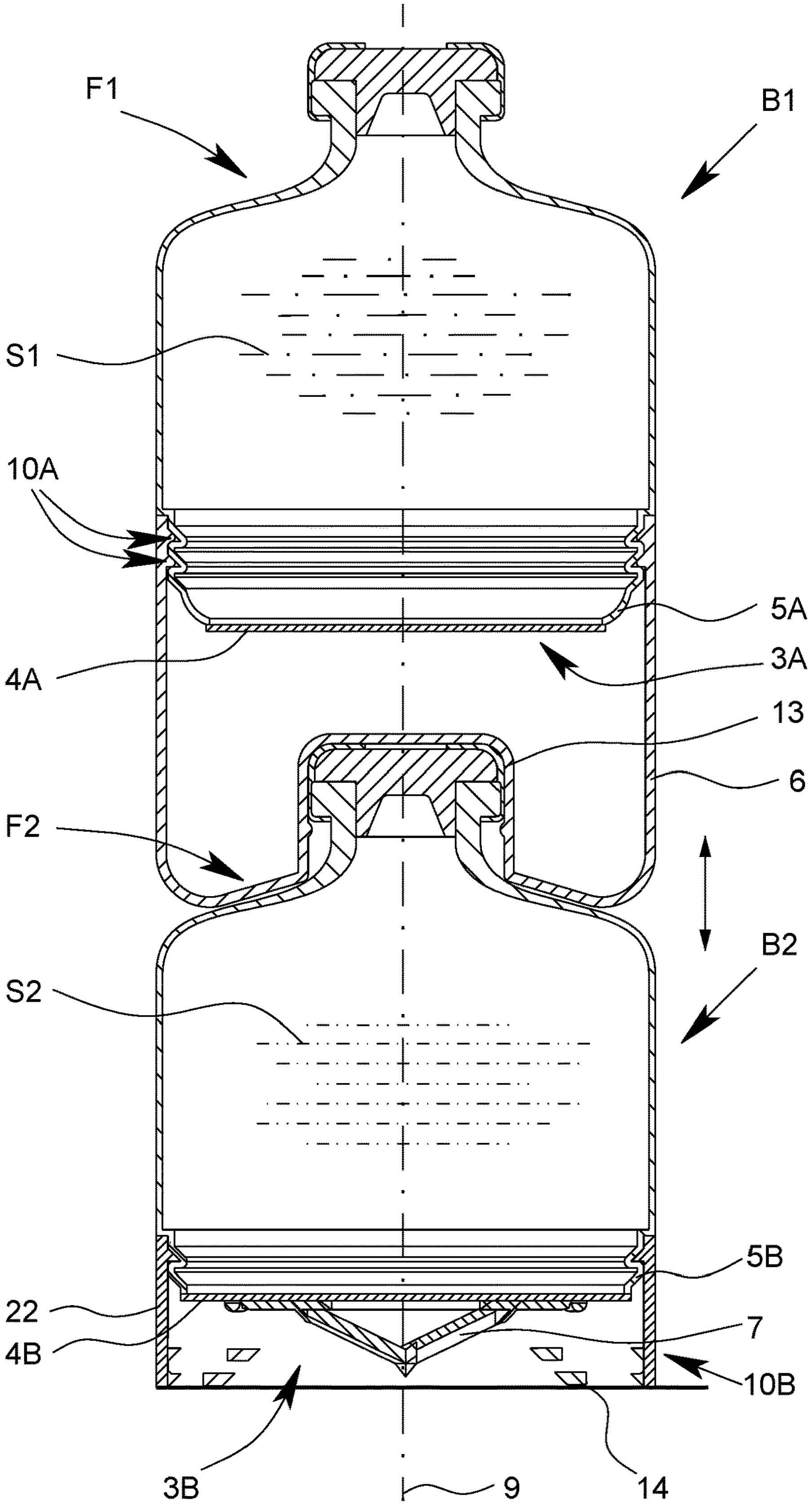
FIG. 16 shows a schematic longitudinal section through the proposed container system with the proposed connecting system according to the first embodiment in a transporting configuration.
Figure 17:
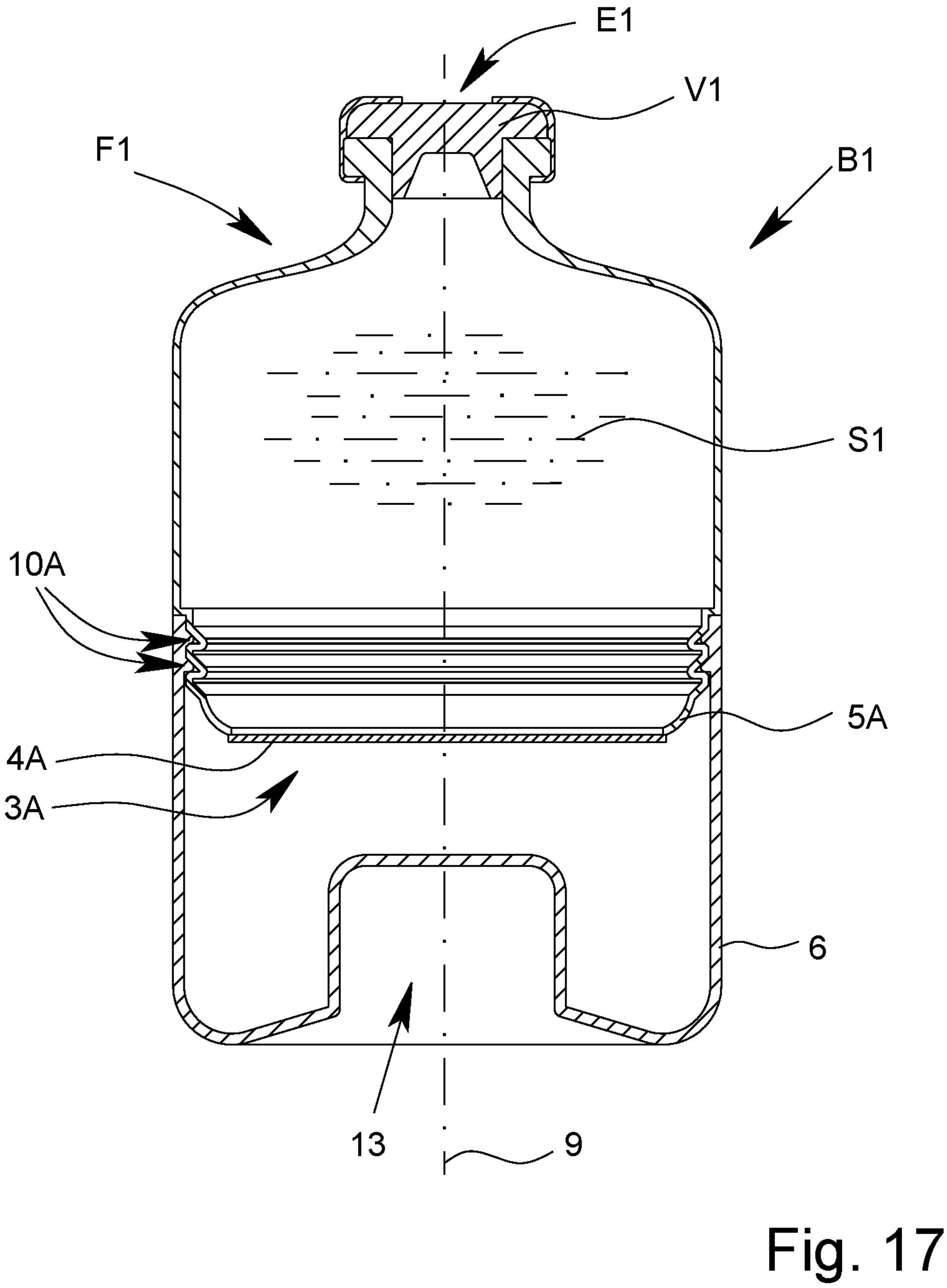
FIG. 17 shows a schematic longitudinal section through a first container with a first connecting arrangement covered in sterile or sterilizable manner.

The connecting arrangements 3A, 3A', 3B, 3B' are preferably designed to be separate and/or independent of one another in a starting position (cf. also FIGS. 16 and 17). This advantageously enables common and also separate use of cavities or containers B1, B2, B3 which are connected to or connectable with the connecting arrangements 3A, 3A', 3B, 3B'.

In the starting position, the connecting arrangements 3A, 3A', 3B, 3B' are preferably unconnected or fluidically separated from one another. As a result of the formation of the fluidic connection 2, the connecting arrangements 3A, 3A', 3B, 3B' move into a connecting position in which the fluidic connection 2 is made.

A fluidic connection 2 between the containers B1, B2, B3 is preferably produced at least when the volumes or substances S1, S2, S3 enclosed by the containers B1, B2, B3 are able to be moved between the containers B1, B2, B3, by gravity and/or mixed with one another.

The fluidic connection 2 is, in particular, a channel or a passage through which fluid substances S1, S2, S3, particularly liquids, can flow.

The connecting arrangements 3A, 3A', 3B, 3B' are preferably usable only once and/or are irreversibly openable; the fluidic connection 2 is preferably permanent and/or irreversible.

The connecting system 1 is preferably configured for the provision of a non-releasable or non-separable connection, particularly with the non-separable connection taking place even before at least one of the connecting arrangements 3A, 3A', 3B, 3B' has been opened. This prevents substances from escaping and advantageously prevents a partial mixing process from taking place.

The connecting arrangements 3A, 3A', 3B, 3B' preferably comprise securing devices 10A, 10B for producing the non-releasable connection, which produce a non-releasable connection between the connecting arrangements 3A, 3A', 3B, 3B' as a result of being fitted into one another and/or passed through one another by axial movement along their shared axis. In particular, the securing devices 10A, 10B comprise snap-fit hooks and/or are non-releasable or self-securing by means of snap-fit hooks or a snap-fit hook connection. In this way it is possible to ensure that the connection cannot be undone manually and/or without damage or destruction.

The connecting arrangements 3A, 3A', 3B, 3B' can preferably be connected to one another non-releasably or inseparably by interlocking and/or frictional engagement, particularly by latching. In particular, different connecting positions, particularly latching positions, can be achieved by fitting one inside the other and/or inserting one inside the other by axial movement along the common axis.

In particular, one of the connecting arrangements 3A, 3A', 3B, 3B' comprises a latching means, particularly one or more latching lugs, arranged on portions located axially behind one another. Preferably, the latching means of one of the connecting arrangements are arranged such that one or more complementary latching means of the other connecting arrangement 3A, 3A', 3B, 3B', particularly one or more grooves or undercuts, latch into one another to form an engagement by being fitted into one another and/or inserted in one another with axial movement along the common axis. This enables the non-releasable or inseparable connection or the connecting position to be achieved.

The connecting arrangements 3A, 3A', 3B, 3B' are preferably configured so that when a first connecting position is reached the non-releasable or inseparable connection is made and/or none or only one of the first and second connecting arrangements 3A, 3A', 3B, 3B' is or has been opened. The fluidic connection 2 is thus preferably not yet or not entirely formed in the first latching position.

When another, second connecting position is reached which is preferably after the first connecting position in location and/or time, the continuous fluidic connection 2 and/or the opening of the two connecting arrangements 3A, 3A', 3B, 3B' is preferably produced.

By bringing the first connecting arrangement 3A, 3A' and the second connecting arrangement 3B, 3B' towards one another, preferably first of all only one of the first and second opening regions 4A, 4A', 4B, 4B' is broken, particularly pierced, and only as the connecting arrangements 3A, 3A', 3B, 3B' are brought closer together or subsequently rotated relative to one another or pushed into one another, is the continuous fluidic connection 2 produced by the breakage of the other one of the first and second opening regions 4A, 4A', 4B, 4B'.

Preferably, the connecting system 1 has a first connecting position in which the connecting arrangements 3A, 3B are connected to one another non-releasably, preferably by latching. For this purpose the connecting arrangements 3A, 3B may have securing devices 10A, 10B corresponding to another which produce a non-releasable connection between the connecting arrangements 3A, 3B as the connecting arrangements 3A, 3B are brought close together.

In the embodiment shown, the securing devices 10A, 10B are formed by corresponding or complementary undercuts, latching lugs or the like. In particular, individual latching lugs are formed on one of the connecting arrangements 3A, 3B and, in particular, annular beads and/or undercuts are formed on the other of the connecting arrangements 3A, 3B, which by co-operating provide a latching connection between the connecting arrangements 3A, 3B.

Particularly preferably, the securing devices 10A, 10B are configured for connecting the connecting arrangement 3A, 3B non-releasably with one another in a first connecting position but allowing further movement of the connecting arrangement 3A, 3B towards one another.

Moreover, the securing devices 10A, 10B are preferably configured so as to support a further, second connecting position in which the connecting arrangements 3A, 3B are brought more closely together or pushed further into one another than in the first connecting position. Particularly preferably, a plurality of latching positions are provided, in which, in a first latching position, the connecting arrangements 3A, 3B are already non-releasably connected to one another. The proposed connecting system 1 is shown in this first connecting position in FIG. 3.

In the first connecting position, one of the connecting arrangements 3A, 3B may already have been opened. Alternatively, or additionally, the first connecting position may also be characterized in that a non-releasable connection has indeed been made between the connecting arrangements 3A, 3B but none of the opening regions 4A, 4B has yet been opened or is being opened.

In the embodiment shown in FIG. 3, in the first connecting position, the first connecting arrangements 3A are connected to the second connecting arrangement 3B in non-releasable manner by latching and the first opening region 4A has already been opened or destroyed by the severing element 7.

FIG. 4 shows the proposed connecting system 1 in the second connection position, particularly a further latching position, in which the connecting arrangements 3A, 3B have been further brought together and/or pushed further inside one another, particularly at least substantially completely, compared with the first connecting position. In the second connecting position the first opening region 4A of the first connecting arrangement 3A has been opened by the second connecting arrangement 3B and furthermore the opening region 4B of the second connecting arrangement 3B has been opened by the first opening means 3A.

In order to open the second connecting arrangement 3B with or by means of the first connecting arrangement 3A, preferably the mouth-like portion 5A of the first connecting arrangement 3A is pushed through the opening region 4B of the second connecting arrangement 3B, thereby destroying said opening region 4B. This is preferably done as the connecting arrangements 3A, 3B are moved from the first connecting position into the second connecting position.

The securing devices 10A, 10B are preferably configured to prevent (axial) movement of the connecting arrangements 3A, 3B away from one another, both in the first connecting position and in the second connecting position. Thus it is envisaged, in particular, that the connecting arrangements 3A, 3B are movable further into the second connecting position from the first connecting position but not in an opposite direction. It is also preferable that the connecting arrangements 3A, 3B in the second connecting position (cf. FIG. 4) cannot be moved back into the first connecting position.

Preferably, the connecting arrangements 3A, 3B abut on one another, particularly sealingly, in the first connecting position. This prevents substances S1, S2 from escaping.

According to an aspect of the present invention which can also be implemented independently, during or as a result of the opening of the opening region 4B of the second connecting arrangement 3B by the mouth-like portion 5A of the first connecting arrangement 3A, a seal is formed relative to the environment. In particular, the opening region 4B of the second connecting arrangement 3B forms a sealing system with the mouth-like portion 5B of the second connecting arrangement 3B. Alternatively, or additionally, the mouth-like portions 5A, 5B may have a sealing action by bearing against one another, while the opening region 4B acts sealingly or provides a seal, particularly at the edges and/or in the transitional area to the mouth-like portion 5B. However, there are also other possible solutions, for example, using an additional or separate rubber seal, sealing lip or the like.

The connecting arrangements 3A, 3B or the connecting system 1 is or are preferably formed without threads. It has been found that systems known from the prior art which use threads to move a cutting tool in order to open containers are more prone to defects and require greater expense in order to create an opening or fluidic connection. Advantageously, the connecting arrangements 3A, 3B of the present connecting system can be connected to one another by a simple linear or axial movement and/or by moving directly towards one another (without the need for any additional rotation through several revolutions relative to one another). This has proved advantageous for rapid and comfortable production of the fluidic connection 2.

In this connection it is also advantageous that the proposed connecting system 1 comprises one or more connecting positions, particularly preferably in the form of latching positions. This has the particular advantage over interlocking threads that a non-releasable connection can be produced between the connecting arrangements 3A, 3B. On the other hand, with a threaded connection, dismantling and contamination are possible.

Theoretically, however, it is also possible to combine aspects of the present invention with connecting arrangements 3A, 3B which are connected or connectable by interlocking threads or in which the fluidic connection 2 can be produced by interlocking threads and a rotational movement relative to one another.

FIGS. 5 to 13 hereinafter illustrate a proposed connecting system 1 according to a second embodiment. Only the special features and differences from the embodiments described above will be discussed and therefore the foregoing remarks also apply in a supplementary manner to the second embodiment unless specifically stated to the contrary or obvious to the skilled man.

Figure 5:
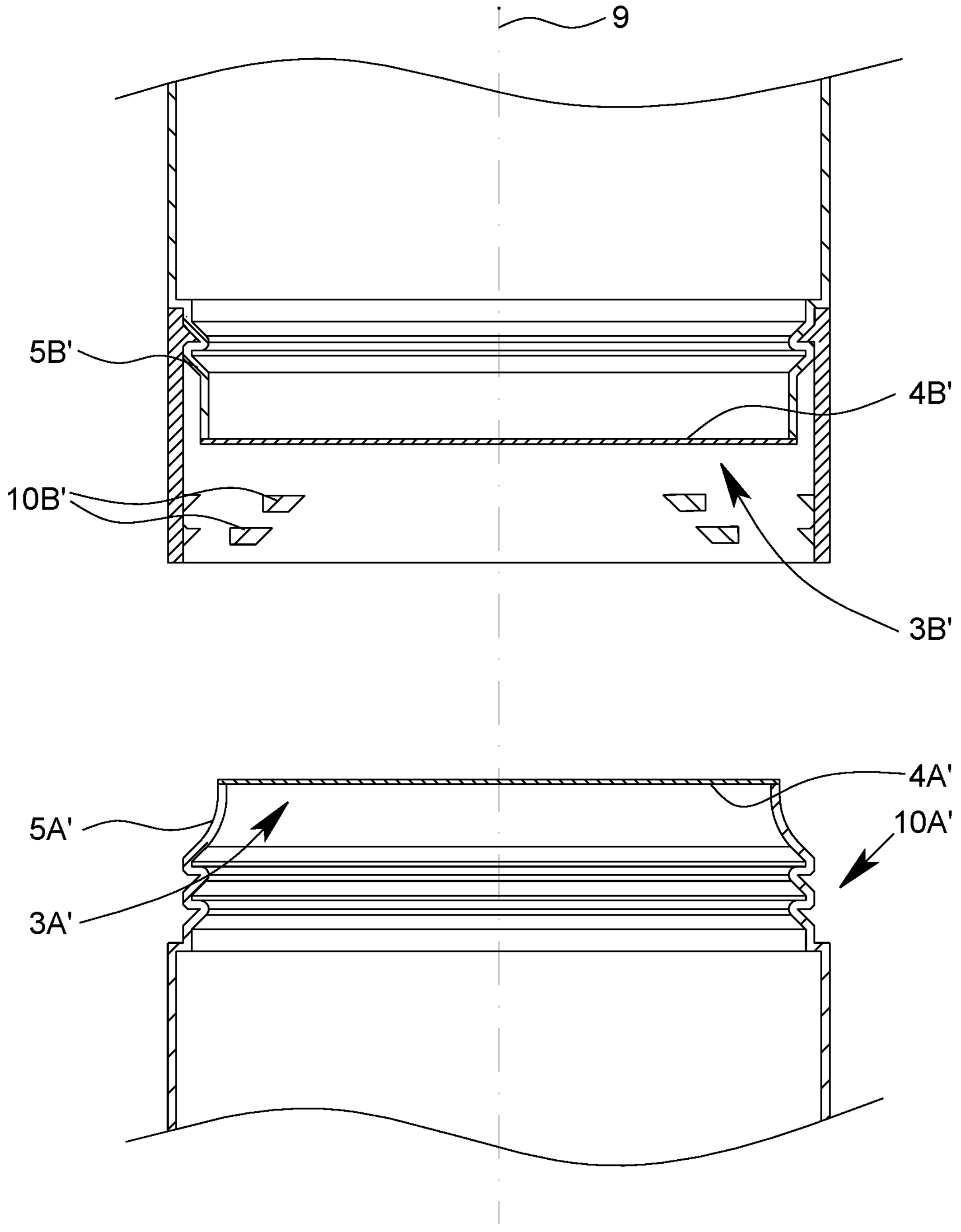
FIG. 5 shows a longitudinal section through a proposed connecting system in a second embodiment in a starting position.

FIG. 5 shows in a starting position a first connecting arrangement 3A' and a second connecting arrangement 3B' according to the second embodiment. In the second embodiment, preferably none of the connecting arrangements 3A', 3B' has a severing element. In particular, the connecting system 1 according to the second embodiment is free from cutting tools, severing mechanisms and/or free from sharp edged projections or portions for opening.

In the second embodiment, mouth-like portions 5A' and 5B' of the connecting arrangement 3A', 3B' are preferably configured to be rotationally non-symmetrical or non-round, non-circular or oval with respect to the central axis or axis of symmetry 9. Preferably, the mouth-like portions 5A, 5B are configured to correspond to one another and/or to be similar in relation to a circumferential line, so that they can be arranged one inside the other and/or one can be pushed into one another. Moreover, for supplementary information, reference may be made to the explanations of the mouth-like portions 5A, 5B in the first embodiment.

Figure 6:
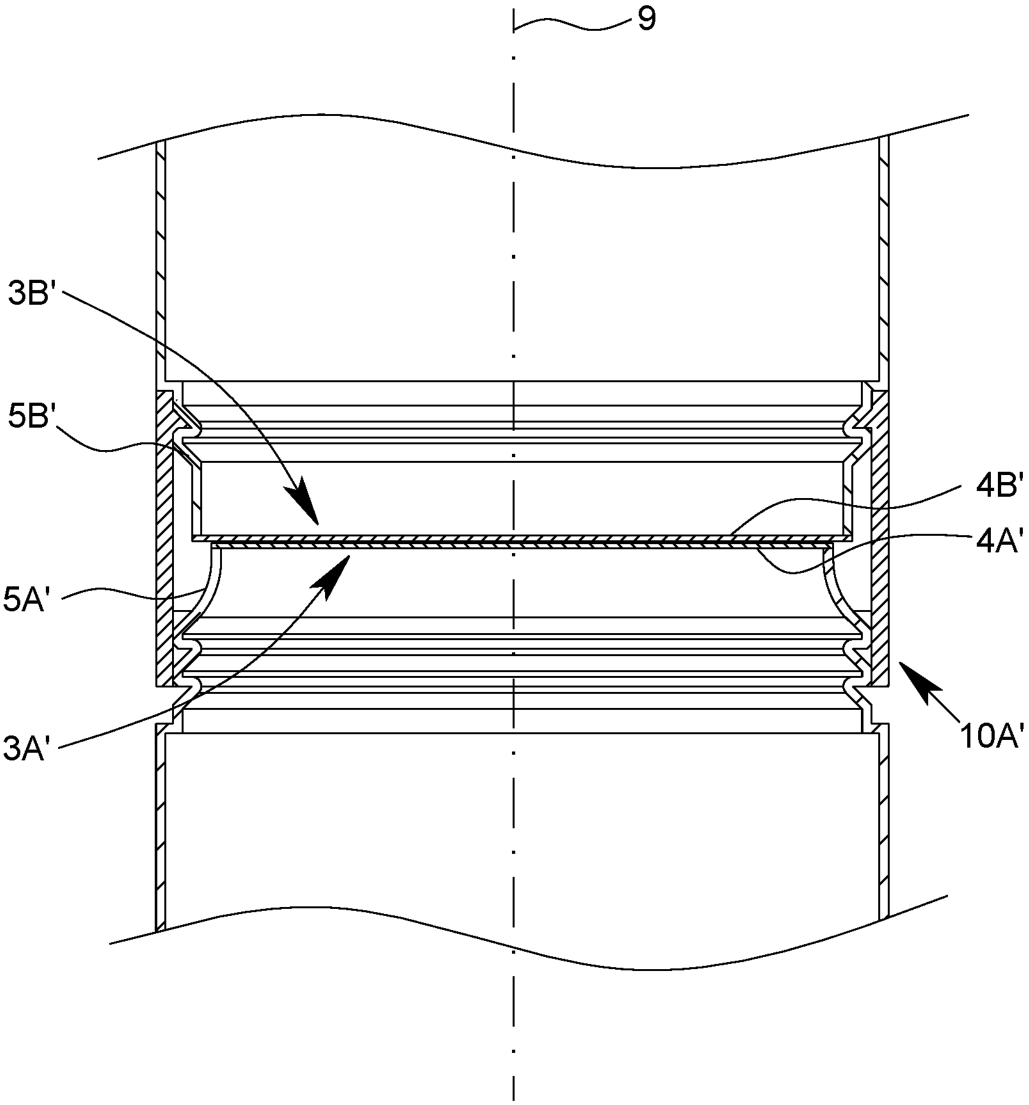
FIG. 6 shows a longitudinal section through the proposed connecting system in the second embodiment in a first connecting position.

FIG. 6 shows the connecting arrangements 3A', 3B' in the first connecting position in which they are connected to one another, preferably non-releasably. For this, the securing devices 10A, 10B may be used as explained hereinbefore.

The connecting arrangement 3A', 3B' preferably comprise opening regions 4A', 4B' which correspond to or resemble the opening region in 4A, 4B of the first embodiment. In the first connecting position according to FIG. 6, the opening regions 4A', 4B' abut on one another or are directly adjacent to one another. Alternatively, in the first connecting position, the opening region 4B' of the second connecting arrangement 3B' may, however, also already have been opened, as explained hereinafter in connection with FIG. 7.

Figure 7:
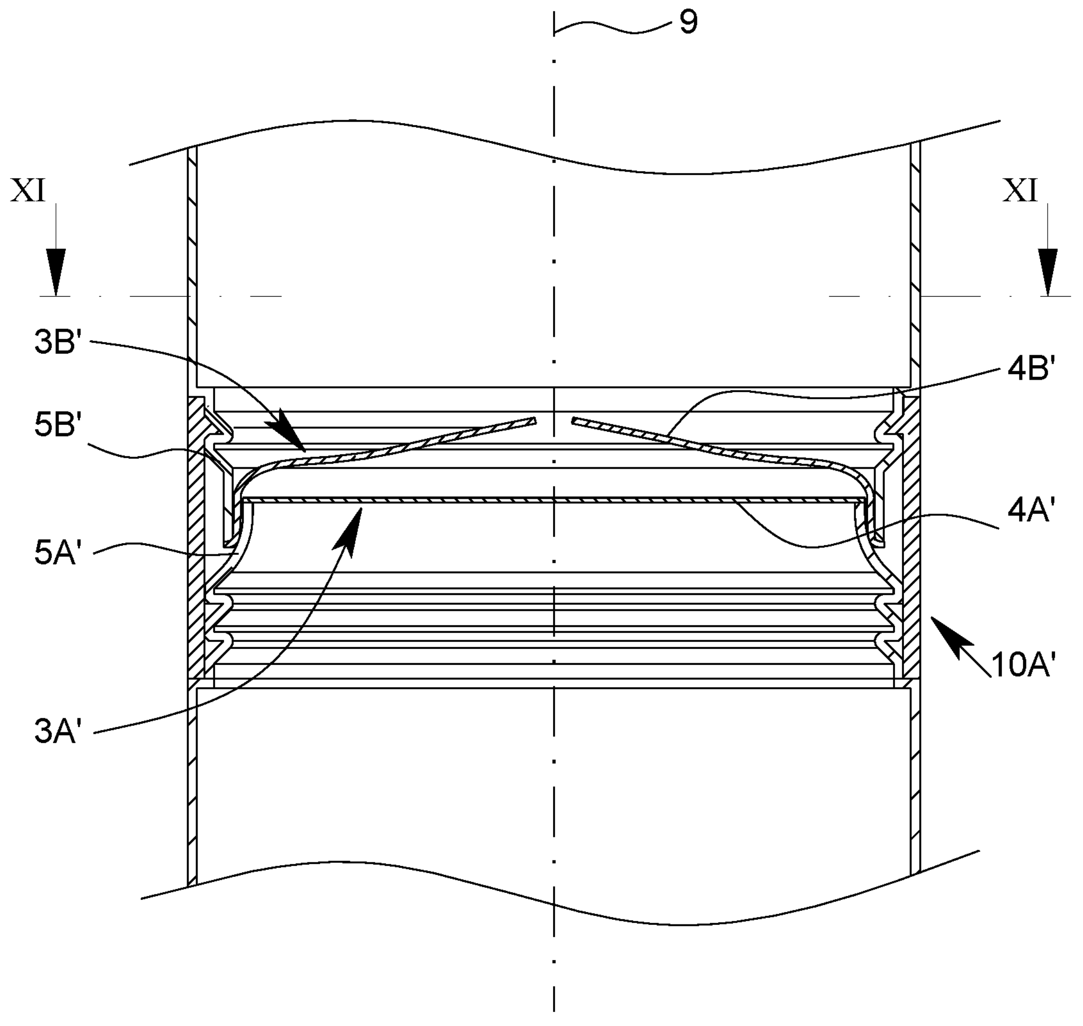
FIG. 7 shows a longitudinal section through the proposed connecting system in the second embodiment in a second connecting position with the connecting arrangements oriented with one another.

For opening or penetrating the second opening region 4B', the mouth-like portion 5A' of the first connecting arrangement 3A' is pressed through the opening region 4B' of the second connecting arrangement 3B' as already explained in connection with the opening of the opening region 4B of the first embodiment. Preferably, the opening region 4B', particularly a sealing film or a film-shaped portion of the second connecting arrangement 3B' is destroyed or opened, particularly by pushing part of the first connecting arrangement 3A' through the opening region 4B' so that the opening region 4B' is opened or the film or the film-shaped portion which forms the opening region 4B' is pierced or destroyed. The result is shown in FIG. 7, in which, as a result of reaching the second connecting position, the second connecting arrangement 3B has been opened in the manner described.

By contrast with the first embodiment, the method for providing the fluidic connection 2 in the second embodiment begins with the step of opening the second connecting arrangement 3B' by means of the mouth-like portion 5A' or destroying the opening region 4B' of the second connecting arrangement 3B' using the mouth-like portion 5A'.

It is also envisaged in the second embodiment that the connecting arrangements 3A', 3B' are rotatable relative to one another or about the (common) central axis or axis of symmetry 9 in their connected state, particularly in the second connecting position. As a result, preferably the other of the connecting arrangements 3A', 3B', i.e., the first connecting arrangement 3A', in particular, is opened, as explained in detail hereinafter with reference to FIGS. 8 to 13.

In one aspect it is preferable that the first opening region 4A, 4A', 4B, 4B' of the first connecting arrangement 4A, 4A' can be opened by deformation by means of the second connecting arrangement 4B, 4B'. The opening regions 4A, 4A', 4B, 4B' can also be mutually opened by mutual deformation. Opening by deformation preferably does not require any shearing edges or severing elements, which is advantageous in terms of a simple manufacturing process with reduced use of materials.

The second connecting arrangement 3B, 3B' is preferably configured to open the first connecting arrangement 3A, 3A', while the second connecting arrangement 3B, 3B' is preferably configured to open the opening region 4A, 4A', 4B, 4B' of the first connecting arrangement 4A, 4A' by deformation of the first connecting arrangement 3A, 3A'.

Particularly preferably, in this aspect, the deformation is initiated by rotating the connecting arrangements 3A, 3A' relative to one another, particularly about the common axis 9, and/or opening the opening regions 4A, 4A' 4B, 4B' of the first connecting arrangement 3A, 3A'.

The connecting arrangements 3A, 3A', 3B, 3B' preferably have non-round, particularly oval or at least substantially elliptical portions corresponding to one another which can be inserted in one another and/or cause deformation and/or opening when rotated relative to one another.

The deformation preferably brings about a tensioning of the opening region 4A, 4A', at least substantially radially or transversely with respect to a central axis or axis of symmetry 9 or along the opening region of the opening region 4A, 4A', as a result of which the opening region 4A, 4A' is torn, broken or detached and/or the opening region 4A, 4A' is opened.

At the same time, the second connecting arrangement 3B, 3B' may have an, in particular film-shaped, brittle and/or unstable opening region 4B, 4B', preferably with the first connecting arrangement 3A, 3A' being configured for opening the second connecting arrangement 3B, 3B'. In particular, the first connecting arrangement 3A, 3A' is configured to open the second connecting arrangement 3B, 3B' by breaking through the opening region 4B, 4B' of the second connecting arrangement 3B, 3B'.

The first connecting arrangement 3A, 3A' preferably comprises a mouth-like portion 5A, 5A' which adjoins the opening region 4A, 4A' or surrounds the opening region 4A, 4A', the mouth-like portion 5A, 5A' being deformable so that the opening region 4A, 4B can be opened by the deformation.

The mouth-like portion 5A, 5A' is preferably in the form of a web, a neck, a wall, a thin wall, or it is elastic and/or flexible, and/or the mouth-like portion 5A, 5A' is more elastic, more flexible and/or more stable than the opening region 4A, 4A', which is preferably opened on deformation of the mouth-like portion 5A, 5A' the opening region 4A, 4A', particularly by tearing, breaking or detaching.

The second connecting arrangement 3B, 3B' is preferably configured for deforming the mouth-like portion of the first connecting arrangement 3A, 3A', so that the deformation causes the opening region 4A, 4A' of the first connecting arrangement 3A, 3A' to open.

The mouth-like portion 5A, 5A', 5B, 5B' is preferably non-round, particularly oval, at least essentially elliptically and/or polygonal in cross section, while the second connecting arrangement 3B, 3B' has a corresponding cross section, so that rotating the connecting arrangements 3A, 3A', 3B, 3B' relative to one another causes deformation and/or opening of the first connecting arrangement 3A, 3A' in their opening region 4A, 4A'.

Both connecting arrangements 3A, 3A' 3B, 3B' preferably have mouth-like portions 5A, 5A', 5B, 5B' which can be arranged in oriented manner inside one another or can be pushed into one another, while rotation of the connecting arrangements 3A, 3A', 3B, 3B' or of the mouth-like portions 5A, 5A', 5B, 5B' relative to one another brings about deformation of the first and, preferably, the second mouth-like portion 5A, 5A', 5B, 5B'.

The connecting arrangements 3A, 3A', 3B, 3B' can be connected to one another by a bayonet-type connection or they may comprise connectors or guides 18A, 18B, which are configured to form a bayonet-type connection. For this purpose the mouth-like portions 5A, 5A', 5B, 5B' may initially be pushed or capable of being pushed (only) in the axial direction into one another and only afterwards may they be rotated or rotatable relative to one another, while preferably the fluidic connection 2 is not formed until they are rotated relative to one another. The guides 18A, 18B may thus be designed for a bayonet-type connection. For this purpose a (purely) axially extending guide may be adjacent to a (purely) radial guide.

Preferably, by rotating the connecting arrangements 3A', 3B' relative to one another while the mouth-like portion 5A' of the first connecting arrangement 3A' is arranged in the mouth-like portion 5B' of the second connecting arrangement 3B', the opening region 4A' of the first connecting arrangement 3A' is mechanically stressed, particularly tensioned by the deformation of the mouth-like portion 5A' of the first connecting arrangement 3A' to such an extent that it tears.

Figure 9:
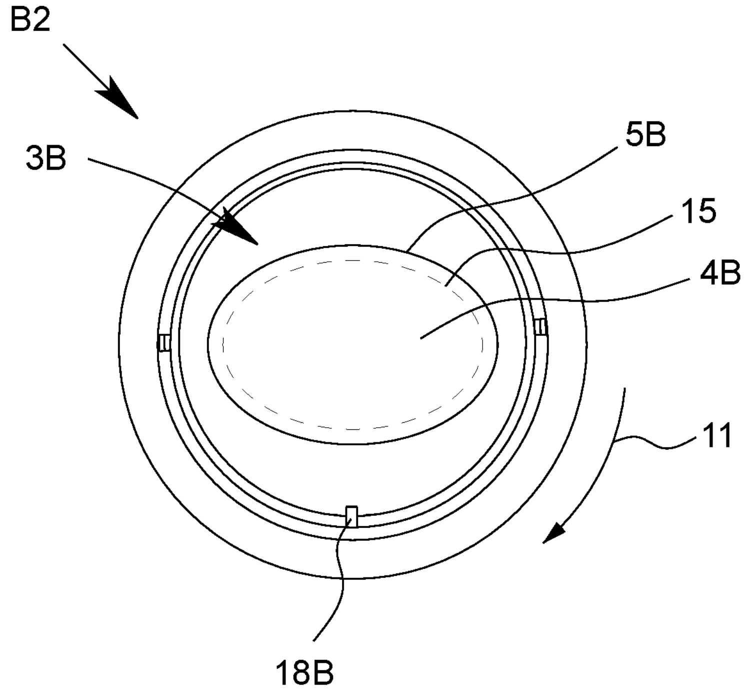
FIG. 9 shows a schematic plan view of a first container with a first connecting arrangement for the proposed connecting system of the second embodiment.
Figure 10:
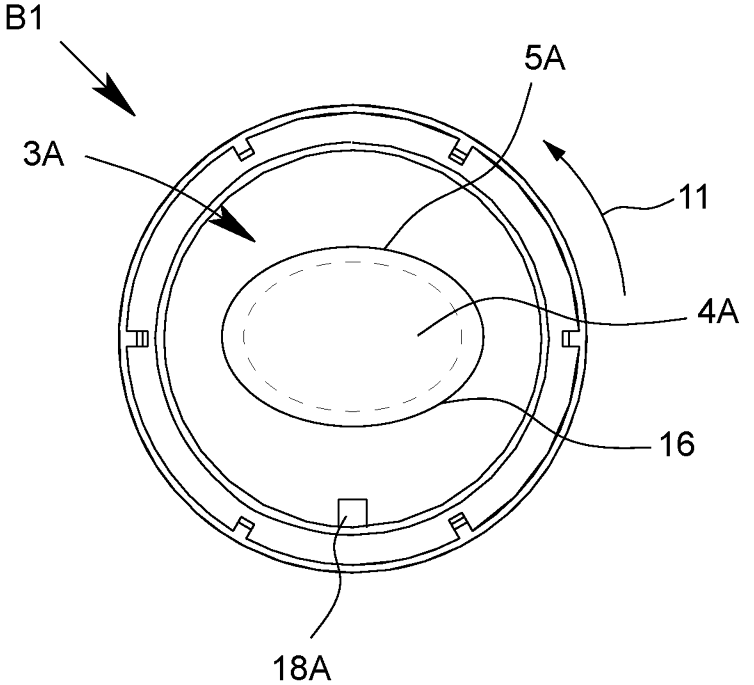
FIG. 10 shows a schematic plan view of a second container with a second connecting arrangement for the proposed connecting system of the second embodiment.

To improve the understanding of the opening mechanism for opening the first opening region 4A' of the first connecting arrangement 3A' from the second embodiment, FIGS. 9 and 10 each show a plan view of a connecting arrangement 3A' 3B'. The second connecting arrangement 3B' shown in FIG. 9 preferably has a mouth-like portion 5B' which resembles the mouth-like portion 5A' of the first connecting arrangement 3A' shown in FIG. 10 in shape and/or outline, but is larger in its dimensions, diameters, longitudinal extent and/or transverse extent (at right angles to the central axis or axis of symmetry 9).

In particular, the second connecting arrangement 3B' comprises an inner circumferential edge 15—indicated by dashed lines in the plan view in FIG. 9—which resembles an outer circumferential edge 16 of the mouth-like portion 5A', corresponds thereto and/or is configured so that the outer circumferential edge 16 can be accommodated by the inner circumferential edge 15. Preferably, a maximum diameter of the inner circumferential edge 15 is greater than a maximum diameter of the outer circumferential edge 16 and/or a minimum diameter of the inner circumferential edge 15 is greater than a minimum diameter of the outer circumferential edge 16, preferably by more than 2% or 3% and/or less than 40%, preferably less than 30%, more particularly less than 20%, 15% or 10%. This enables the mouth-like portions 5A', 5B' to be simply pushed one inside the other while at the same time reliably opening the opening region 4A' of the first connecting arrangement 3A'.

The mouth-like portions 5A', 5B' can preferably be arranged inside one another or pushed into one another with play. As a result of the arrangement of the mouth-like portions 5A', 5B' a gap 17 or a spacing is formed (at least partially) between the inner circumferential edge 15 and the outer circumferential edge 16.

In the embodiment shown, which relates to a particularly preferred variant, the mouth-like portions 5A', 5B' are each oval in cross section, particularly at least substantially elliptical. Theoretically, however, other shapes are possible, for example, at least substantially square or other polygonal shapes. In theory it is preferable that the extent of the cross section in the main axial direction or the maximum extent in the secondary axial direction (centrally and transversally or perpendicularly to the main axial direction) exceeds or the minimum extent of the cross section by a factor of more than 1.2, preferably 1.3, particularly 1.5, and/or at least or at least substantially by a factor root of 2. This allows sufficiently strong deformation during rotation of the connecting arrangements relative to one another so that the opening of the opening region 4A' of the first connecting arrangement 3A' can take place reliably.

Figure 11:
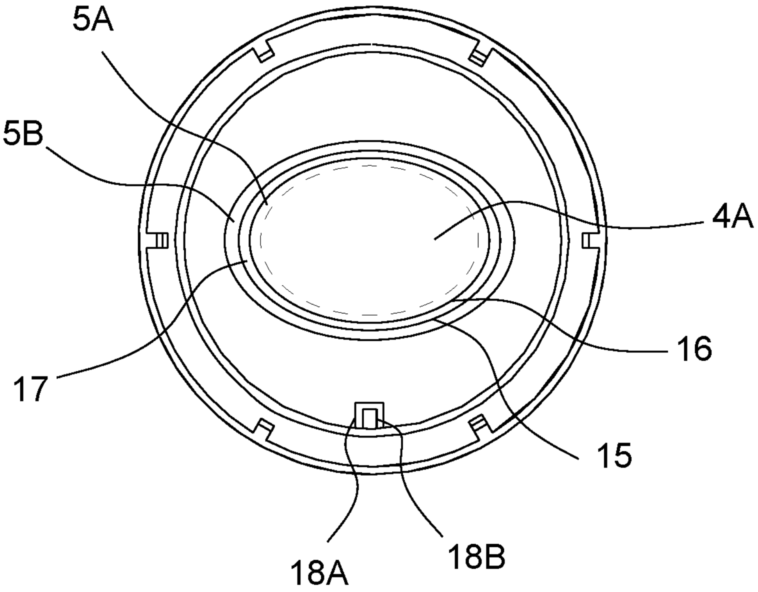
FIG. 11 shows a schematic cross-section through the proposed connecting system in the second embodiment along the section line XI-XI from FIG. 7.
Figure 12:
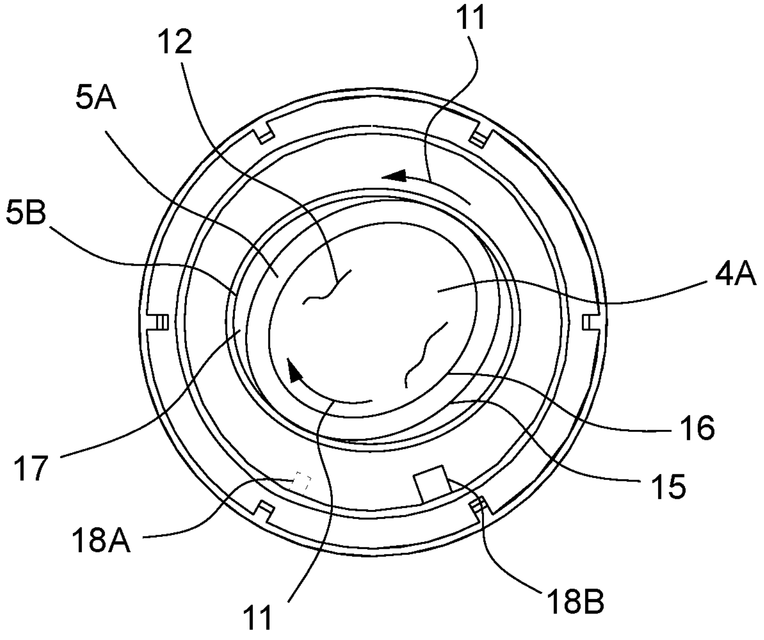
FIG. 12 shows a schematic cross-section through the proposed connecting system in the second embodiment after partial rotation of the connecting arrangements relative to one another.
Figure 13:
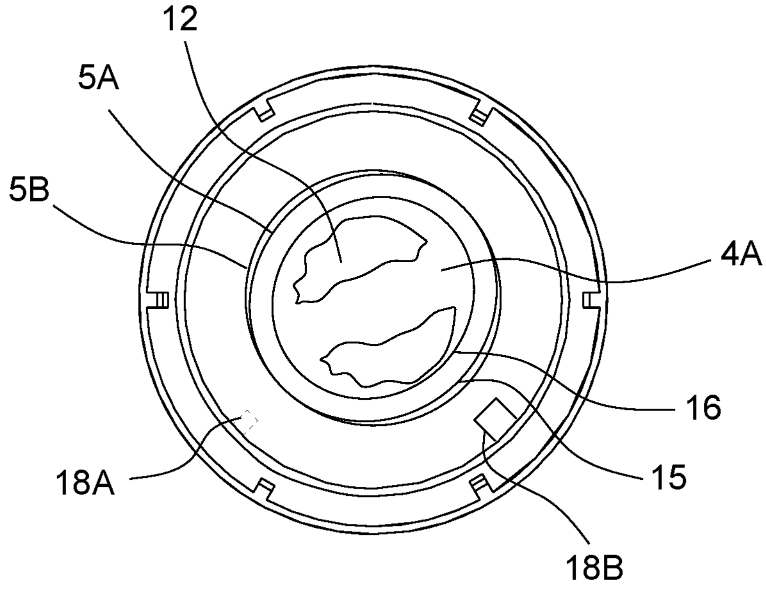
FIG. 13 shows a schematic cross-section through the proposed connecting system in the second embodiment along the section line XIII-XIII from FIG. 8.

In FIGS. 11 to 13 the connecting arrangements 3A', 3B' are shown in different rotational positions relative to one another, preferably in the second connecting position.

Preferably, the connecting arrangements 3A', 3B' can be turned or rotated through more than 45° and/or less than 200°, particularly less than 135° and/or at least substantially through 90°, in their (non-releasably) connected state or with the mouth-like portions 5A', 5B' inserted in one another, about the (common) central axis or axis of symmetry 9. This ensures deformation of one or both mouth-like portions 5A', 5B' and/or opening of an opening region 4A', 4B', particularly of the opening region 4A' of the first connecting arrangement 3A'.

Figure 8:
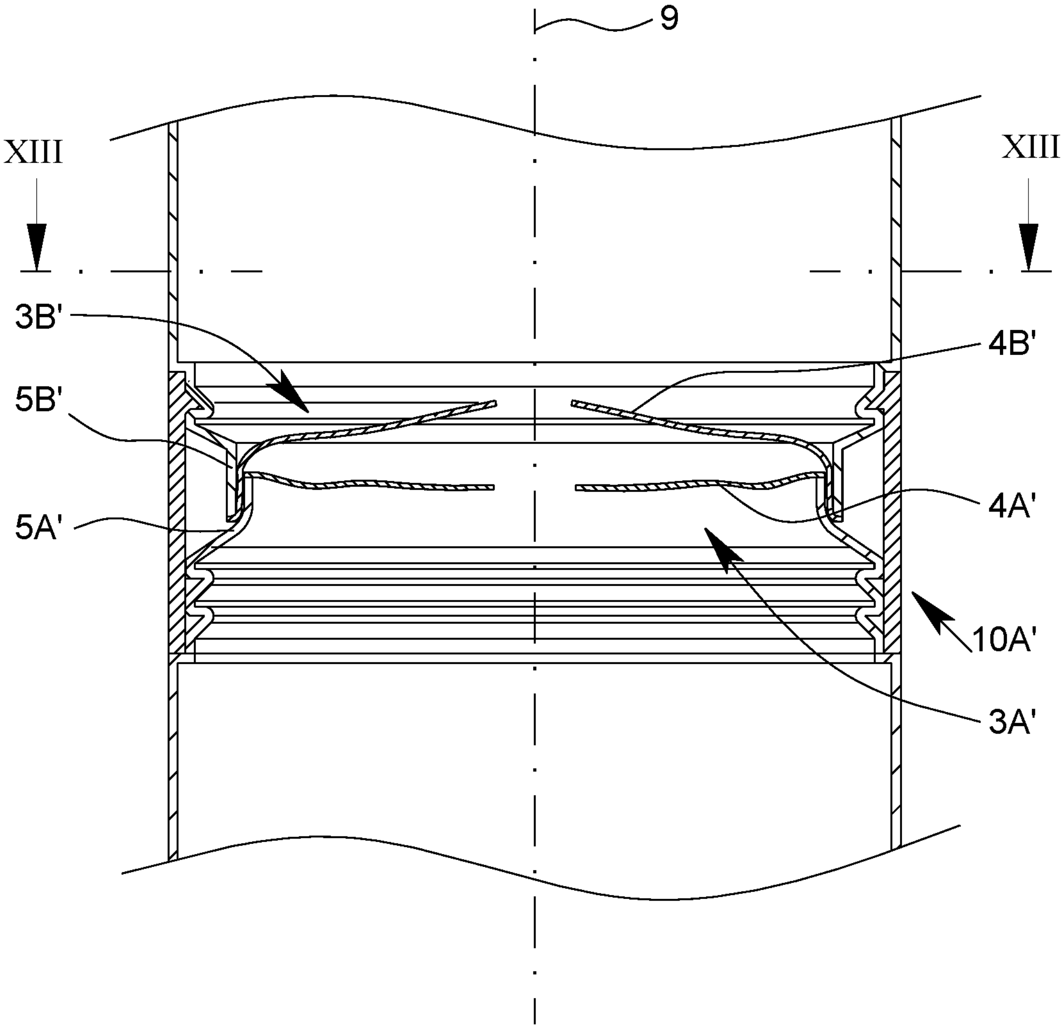
FIG. 8 shows a longitudinal section through the proposed connecting system in the second embodiment in the second connecting position with the connecting arrangements rotated relative to one another about a common axis.

In the embodiment shown in FIG. 8 the mouth-like portions 5A', 5B' are similar, particularly with reference to a circumferential line radially of the central axis or axis of symmetry 9, particularly so that after the first mouth-like portion 5A' has been inserted or pushed into the second mouth-like portion 5B' they rest loosely or with play on one another or at least partially abut directly on one another particularly at least at two points which are opposite one another in respect of the central axis or axis of symmetry 9 and/or at least 20%, preferably at least 50% of the respective circumferential line.

Because of the rotationally asymmetrical or non-round form of the mouth-like portions 5A, 5B, the rotation indicated by the rotation arrows 11 results in force which has a deforming effect on the first connecting arrangement 3A', particularly the mouth-like portion 5A' thereof. In the embodiment shown, the mouth-like portions 5A', 5B' are oval in cross section. This has proved particularly advantageous as it ensures that during rotation the mouth-like portions 5A', 5B' slide past one another without snagging and ensures at least substantially continuous deformation of the mouth-like portion 5B' of the second connecting arrangement 3B' during the rotation of the connecting arrangements 3A', 3B' relative to one another. However, other rotationally asymmetrical or non-round cross sections are also possible, such as rectangles, polygons, triangles or the like.

FIG. 12 shows, in a schematic section through the connecting system 1, particularly in the second connecting position, the mouth-like portions 5A', 5B' in a position rotated through about 45° to one another. The respective mouth-like portions 5A', 5B' generate forces on one another so as to produce deformation of the mouth-like portion 5B' of the second connecting arrangement 3B' and, preferably at the same time, a, particularly corresponding, deformation of the mouth-like portion 5A' of the first connecting arrangement 3A'. As indicated by the broken lines 12, the deformation of the mouth-like portion 5B' leads to tensile and/or pressure stresses on the opening region 4B' and, preferably, as a result, leads to fracture or opening.

FIG. 13 shows a schematic section through the connecting system 1 as proposed, in which the first connecting arrangement 3A' has been rotated through at least substantially 90° relative to the second connecting arrangement 3B'. Compared with the rotation through about 45° as shown in FIG. 12, the increasing rotation of the connecting arrangements 3A', 3B' relative to one another increases the tension or pressure and/or tensile stress on the opening region 4B' such that the opening region 4B' tears, breaks, becomes detached (at the edges) or opens in some other way.

The connecting system 1 according to the second embodiment preferably comprises a guide 18A, 18B (cf. FIGS. 9 and 10) for connecting the connecting arrangements 3A', 3B' in a rotationally oriented position or for determining a rotational position during the connection thereof. In particular, a sliding guide or the like is provided by means of which the connecting arrangements 4A', 4B' or the mouth-like portions 5A', 5B' can only be fitted, placed or pushed into one another in certain rotational positions (with respect to the central axis or axis of symmetry 9), preferably such that the mouth-like portions 5A', 5B' are similarly oriented.

The mouth-like portion 5A', 5B' are similarly oriented particularly when main axes, longitudinal axes, transverse axes, ends, corners and/or the like coincide with one another at least substantially, particularly such that the first mouth portion 5A' can be pushed into the second mouth portion 5B' at least substantially without any deformation of the mouth portions 5A', 5B'.

The guide 18A, 18B is preferably configured such that in the (second) connecting position or after the attachment of the connecting arrangements 3A', 3B' or after the mouth-like portions 5A', 5B' have been inserted or pushed into one another, it is possible to rotate these relative to one another, particularly about the central axis or axis of symmetry 9. In particular, the guide 18A, 18B comprises a slide or a portion which extends axially or parallel to the central axis or axis of symmetry 9 and, thereafter, has a radially extending portion, resulting in the rotational movement described above. However, other solutions are also possible.

The aspects of the first and second embodiment can also be combined with one another. Thus, it is additionally possible for the second connecting arrangement 3B, 3B' to comprise a severing element 7 which at least partially opens the opening region 4A, 4A' of the first connecting arrangement 3A, 3A' when the connecting arrangements 3A, 3A', 3B, 3B' are placed inside one another. The mouth-like portion 5A, 5A' can then be used to open, particularly to pierce, the opening region 4B' of the second connecting arrangement 3A, 3B'. Rotation of the connecting arrangements 3A, 3A', 3B, 3B' relative to one another about the central axis or axis of symmetry 9 then leads to deformation of one or both mouth-like portions 5A, 5A', 5B, 5B'. This leads to tensioning of the opening region or regions 4A, 4A', 4B, 4B'. In this way, further breaking and/or tearing of the opening region or regions 4A, 4A', 4B, 4B' can advantageously be achieved, as a result of which the fluidic connection 2 can be improved or the hydraulic cross section of the fluidic connection 2 can be enlarged.

The connecting arrangements 4A, 4A', 4B, 4B' are preferably configured for mutual opening and/or to complement and/or correspond to one another, so that the continuous fluidic connection 2 can be produced.

The connecting arrangements 3A, 3A', 3B, 3B' are preferably configured in order to produce a hydraulic cross section of more than 0.5 $cm^2$, preferably more than 1 $cm^2$ when producing the fluidic connection 2. This permits rapid and total mixing.

The connecting arrangements 3A, 3A', 3B, 3B' are preferably adapted to be axially inserted in one another, fitted into one another and/or formed without threads. This allows rapid and simple production of the fluidic connection 2.

By the production of the fluidic connection 2, the fluidic connection 2 preferably forms a passage between the containers B1, B2, B3 which is sealed off from the environment. This prevents the ingress of foreign substances or germs.

The second connecting arrangement 3B, 3B' is preferably configured to open the first connecting arrangement 3A, 3A' by breaking through the first opening region 4A, 4A' and/or the first connecting arrangement 3A, 3A' is configured to open the second connecting arrangement 3B, 3B' by breaking through the second opening region 4B, 4B'. By mutual destruction of the opening regions 4A, 4A', 4B, 4B' it is advantageously possible to produce an irreversible fluidic connection 2 of large enough diameter to allow rapid mixing.

The connecting system 1 is preferably self-sealing, as a result of the production of the fluidic connection 2, in particular with at least one of the opening regions 4A, 4A', 4B, 4B' having a sealing action as a result of or after the production of the fluidic connection 2, so that the continuous fluidic connection 2 forms a passage sealed off from the environment. Preferably, the production of the fluidic connection 2 forms a fluidic passage which is sealed off from the environment, particularly in fluid-tight, germproof and/or gas-tight manner.

For this purpose one of the opening regions 4A, 4A', 4B, 4B' or a device forming the respective opening region, after being perforated or otherwise destroyed as a sealing element, particularly a sealing lip, may extend between the connecting arrangements 3A, 3A', 3B, 3B' and in this way seal the connecting arrangements 3A, 3A', 3B, 3B' with one another or relative to one another.

The connecting system 1 is preferably self-sealing in sterile or sterilizable manner as a result of the production of the fluidic connection 2. In particular, the production of the fluidic connection 2 produces a seal which prevents the ingress of germs.

Preferably, in order to seal the connecting arrangements 3A, 3A', 3B, 3B' relative to one another, a seal, particularly a sealing ring or sealing lip, is provided.

Particularly preferably, in order to seal the fluidic connection 2, preferably from the environment, or to seal off the fluidic passage, at least one opening region 4A, 4A', 4B, 4B', preferably the second opening region 4B, 4B', acts as a seal, as a result of or after the formation of the fluidic connection 2.

In particular, it is envisaged that the at least one opening region 4A, 4A', 4B, 4B', preferably the second opening region 4B, 4B', has a sealing effect or acts as a seal at least at the edges or forms the sealing ring or the sealing lip when the fluidic connection 2 has been made. Alternatively, or additionally, it may be envisaged that the at least one opening region 4A, 4A', 4B, 4B', preferably the second opening region 4B, 4B', sealingly abuts on a connecting arrangement 3A, 3A', 3B, 3B', preferably the first or a corresponding connecting arrangement, particularly the mouth-like portion 5A, 5A', 5B, 5B' thereof, when it has been pierced with the mouth-like portion 5A, 5A', 5B, 5B' in order to produce the fluidic connection 2.

At least one opening region 4A, 4A', 4B, 4B', preferably the at least one opening region 4A, 4A', 4B, 4B', is preferably constructed to inhibit cracking around the edges and/or to form a seal and/or it has a material construction or layered structure in the edge region, which differs by comparison with a central portion, so that the edge region is more stable and/or acts as a seal after the edge region has been opened.

The containers B1, B2, B3 of the proposed container system B in the initial state have preferably been produced separately from one another and can be used separately and/or fluidically separated from one another. The connecting arrangements 3A, 3A', 3B, 3B' are preferably each fluidically sealed independently of one another in the initial state. After the fluidic connection 2 has been formed between the containers B1, B2, B3, these containers are preferably inseparably or non-releasably connected.

Figure 14:
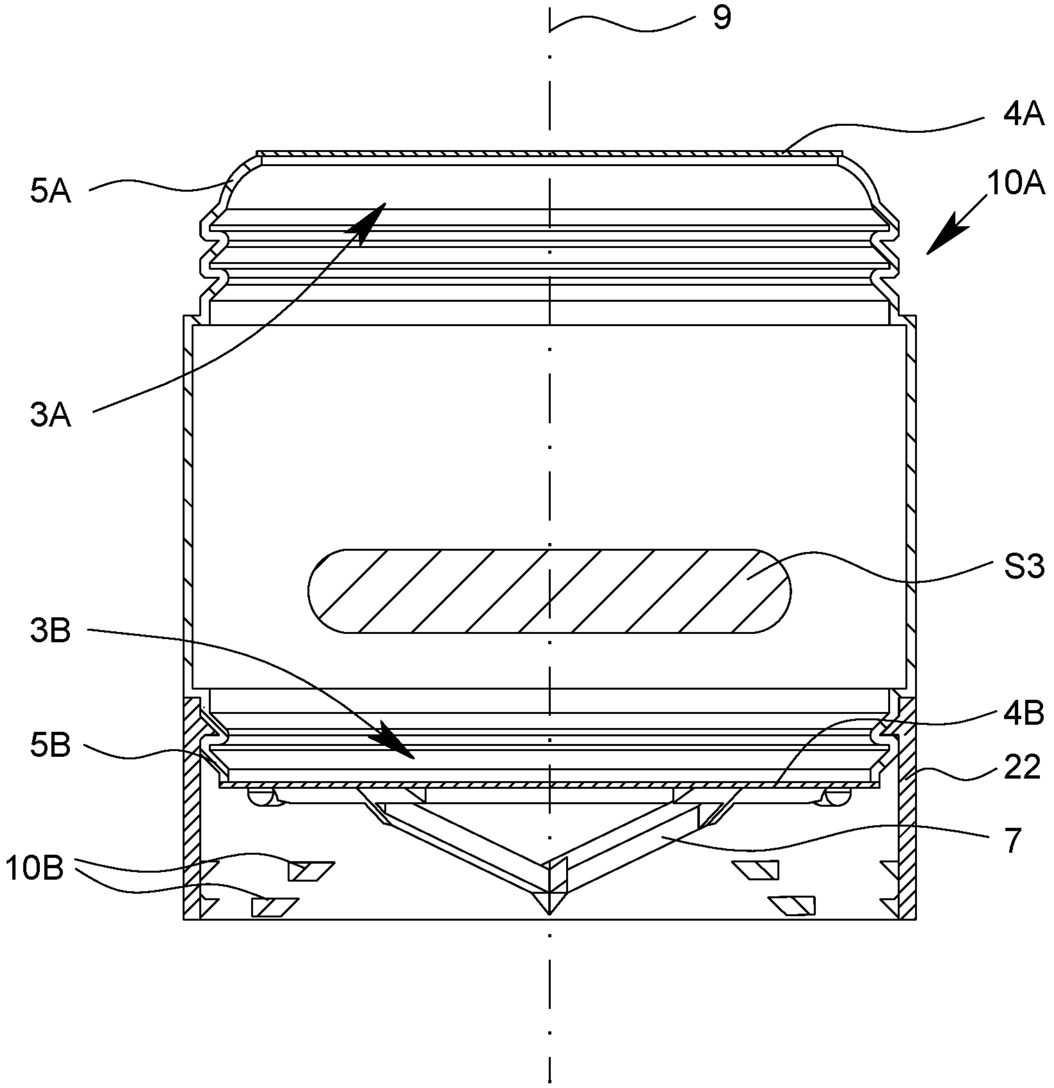
FIG. 14 shows a schematic longitudinal section through a container with connecting arrangements according to the first embodiment on opposite sides.

FIG. 14 shows another container B3, which may also be or form part of the container system B. The container system B preferably comprises the container B3. This has two different, corresponding and/or complementary connecting arrangements 4A, 4A', 4B, 4B'. As a result this container B3 may serve as an adaptor between two other containers B1, B2 and/or may be connected to different containers B1, B2 and/or may allow more than two substances S1, S2, S3 to be mixed.

The container B3 comprises both the first connecting arrangement 3A and the second connecting arrangement 3B on different, preferably opposite, sides. The container B3 thus preferably comprises the first connecting arrangement 3A, 3A', on a first side, and the second of the connecting arrangements 3B, 3B' on a second side remote from the first side. This container is preferably free from removal openings E1, E2.

Moreover, the further container B3 is configured to produce a fluidic connection 2 on both sides by means of the proposed connecting system 1. The further container B3 may comprise or encompass an additional, further substance S3 different from the previous substances S1, S2, particularly a dry or freeze-dried substance (lyophilisate).

A plurality of containers B3 may be joined to one another and/to the first and/or second container B1, B2. In this way, more than three substances S1, S2, S3 may be mixed and/or a combination of more than 3 containers B1, B2, B3 may be formed and/or more than three containers B1, B2, B3 may be fluidically connected to one another.

As already explained in conjunction with FIG. 1, the proposed connecting system 1 is preferably used for fluidically connecting bottles or bottle-like containers B1, B2, particularly for the pharmaceutical sector. It is particularly preferable that the opening regions 4A, 4B, 4A' 4B' should be adapted to be covered in sterile manner for transportation.

Figure 15:
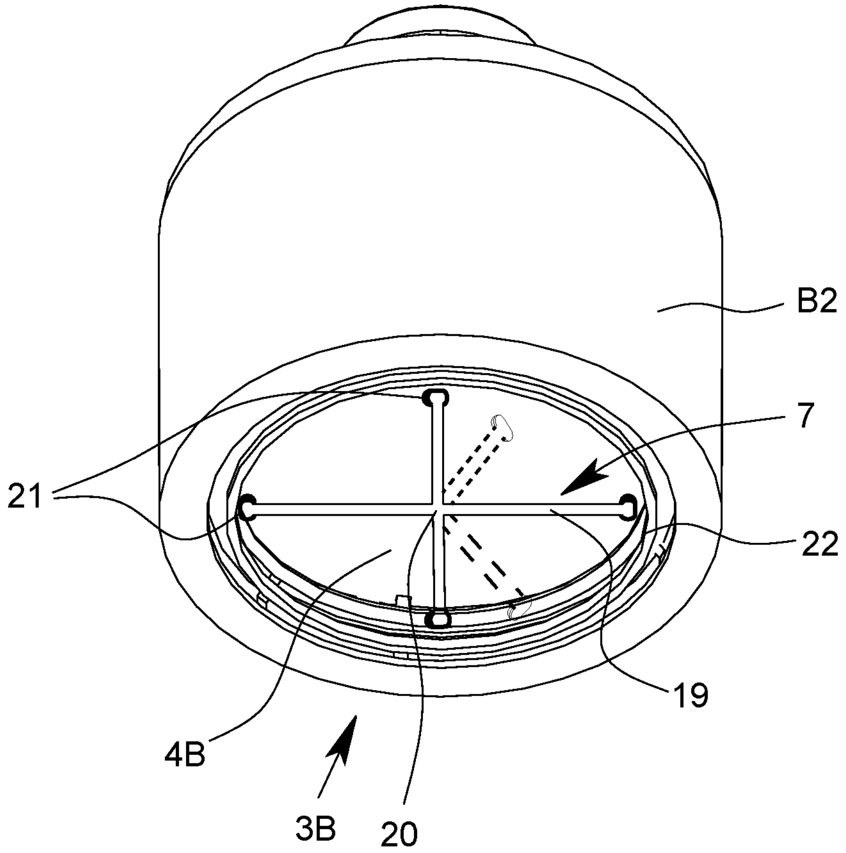
FIG. 15 shows a perspective view of a container with a second connecting arrangement of the proposed connecting system in the first embodiment.

FIG. 15 shows a schematic perspective view of a first connecting arrangement 3A with a severing element 7 arranged on the opening region 4A. In the embodiment shown in FIG. 15 the severing element 7 has four or (in dashed lines) three legs, but may also have more legs 19. The legs 19 are preferably wedge-shaped at least partially or in areas or have cutting edges remote from the opening region 4A. The severing element 7 preferably has a point 20 which is directed away from the opening region 4A. The point 20 preferably adjoins the legs 19 or vice versa. By means of the point 20 and/or the legs 19, shear forces can be increased and the destruction or perforation of the opening region 3B can be facilitated. However, other alternative embodiments for the severing element 7 are theoretically possible.

In the embodiment shown, the severing element 7 comprises preferably foot-like connecting portions 21 with the opening region 4B. These may be configured to derive or distribute a force exerted by the severing element 7, particularly the point 20 or the legs 19, onto the opening region 4A. Alternatively, or additionally, the connecting portions 21 may be provided and arranged so that when the connecting arrangements 3A, 3B are pushed inside one another the mouth-like portion 5B comes to bear on the connecting portions 21 or in the vicinity thereof, as a result of which the shear forces acting on the opening region 4B can be generated or increased. This assists with the opening of the opening region 4A.

The severing element 7 is preferably arranged and/or configured for piercing, severing, cutting or destroying the opening region 4A, 4A' of the first connecting arrangement 3A, 3A'.

The severing element 7 is preferably arranged and/or fastened on the opening region 4B, 4B' of the second connecting arrangement 3B, 3B', particularly directly. Alternatively, or additionally, the severing element 7 is configured to concentrate a force acting on the opening region 4A, 4A' and/or to distribute a force or counter-force acting on the opening region 4B, 4B' such that the opening region 3B of the second connecting arrangement 3B, 3B' remains intact when the opening region 4A, 4A' is opened by destruction thereof by means of the severing element 7.

In another aspect it is envisaged that the severing element 7 comprises one or more connecting portions 21 to which or with which the severing element 7 is connected, preferably by material engagement, with the opening region 4A, 4A', 4B, 4B'.

The connecting portions 21 preferably form frangible points for the opening region 4B, 4B' of the second connecting arrangement 3B, 3B'. Preferably, the connecting portions 21 are arranged to correspond to the first connecting arrangement 3A, 3A', particularly the mouth-like portion 5A, 5A' thereof. Moreover, the connecting portions 21 are preferably configured so that forces acting on the opening region 4B, 4B' of the second connecting arrangement 3B, 3B' are concentrated by the first connecting arrangement 3A, 3A'. This makes it easier to destroy and/or open the opening region 4B, 4B' of the second connecting arrangement 3B, 3B' by means of the first connecting arrangement 3A, 3A', particularly the mouth-like portion 5A, 5A' thereof.

FIG. 16 shows the proposed container system in a transporting position or orientation. The containers B1, B2, B3 are preferably releasably connectable to one another for transporting as a result of a portion or bottle neck F1, F2 of a container B1, B2, B3 that forms the removal opening being adapted to be held by the holding device of the cap-like cover device 6.

The first container B1 is preferably provided with the cover device 6 or the first connecting arrangement 3A, 3A' is covered by the cover device 6. The second container B2 is received and/or held by the cover device 6, preferably in or by means of the region of its removal opening E2 or its bottle neck F2. In this way or by some other means, the containers B1, B2 of the container system may form a kit or a combination which associates the containers B1, B2 with one another. This advantageously makes it possible to avoid unintended combinations of containers B1, B2 or substances S1, S2.

The cover device 6 can preferably be held on the first container B1 and is configured to hold both the region of the removal opening E1, E2 or the bottle neck F1, F2 of the first container B1 and also of the second container B2. In this way the cover device 6 has a triple function, namely for providing a (sterile) cover, for forming a transport combination and as a support foot. The latter will be discussed further hereinafter.

FIG. 17 shows the first container B1 in longitudinal section, the first connecting arrangement 3A being covered, preferably in sterile manner, by the cover device 6. The cover device 6 may be removably held on the container B1 by means of or using one of the securing devices 10A, 10B or by some other means on the first container B1.

One or both opening regions 4A, 4A', 4B, 4B' are preferably covered in sterile or sterilizable manner. One of the opening regions 4A, 4A', 4B, 4B' is preferably separated from the environment in sterile manner by the cap-like cover device 6. An (another) opening region 4A, 4A', 4B, 4B' is preferably separated from the environment in sterile or sterilizable manner by a removable, detachable, tear-off and/or film-shaped closure 14.

A double closure may be formed by the respective opening region 4A, 4A', 4B, 4B' and the respective sterile or sterilizable cover. In this way a sterile or sterilizable or sterile sealed region or space or cavity can be formed between the sterile or sterilizable cover and the respective connecting arrangement 3A, 3A' 3B, 3B'.

The sterile or sterilizable cover is preferably removable. This makes it possible to produce a (sufficiently) sterile fluidic connection 2 through the connecting system 1, by removing the covers and using the opening regions 4A, 4A', 4B, 4B' arranged in the sterile area to form the fluidic connection 2.

In the embodiment shown, the cap-like cover device 6 forms a sterile cover for the first opening regions 4A, 4A' and/or the closure 14 forms a sterile cover for the second opening region 4B, 4B' by means of a sealed or welded-on or otherwise tightly applied film. Theoretically, however, the sterile covering may also be provided by other means, for example, by replacing the film with a cap or a (screw) closure, optionally with a seal or the like, and/or by constructing the cover device 6 without holding means or with a different holding device.

Sterile in the sense of the present invention denotes, in particular, at least substantially germ-free or aseptic. A sterile or sterilizable cover is preferably a device designed to prevent the penetration of germs, particularly by forming a germproof barrier.

From the construction point of view a sterile or sterilizable cover is preferably tightly applied or connected to the respective connecting arrangement 3A, 3A' 3B, 3B' so as to form a germproof barrier.

A cover is sterilizable particularly when the cover uses materials, or the sterile or sterilizable cover comprises or is formed from materials, which are suitable for the use of at least one method of sterilization known in the prior art for destroying germs. For example, such materials may be sterilized by one of the known sterilization methods without being damaged thereby or losing their function as a barrier against the ingress of germs. The known sterilization methods include irradiation, particularly with gamma rays or an electron beam, gassing, treatment with hot air or autoclaving. Preferably, the connecting arrangements 3A, 3A'. 3B, 3B' are also sterile or sterilizable.

The opening regions 4A, 4A', 4B, 4B' are preferably produced independently of one another or separately from one another in an initial state and/or are covered in sterile or sterilizable manner separately from one another. This enables the containers B1, B2, B3 to be used separately.

Between the opening region 4A, 4A', 4B, 4B' and the sterile or sterilizable cover or means for sterile covering, particularly the cover device 6 and/or the closure 14, a space is preferably formed which is sterilized, sterilizable and/or sealed in sterile manner in an initial state or sealed off to be airtight and/or germproof.

According to another aspect of the present invention which can also be implemented independently, a substance, particularly an active substance, vaccine and/or adjuvant is arranged, attached and/or immobilized in the space. In particular, the substance is arranged in a lattice in the space and/or held by the severing element 7.

In a preferred aspect the severing element 7 or another part of one of the connecting arrangements can be dissolved, solubilized and/or suspended within the space. In this way, after the fluidic connection 2 has been made, the substance from the space may form part of the mixture of substances S1, S2, S3.

The substance arranged in the space may be dissolved and/or solubilized and/or suspended on the connecting arrangement 3A, 3B, 3A', 3B' or on the opening region 4A, 4A', 4B, 4B' by means of one of the substances S1, S2, S3.

In a preferred aspect, a lyophilisate is dried onto or otherwise applied to the opening region. The lyophilisate as well as one or more of substances S1, S2, S3 may contain vaccine, active substance, and/or adjuvant for preparing a vaccine or combined vaccine. In this way, after the production of the fluidic connection 2, the substance arranged in the space may form a component of a substance mixture, particularly a combined vaccine.

The means for sterile covering, particularly the cover device 6 and/or the closure 14, are preferably removable or detachable, particularly manually or without the use of tools, so that the opening regions 4A, 4A', 4B, 4B' are accessible for producing the fluidic connection 2.

One of the containers B1, B2, B3 preferably comprises, on a side remote from the removal opening E1, E2, the removable cap-like cover device 6 which in a starting position closes off the connecting arrangement 3A, 3A', 3B, 3B', preferably in sterile manner.

The cap-like cover device 6 preferably comprises a holding device for a removal opening E1, E2 or a bottle neck F1, F2. A holding device, particularly the receptacle 13, is preferably configured for holding a portion of a container B1, B2, B3, particularly the bottle neck F1, F2, forming the removal opening E1, E2, E3.

The cover device 6 preferably comprises a holding portion which is shaped like a shoulder and/or to correspond to or complement a shoulder region of the container B1, B2 adjacent to the removal opening E1, E2.

In the embodiment shown the cover device 6 preferably comprises the receptacle 13 which is configured to receive and/or retain, preferably by interlocking or latching engagement, the bottle neck F1, F2 of the container or containers B1, B2.

The cover device 6 is preferably embodied as a holder or stand for the container or containers B1, B2. For this purpose the removal opening E1, E2 or the bottle neck F1, F2 can preferably be inserted in the cover device 6. In particular, the receptacle 13 is configured for clamping and/or latching and/or releasably holding the container or containers B1, B2, preferably in the region of the removal opening E1, E2 and/or the bottle neck F1, F2. This advantageously allows reliable operation as a foot or stand and/or for holding or forming the kit or combination of containers B1, B2, particularly bottles, of the container system B.

The cover device 6 preferably serves as a base or standing surface for one of the containers B1, B2, particularly the first container B1, if its opening region 4A is covered by the cover device 6. It may be provided that the receptacle 13 is arranged at the bottom in a starting position and/or is accessible from outside. This has the additional advantage that the containers B1, B2 can be stacked by placing the first container B1 comprising the cover device 6 with the receptacle 13 onto the second container B2 in such a way that its removal opening E2 or bottle neck F2 is pushed into the receptacle 13 and preferably held, particularly by latching and/or clamping. In this way a kit can be produced in which the containers B1, B2 are releasably joined together, thus helping to prevent incorrect packing and erroneous mixing of substances using the connecting system 1.

Figure 18:
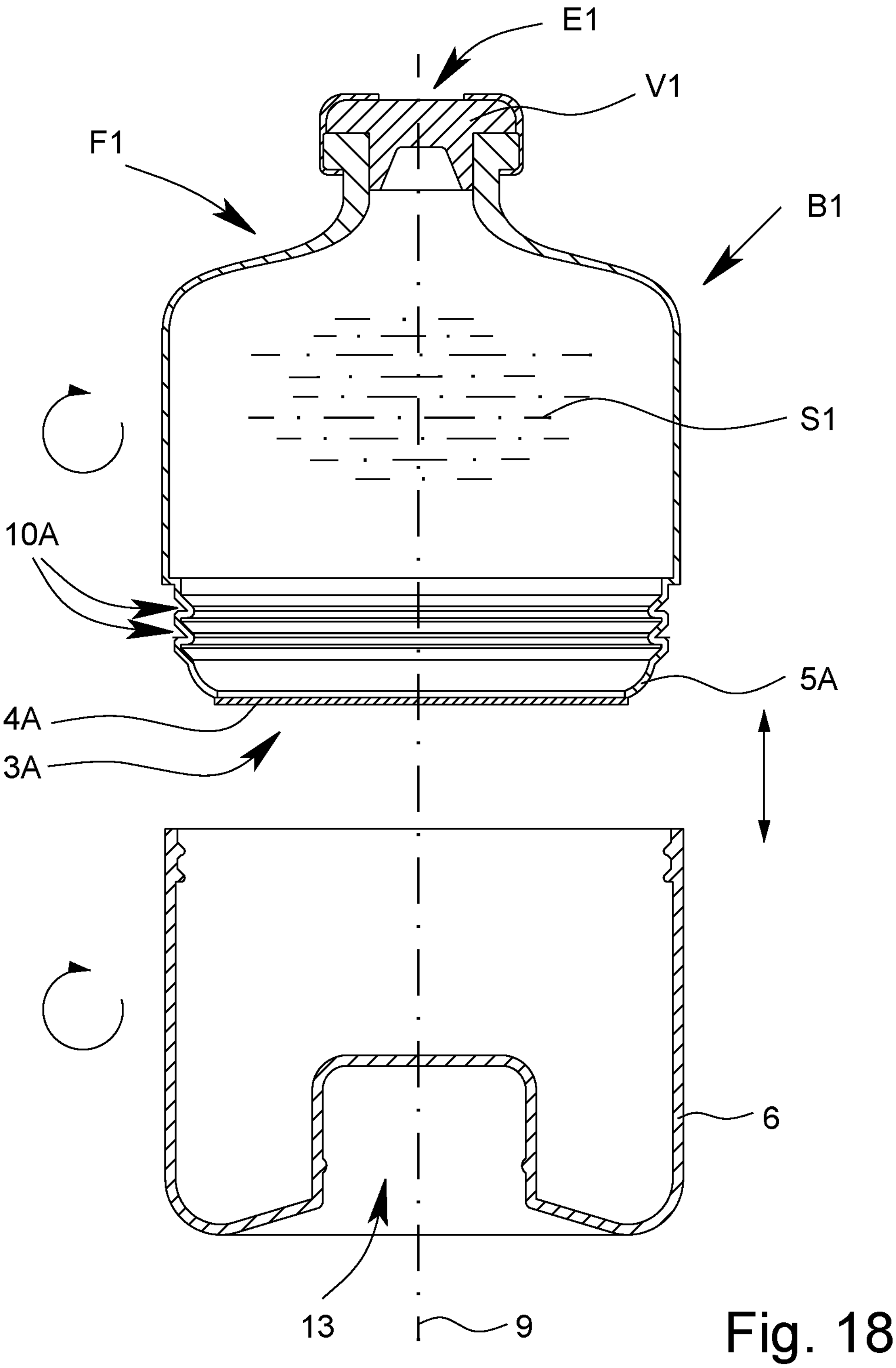
FIG. 18 shows a schematic longitudinal section through the first container according to FIG. 17 with the cover device removed.

For using the proposed connecting system 1 it may be envisaged that first of all the cover device 6 is separated or removed from the first container B1 (cf. FIG. 18).

Figure 19:
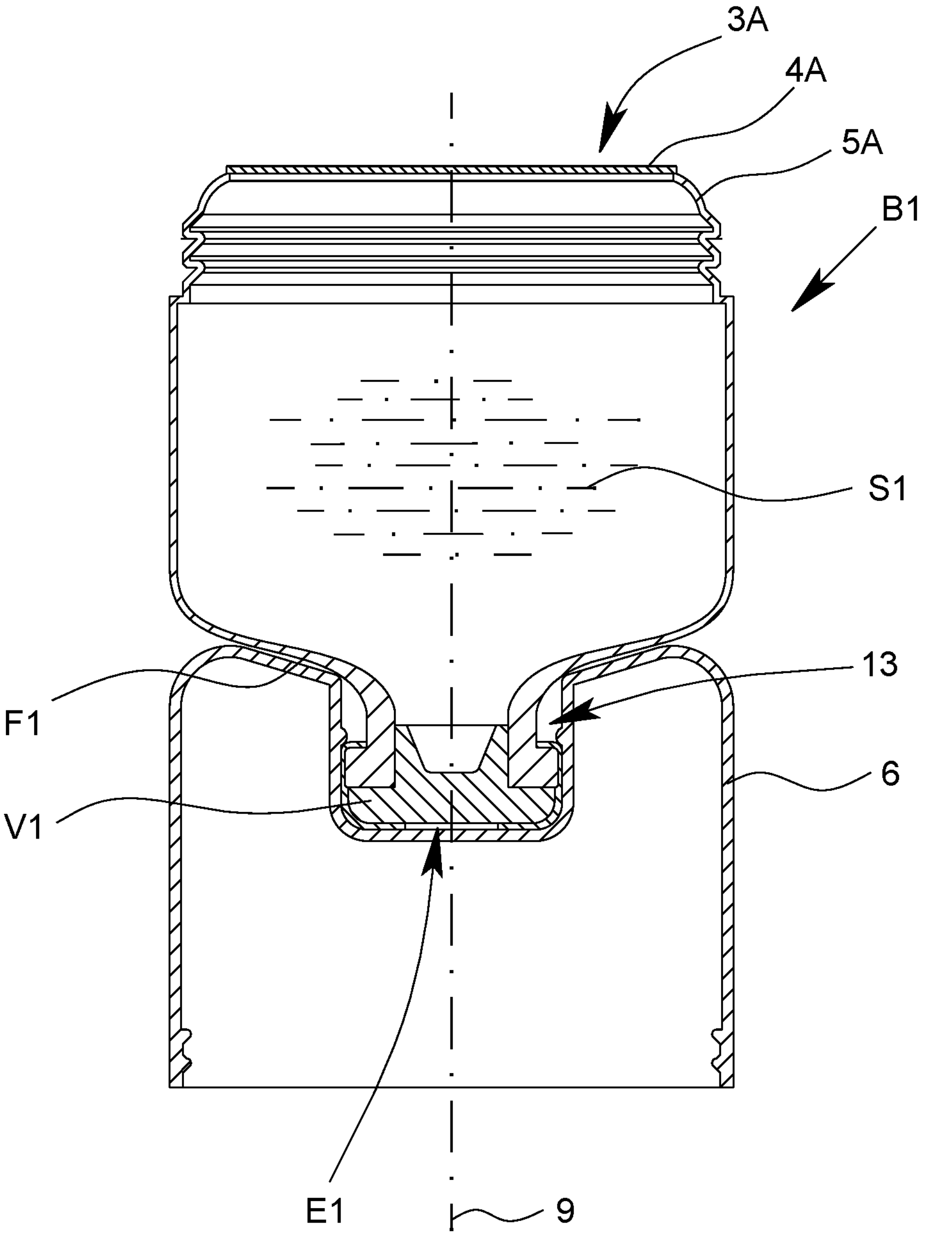
FIG. 19 shows a schematic longitudinal section through the first container held like a foot in the cover device according to FIG. 17.

As shown in FIG. 19, by way of example, the first container B1 (or alternatively the second container B2) is then preferably inserted with the removal opening E1, E2 or the bottle neck F1, F2 or a part thereof in the receptacle 13 of the cover device 6. For this purpose the cover device 6 may be used with the opening of the receptacle 13 directed upwards in the position of use, the removal opening E1, E2 or the bottle neck F1, F2 being pushed into the receptacle 13 at least partially from above in the position of use. Theoretically, however, it is also possible to insert the container B1, B2 into the receptacle 13 in other positions. Preferably, the cover device 6 is then used as a holder or foot or at the bottom in the position of use. Thus the first connecting arrangement 3A or its opening region 4A is accessible from above in the position of use.

The cover device 6 can be used as a standing foot for the container B1, B2, B3 if the container B1, B2, B3 is held by the holding device or receptacle 13 with the portion forming the removal opening E1, E2 or the bottle neck F1, F2.

The cover device 6 thus preferably forms a holder or foot for the container B1, B2 which is held by the cover device 6. The dual function of the cover device advantageously saves space and material and additionally using the cover device 6 as a holder or foot advantageously prevents contamination of the connecting arrangements 3A, 3A', 3B, 3B'.

The cover device 6 is preferably of cap-like formation and in a starting or transporting position it forms a tight seal with the connecting arrangement 3A, 3A', 3B, 3B', so as to produce a sterile or sterilizable closure.

The cover device 6 preferably comprises the receptacle 13 and a holding portion for holding onto the connecting arrangement 3A, 3A', 3B, 3B' on different sides, particularly opposite sides. The holding portion may have a region which is releasably fixed or fixable to the connecting arrangement 3A, 3A', 3B, 3B' by a clamping and/or latching action. For this purpose the cover device 6 in the holding portion and the connecting arrangement 3A, 3A', 3B, 3B' may be of complementary or corresponding construction.

The cover device 6 is preferably made of plastics or contains plastics. The cover device 6 is preferably a thermoformed part or an injection molded part and/or a shaped part produced from a sheet material. The cover device 6 preferably has a wall thickness of more than 1 mm and/or less than 2 mm. However, other solutions are also possible here.

In the embodiment shown, the cover device 6 is essentially in the shape of a W or U in longitudinal section, with an indentation in the curve of the U which forms the receptacle 13. In principle, however, the cover device 6 may also be formed differently for the dual function of a sterile closure on the one hand and a holding device on the other.

Figure 20:
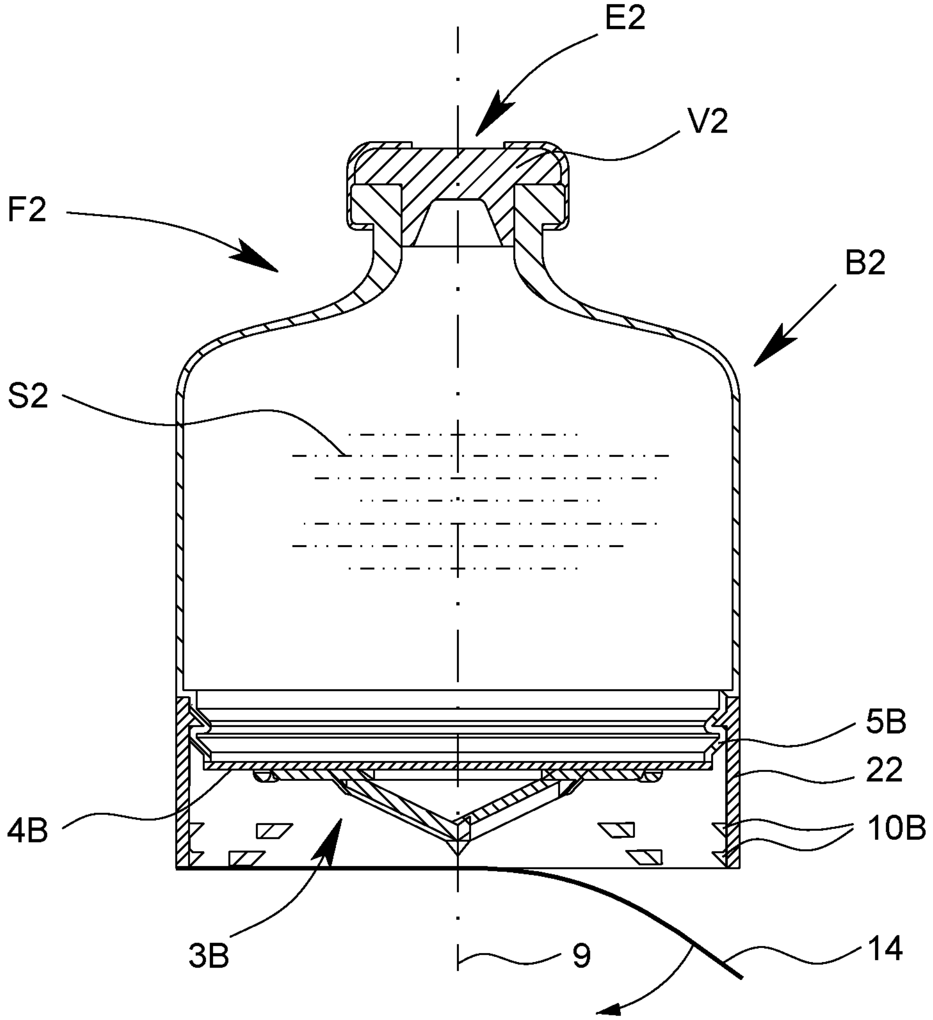
FIG. 20 shows a schematic longitudinal section through the second container with the closure partially removed.

FIG. 20 shows the second container B2 in which the opening region 4B is closed off, particularly in sterile manner, by the closure 14, particularly a removable cover, film, sealing film or the like. Preferably the closure 14 is removable, particularly by pulling off, in order to use the proposed connecting system 1. The closure 14 may have a tab for this purpose.

At least one of the connecting arrangements 3A, 3A', 3B, 3B', specifically the second connecting arrangement 3B, 3B' in the embodiment shown, preferably has a receptacle for another one of the connecting arrangements 3A, 3A', 3B, 3B' which may preferably be formed by a collar-like portion 22 or alternatively, or additionally by some other means. The collar-like portion 22 may assist with fitting the connecting arrangements 3A, 3A', 3B, 3B' into one another, guide the required movement and/or protect the connecting arrangements 3A, 3A', 3B, 3B' at the sides. It preferably comprises the securing devices 10A, 10B or parts thereof.

Preferably, one of the connecting arrangements 3A, 3A', 3B, 3B', particularly the second connecting arrangement 3B, 3B', is surrounded by the collar-like portion 22 in the (first and/or second) connecting position.

The collar-like portion 22 preferably serves to receive the (respectively) other connecting arrangement 3A, 3A', 3B, 3B' or to form a receptacle and/or guide, preferably a linear guide for this purpose, particularly in the direction of the central axis or axis of symmetry 9.

In the embodiment shown the collar-like portion 22 is provided on or around the second connecting arrangement 4B, 4B' or on the second container B2. Alternatively, or additionally, however, the collar-like portion 23 may also be provided around the first connecting arrangement 4A, 4A' or on the first container B2.

The collar-like portion 22 is preferably fixedly, rigidly and/or non-rotationally connected to a or the associated connecting arrangement 3A, 3A', 3B, 3B', preferably by interlocking engagement, particularly by latching, and/or by frictional engagement, particularly by clamping, and/or by material connection, particularly by adhesive bonding or injection molding, but alternatively also by being formed in one piece with one of the connecting arrangements 3A, 3A', 3B, 3B' or containers B1, B2.

The collar-like portion 22 preferably projects beyond the mouth-like portion 5A, 5B, 5A', 5B' and/or extends at least partially parallel thereto or in the same direction and preferably thereby forms the receptacle or linear guide for the other one of the connecting arrangements 3A, 3A', 3B, 3B'.

The collar-like portion 22 or the receptacle that may be formed by it preferably at least partially comprises the guide 18A, 18B, particularly the slide, a guide pin or the like.

An open edge of the collar-like portion 22 preferably forms a stop for those of the connecting arrangements 3A, 3A', 3B, 3B' which it does not surround in the separated state of the connecting arrangements 3A, 3A', 3B, 3B' and/or for the container B1 connected thereto. Preferably in the second connecting position the connecting arrangements 3A, 3A', 3B, 3B' abut on one another in the region of the stop.

The collar-like portion 22 is preferably closed off, particularly in sterile manner, at one end or on an open side by the closure 14, particularly a film applied as a seal.

Figure 21:
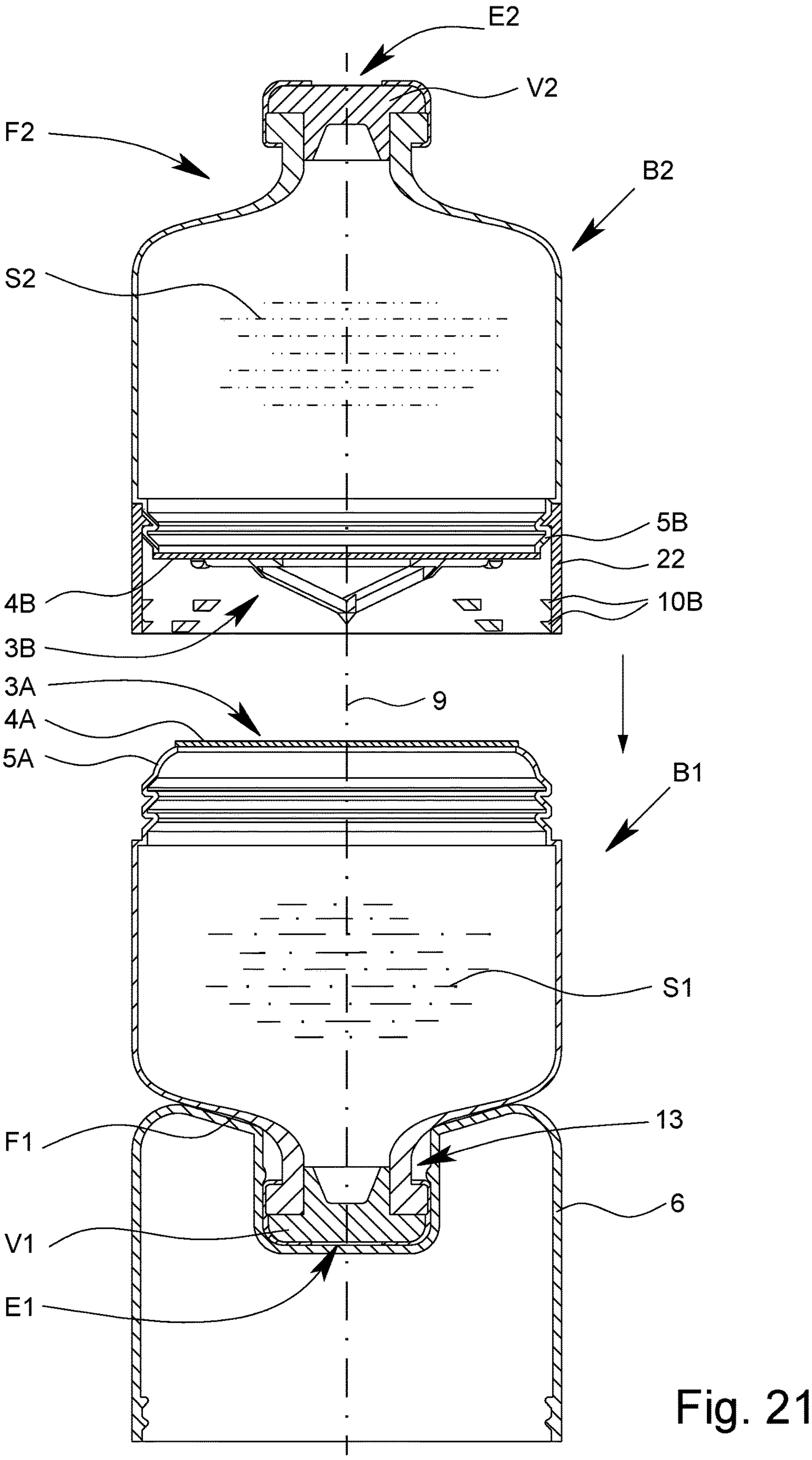
FIG. 21 shows a schematic longitudinal section through the proposed container system, indicating the direction of movement for providing the fluidic connection with the proposed connecting system.

FIG. 21 shows by way of example how the containers B1, B2 can be fluidically connected to one another by the proposed connecting system 1. For this purpose the closure 14 is preferably removed from the second container B2 and the second container B2 is then placed with the second connecting arrangement 3B, 3B' onto the first connecting arrangement 3A, 3A' from above. In the embodiment shown the first connecting arrangement 3A, 3A' extends into the receptacle formed by the collar-like portion 22.

Then the opening regions 4A, 4A', 4B, 4B' are opened. By combining the connecting arrangements 3A, 3B, which form, in particular, base regions of the bottles or bottle-like containers B1, B2, the fluidic connection 2 can be produced, as already explained in relation to FIGS. 2 to 8. FIG. 21 shows the first embodiment but the same also applies to the second embodiment and the combination of embodiments.

According to another aspect of the present invention which can also be implemented independently, the connecting system 1 or the connecting arrangements 3A, 3B, 3A', 3B' are specific to a particular size of container.

In particular, a proposed container system B comprises containers B1, B2, B3 of different sizes, volumes and/or with specific quantities of substance S1, S2, S3 for producing a desired mixing ratio. For this it is preferable for the connecting arrangements 3A, 3B, 3A', 3B' to be selectively configured (mechanically) such that containers B1, B2, B3 with compatible contents can be connected and containers B1, B2, B3 with incompatible contents, or containers B1, B2, B3 which would lead to an undesirable or unsuitable mixing ratio if a fluidic connection 2 were produced, have connecting arrangements 3A, 3B, 3A', 3B' which are mechanically incompatible with one another.

Particularly preferably, the connecting arrangements 3A, 3B, 3A', 3B' may be constructed selectively with respect to one another, particularly according to the lock and key principle. This can be achieved using guides 18A, 18B, guiding slides, diameters or the like which are compatible or incompatible with one another, respectively.

The aspects of the present invention described in connection with FIGS. 16 to 21 may be advantageous on their own and in various combinations, preferably wholly or partially or in certain details in the sequence of the explanations. In particular, the cover device 6 is preferably removed and used as a holder or foot before the second connecting arrangement 3B is opened or unsealed, particularly by removal of the closure 14.

Moreover, FIGS. 16 to 21 show the connecting arrangements 3A, 3B of the first embodiment. Instead of these, however, it is also possible to use the connecting arrangements 3A', 3B' of the second embodiment or a combination of the first connecting arrangements 3A, 3A' and the second connecting arrangements 3B, 3B'. The aspects explained then apply accordingly.

The fluidic connection 2 may thus alternatively, or additionally be produced by deformation. In this case the severing element 7 is optional and the collar-like portions 22 are preferably non-round in cross section, so that when the connecting arrangements 3A, 3B, 3A', 3B' are rotated relative to one another the fluidic connection 2 is produced by shaping or deformation. In the interests of clarity, the corresponding procedure will not be repeated here.

Further aspects of the present invention which may be implemented separately and combined with one another and/or may be implemented with aspects and features of the present invention as explained hereinbefore and which are advantageous will be described in more detail hereinafter.

An aspect of the present invention which can be implemented independently, or in conjunction with one or more of the preceding aspects, relates to a connecting system 1 for producing a fluidic connection 2, preferably between containers B1, B2, B3, wherein the connecting system 1 comprises at least two connecting arrangements 3A, 3A', 3B, 3B' configured to form the fluidic connection 2, namely a first connecting arrangement 3A, 3A' and a second connecting arrangement 3B, 3B', which, in an initial state, are each fluidically sealed and are sealed independently of one another, the connecting arrangements 3A, 3A', 3B, 3B' being capable of insertion in one another and/or being adapted to be inserted in one another by a preferably at least substantially linear and/or axial movement along a common axis, by means of which at least one of the connecting arrangements 3A, 3A', 3B, 3B' can be opened.

In particular, the fluidic connection 2 is formed by an insertion process. This is advantageously carried out, for example, by producing the fluidic connection 2 particularly quickly and reliably, in particular without the need for repeated rotation of the connecting arrangements 3A, 3A', 3B, 3B' by means of a helical line with a number of turns or by means of a thread.

The insertion of the connecting arrangements 3A, 3A', 3B, 3B' into one another also allows the connecting arrangements 3A, 3A', 3B, 3B' to be brought together in a manner oriented with one another in relation to the position of rotation about the (common) axis of symmetry or central axis 9, which is particularly advantageous if the mouth portions 5A, 5A', 5B, 5B' of the connecting arrangements 3A, 3A', 3B, 3B' are non-round in cross section or the opening of at least one of the connecting arrangements 3A, 3A', 3B, 3B' is produced by deformation and the resultant tensioning of an opening region 4A, 4A', 4B, 4B'.

An aspect of the present invention which can also be implemented independently or in conjunction with one or more of the preceding aspects relates to a connecting system 1 for producing a fluidic connection 2, preferably between containers B1, B2, B3, wherein the connecting system 1 comprises at least two connecting arrangements 3A, 3A', 3B, 3B' configured to produce the fluidic connection 2, namely a first connecting arrangement 3A, 3A' and a second connecting arrangement 3B, 3B', which are fluidically sealed off in a starting state, the first connecting arrangement 3A, 3A' having an in particular film-shaped, brittle and/or unstable opening region 4A, 4A', 4B, 4B', being deformable outside the opening region 4A, 4A', 4B, 4B' and being configured so that the deformation causes opening of the first connecting arrangement 3A, 3A', 3B, 3B' in the opening regions 4A, 4A', 4B, 4B'.

An aspect of the present invention which can also be implemented independently, or in conjunction with one or more of the preceding aspects, relates to one or more containers B1, B2, B3 or vessels which comprise connecting arrangements 3A, 3A', 3B, 3B' in each case.

An aspect of the present invention which can also be implemented independently or in conjunction with one or more of the preceding aspects relates to a connecting system 1 for producing a fluidic connection 2, preferably between containers B1, B2, B3, the connecting system 1 having at least two connecting arrangements 3A, 3A', 3B, 3B' configured to produce the fluidic connection 2, the connecting arrangements 3A, 3A', 3B, 3B' each comprising an opening region 4A, 4A', 4B, 4B' which is fluidically closed in a starting state, particularly in the manner of a film, or is brittle, fragile and/or unstable, the opening regions 4A, 4A', 4B, 4B' each being covered in sterile or sterilizable manner.

In particular, the opening or formation of the fluidic connection 2 is thus achieved by the fact that the opening region 4A, 4A' of the first connecting arrangement 3A, 3A' is or forms a frangible point, so that deformation of the first connecting arrangement 3A, 3A', particularly by tensioning, leads to tearing or breaking of the opening region 4A, 4A'. This has the particular advantage that no point or other severing element is required for this opening process. Severing elements 7 usually have to be sharp-edged and stabilized to allow the opening up of an opening region 4A, 4A', 4B, 4B'. Consequently, by avoiding such a severing element, the manufacturing process can use gentler materials and/or be simpler. As already explained hereinbefore, however, a combination of the above aspects using a severing element 7 is also possible, while the present aspect is advantageous for enlarging or expanding an opening or the fluidic connection 2.

The sterile or sterilizable covers of the opening regions 4A, 4A', 4B, 4B' advantageously make it possible to produce the fluidic connection 2 while excluding germs or other foreign substances, particularly in the pharmaceutical/medical sector. Alternatively, or additionally, the sterile or sterilizable covering of the opening regions 4A, 4A', 4B, 4B' offers the possibility of using containers B1, B2, B3 with the connecting arrangement 3A, 3A', 3B, 3B' separately from one another in this environment and optionally in combination with one another.

One aspect of the present invention which can also be implemented independently or in conjunction with one or more of the preceding aspects relates to a container system B with at least two containers B1, B2, B3, preferably bottles, and the connecting system 1, wherein the containers B1, B2, B3 for providing a fluidic connection 2 between the containers B1, B2, B3 in each case comprise at least one connecting arrangement 3A, 3A', 3B, 3B' of the connecting system 1.

In this connection, the use of the proposed connecting system 1 for connecting containers B1, B2, B3 has proved advantageous particularly because it is possible to produce a non-releasable and/or irreversible fluidic connection 2 between the containers B1, B2, B3, thus ensuring complete mixing of the contents of the containers B1, B2, B3.

Another aspect of the present invention which can also be implemented independently or in conjunction with one or more of the preceding aspects relates to a container system B with at least two containers B1, B2, B3, preferably bottles, each of which comprises a removal opening E1, E2, preferably each closed off by a septum, while preferably the containers B1, B2, B3 comprise, on a side remote from the respective removal opening E1, E2, particularly on the base of the respective bottle, a connecting arrangement 3A, 3A', 3B, 3B' for providing a fluidic connection 2 between the containers B1, B2, B3 and/or are configured for providing a fluidic connection 2 between the containers B1, B2, B3.

The use of two containers B1, B2, B3, each of which comprises a removal opening E1, E2 and a connecting arrangement 3A, 3A', 3B, 3B', is particularly advantageous because the containers B1, B2, B3 can also be used separately from one another, but at the same time, in the event of joint use by means of the connecting arrangements 3A, 3A', 3B, 3B', a fluidic connection with a relatively large cross-section is made possible for the rapid or accelerated mixing of the contents of the containers B1, B2, B3.

Another aspect of the present invention which can also be implemented independently or in conjunction with one or more of the preceding aspects relates to a method for providing a fluidic connection 2 between connecting arrangements 3A, 3A', 3B, 3B' and/or containers B1, B2, B3 by means of the connecting arrangements 3A, 3A', 3B, 3B', wherein in an initial state the connecting arrangements 3A, 3A', 3B, 3B' are in each case fluidically sealed, wherein a first connecting arrangement 3A, 3A' is opened by another, second connecting arrangement 3B, 3B' and the second connecting arrangement 3B, 3B' is opened by the, thus producing a continuous fluidic connection 2 between the connecting arrangements 3A, 3A', 3B, 3B'.

This results in corresponding advantages, i.e., in particular a rapid and reliable formation of the fluidic connection 2 or mixing of the substances S1, S2, S3.

Another aspect of the present invention which can also be implemented independently or in conjunction with one or more of the preceding aspects relates to a use of a container system B, wherein a first container B1 holds a first substance S1, particularly a first vaccine against a first disease, while a second container B2 holds a second substance S2, particularly a second vaccine against a second disease different from the first, for the preparation of a mixture of substances, particularly for the preparation of a combined vaccine for simultaneous immunization against different diseases, wherein the containers B1, B2, B3 are fluidically connected to one another by means of the connecting arrangements 3A, 3A', 3B, 3B', so that the substances are mixed together, particularly to form the combined vaccine.

The use of the proposed connecting system 1 or container system B for the preparation of combined vaccine is advantageous for example, because the vaccines may be used individually or in combination, as desired. The proposed connecting system 1 or container system B offers the flexibility of deciding on the spot whether the substances S1, S2, S3 or vaccines are to be administered individually or in combination. This advantageously avoids subjecting animals to stress by an unnecessarily large number of separate injections or unnecessarily always having to vaccinate them with a combined vaccine, even when there is no need for one of the vaccines to be given, because of an existing immunity. In this way, the present invention can save materials and costs.

Another aspect of the present invention which can also be implemented independently or in conjunction with one or more of the preceding aspects relates to a method for providing a fluidic connection 2 between connecting arrangements 3A, 3A', 3B, 3B' and/or containers B1, B2, B3 by means of connecting arrangements 3A, 3A', 3B, 3B' of the connecting system 1, wherein preferably the means for sterile covering, particularly the cover device and/or the closure 14, is removed from the opening regions 4A, 4A', 4B, 4B' in each case and the still closed opening regions 4A, 4A', 4B, 4B' thus exposed are opened up to form the fluidic connection 2.

Another aspect of the present invention which can also be implemented independently or in conjunction with one or more of the preceding aspects relates to a method for providing a fluidic connection 2 between connecting arrangements 3A, 3A', 3B, 3B' and/or containers B1, B2, B3 by means of the connecting arrangements 3A, 3A', 3B, 3B', wherein in an initial state the connecting arrangements 3A, 3A', 3B, 3B' are in each case fluidically sealed, while a first connecting arrangement 3A, 3A' is opened by another second connecting arrangement 3B, 3B' and the second connecting arrangement 3B, 3B' is opened by the first connecting arrangement 3A, 3A', thus producing a continuous fluidic connection 2 between the connecting arrangements 3A, 3A', 3B, 3B'.

In another aspect which may thus be implemented independently, the present invention relates to a kit with two proposed containers B1, B2, B3 or with containers B1, B2, B3, which can be fluidically connected to one another by means of the connecting system 1, so that a mixture of the substances S1, S2, S3 contained in the containers B1, B2, B3 can be formed. This prevents other, incompatible substances S1, S2, S3 from being mixed.

A kit in the sense of the present invention is particularly a combination and/or system comprising the first container B1 and the second container B2, which form the components of the kit. The kit may also comprise the third container B3 and/or further containers or components.

The components of the kit are preferably marketed as a set, particularly in a joint pack or the like. However, it is also possible for the components to form a loose combination to be used together. A common or connecting component may be provided, for example, a common set of instructions for use, handling recommendations, information in the text on one or more of the components of the kit or the like.

Preferably, the containers B1, B2, B3 form a kit by being held together, particularly preferably by means of the cover device 6 or the receptacle 13.

The containers B1, B2, B3 are preferably designed for the preparation of a combined vaccine for simultaneous immunization against different diseases, preferably by making the containers B1, B2, B3 capable of fluidic connection to one another by means of the connecting arrangements 3A, 3A', 3B, 3B', so that substances S1, S2, S3 located in the containers B1, B2, B3 are mixed together to form the combined vaccine, while in particular the substances S1, S2, S3 can be removed through the removal opening E1, E2 separately from one another and then used, particularly before or without forming the fluidic connection 2.

Preferably, at least one of the containers B1, B2, B3 comprises a removal opening E1, E2, preferably closed off with a septum, while the container B1, B2, B3 is preferably configured, on a side remote from the removal opening E1, E2, particularly on the bottom of the bottle, for providing a fluidic connection 2 between the containers B1, B2, B3 and/or comprises the connecting arrangement 3A, 3A', 3B, 3B'.

The containers B1, B2, B3 are preferably fluidically connected to one another by means of the connecting arrangements 3A, 3A', 3B, 3B', so that the substances are mixed together, preferably forming a combined vaccine.

In another aspect which may thus be implemented independently, the present invention relates to the use of a connecting system 1, kit or container system B as proposed, for the preparation or provision of medicaments for live animals, preferably mammals, and/or for medical uses.

In another aspect which may thus be implemented independently, the present invention relates to the use of a connecting system 1, kit or container system B as proposed, for the preparation and/or provision of a vaccine, particularly for immunizing against the disease(s) Porcine Circovirus Disease “PCVD” and/or Enzootic Pneumonia “EP” or infections with Porcine Circovirus and/or infection with bacteria of the *Mycoplasma* strain, particularly *Mycoplasma hyopneumoniae*, preferably for immunizing against the diseases Porcine Circovirus Disease “PCVD” and Enzootic Pneumonia “EP” or against infections with Porcine Circovirus and/or infection with bacteria of the *Mycoplasma* strain, particularly *Mycoplasma hyopneumoniae*.

For this purpose a first proposed container B1 contains as the first substance S1 a first reactant and a second proposed container B2 contains as the second substance S2 a second reactant. The reactants may be vaccines against different diseases or the educts may contain vaccines against different diseases.

It is particularly preferable for the first reactant to contain only a first one of the components *Mycoplasma* vaccine or *Mycoplasma* antigen and Circovirus vaccine or Circovirus antigen (and optionally other substances). The first reactant may thus contain either *Mycoplasma* vaccine, or one or more *Mycoplasma* antigens or alternatively Circovirus vaccine or one or more Circovirus antigens. The first reactant is preferably stored separately from the second reactant, particularly if the reactants are not stable in the long term together. The second reactant preferably contains only the other one of the components *Mycoplasma* vaccine or one or more *Mycoplasma* antigens and Circovirus vaccine or one or more Circovirus antigens (and optionally other substances). If the first reactant thus contains *Mycoplasma* vaccine or one or more *Mycoplasma* antigens, the second reactant contains Circovirus vaccine or one or more Circovirus antigens, or vice versa.

The *Mycoplasma* vaccine may contain attenuated and/or inactivated bacteria, fragments of bacteria or recombinantly prepared parts of *Mycoplasma hyopneumoniae*, but at least one or more *Mycoplasma hyopneumoniae* antigens. Preferably, the *Mycoplasma hyopneumoniae* antigen originates from the *Mycoplasma hyopneumoniae* J-strain or the inactivated *Mycoplasma hyopneumoniae* bacteria are those of the J-strain. Moreover, the *Mycoplasma* vaccine may be one of the following vaccines or the *Mycoplasma hyopneumoniae* antigen may be the antigen or antigens contains in one of the following vaccines: Ingelvac®MycoFlex (Boehringer Ingelheim Vetmedica Inc, St Joseph, Mo., USA), Porcilis M. hyo, Myco Silencer® BPM, Myco Silencer® BPME, Myco Silencer® ME, Myco Silencer® M, Myco Silencer® Once, Myco Silencer® MEH (all from Intervet Inc., Millsboro, USA) Stellamune *Mycoplasma* (Pfizer Inc., New York, N.Y., USA), Suvaxyn *Mycoplasma*, Suvaxyn M. hyo, Suvaxyn MH-One (all formerly Fort Dodge Animal Health, Overland Park, Kans., USA (now Pfizer Animal Health).

The Circovirus vaccine may contain attenuated and/or inactivated porcine Circovirus, preferably type 2, particularly type 2 ORF2 protein. It is particularly preferable to use recombinantly expressed ORF2 protein of the Porcine Circovirus type 2, preferably expressed in and obtained from in vitro cell culture. Examples of ORF2 proteins of the Porcine Circovirus type 2 are described inter alia in International Patent Application WO2006-072065. These have proved particularly advantageous for effective vaccination. Moreover, the Circovirus vaccine may be one of the following vaccines, or the Circovirus antigen may be the antigen or antigens contained in one of the following vaccines: Ingelvac®CircoFLEX, (Boehringer Ingelheim Vetmedica Inc, St Joseph, Mo., USA), CircoVac® (Merial SAS, Lyon, France), CircoVent (Intervet Inc., Millsboro, Del., USA), or Suvaxyn PCV-2 One Dose® (Fort Dodge Animal Health, Kansas City, Kans., USA).

The Circovirus vaccine, if it contains the ORF2 protein, preferably contains between 2 μg and 150 μg, preferably between 2 μg and 60 μg, more preferably between 2 μg and 50 μg, more preferably between 2 μg and 40 μg, more preferably between 2 μg and 30 μg, more preferably between 2 μg and 25 μg, more preferably between 2 μg and 20 μg, more preferably between 4 μg and 20 μg, more preferably between 4 μg and 16 μg of ORF2 protein per dose to be administered. The Circovirus vaccine is preferably prepared or formulated so that 1 ml of the vaccine corresponds to a dose of 1. In particular, the Circovirus vaccine may contain ORF2 protein in amounts of more than 2 μg/ml, preferably more than 4 μg/ml and/or less than 150 μg/ml, preferably less than 60 μg/ml, 50 μg/ml, 40 μg/ml, 30 μg/ml or 25 μg/ml, particularly less than 20 μg/ml. This contributes to reliability of administration.

The *Mycoplasma* vaccine, if it contains inactivated *Mycoplasma* bacteria, preferably inactivated *Mycoplasma hyopneumoniae* bacteria, preferably contains between $10^3$ and $10^9$ colony forming units (CFU), preferably between $10^4$ and $10^8$ (CFU), more preferably between $10^5$ and $10^6$ (CFU) per dose to be administered, the corresponding CFU being adjusted before the inactivation of the bacteria. The *Mycoplasma* vaccine is preferably prepared or formulated so that 1 ml of the vaccine corresponds to a dose of 1. In particular, the *Mycoplasma* vaccine may contain more than $10^3$ CFU/ml, preferably more than $10^4$ CFU/ml, particularly more than $10^5$ CFU/ml and/or less than $10^9$ CFU/ml, preferably less than $10^8$ CFU/ml, particularly less than $10^7$ CFU/ml or $10^6$ CFU/ml of inactivated *Mycoplasma* bacteria, preferably inactivated *Mycoplasma hyoneumoniae* bacteria, particularly before the inactivation of the bacteria.

At least one of the reactants and/or the vaccine or combined vaccine may contain an adjuvant, preferably a polymeric adjuvant, particularly carbomer. Preferably at least or precisely one of the two reactants, preferably both reactants, contain a quantity of adjuvant of 500 μg to 5 mg, preferably from 750 μg to 2.5 mg, more preferably about 1 mg of adjuvant per dose to be administered. The reactants are preferably prepared or formulated so that 1 ml of the respective reactant corresponds to a dose of 1. The use of an adjuvant, preferably a polymeric adjuvant, such as carbomer, for example, has proved advantageous in relation to the efficiency of immunization or the duration of the effect. However, the use of alternative and/or additional adjuvants is not ruled out.

According to another aspect of the present invention, the first and/or the second and/or the combination of the first and second container B1, B2, B3 with the fluidic connection 2 provided may be configured for use in or with an injection device, and/or used therein. In particular, it is an injection device which can be reused repeatedly, for example, an injection gun, a pressure injector and/or a self-filling syringe, of the kind used for vaccinating large herds of animals, for example.

The kit or container system B according to the invention may comprise such an injection device or may be associated with one. In particular, the removal opening E1, E2 or another opening, a flange or other connecting or closing element of at least one of the containers B1, B2 and/or of both containers B1, B2 may be configured so as to allow direct use in or with the injection device. Moreover, the removal device, the opening, the flange or other connecting or closing element may be configured specifically for connection to a particular injection device. This can reduce the probability of incorrect use, particularly the wrong amounts of active substance or methods of administration.

An aspect of the present invention which may also be implemented independently further relates to an injection device with an inserted combination of at least two of the proposed containers B1, B2, B3, which are fluidically connected to one another with the connecting arrangements 3A, 3A', 3B, 3B' according to the present invention. In particular, by means of the fluidic connection 2, a mixture of the substances S1, S2. S3 from the containers B1, B2, B3 is formed and the injection device is set up for injecting the mixture of substances S1, S2, S3.

Further aspects of the present invention will be explained hereinafter with reference to another embodiment, detailing only the differences and special features compared with the embodiments described hereinbefore. The aspects can therefore be combined with the aspects described previously, and vice versa, unless this is specifically ruled out. Moreover, reference will be made to the previous explanations and definitions.

The embodiment described hereinafter with reference to FIG. 22 *ff.* preferably relates to the variant described above in which the first connecting arrangement 3A' is deformable outside the opening region 4A' and is configured so that the deformation causes the first connecting arrangement 3A' to open in the opening region 4A'. For further details, reference may be made to FIGS. 5 to 13 and the related explanations.

According to an aspect of the present invention which can also be implemented independently, the first connecting arrangement 3A' comprises a preferably rigid, stiff and/or dimensionally stable closure device 23, particularly a closure plate. The closure device 23 is preferably sealingly attached to a holding portion 25 by means of a fragile frangible point 24, particularly a thin point. The opening region 4A' of the first connecting arrangement 3A' may thus be formed with or by the closure device 23 and/or frangible point 24.

The aspects explained previously in connection with the fragility of the opening region 4A', particularly with regard to the material thickness and the like, can preferably be applied to or transferred to the frangible point 24. The difference thus lies particularly in the fact that the opening region 4A' of the first connecting arrangement 3A' additionally comprises the closure device 23 which stabilizes or reinforces the opening region 4A' in a central portion or a portion surrounded by a film-shaped, brittle, unstable and/or fragile region in the form of the frangible point 24.

The holding portion 25 preferably corresponds to the mouth-like portion 5A' of the first connecting arrangement 3A' and/or the mouth-like portion 5A' comprises the holding portion 25. The related explanations in connection with the mouth-like portion 5A' may therefore be applied to the holding portion 25 as well, in an alternative or supplementary capacity. If necessary, the holding portion 25 can therefore also be designated a mouth-like portion 5 A' or be wholly or partially formed thereby or vice versa.

Particularly preferably, the holding portion 25 is movable by deformation relative to the closure device 23, so that the first connecting arrangement 3A' can be opened by tearing the frangible point 24. It has advantageously been found that the use of a closure device 23 and the concomitant concentration of the force applied by the deformation on a fragile area (frangible point 24) surrounding the closure device 23 makes it possible to achieve a particularly reliable and simpler opening by means of deformation.

Figure 22:
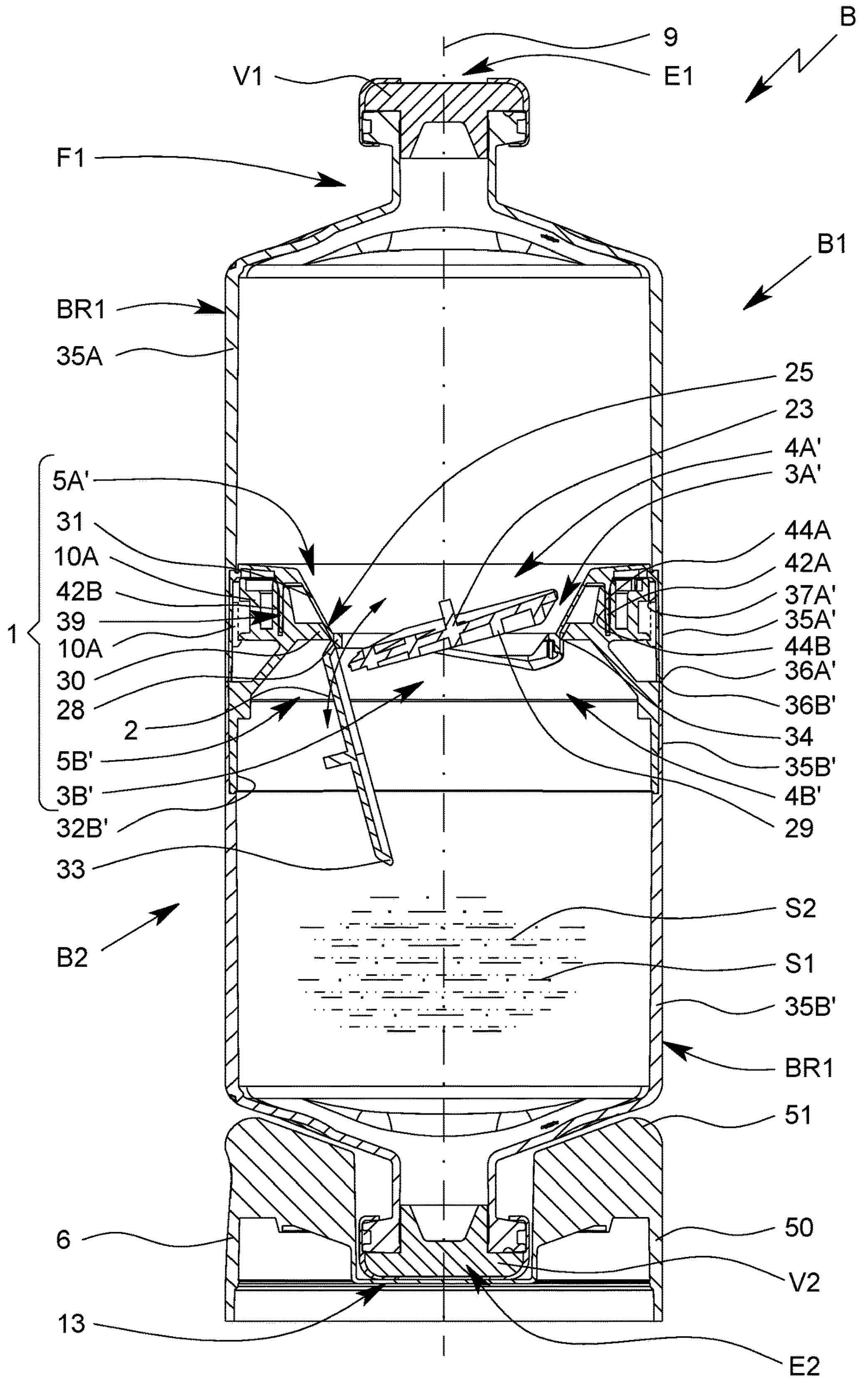
FIG. 22 shows a schematic longitudinal section through a container system according to a further embodiment in the connected state.

FIG. 22 shows an overview of the container system B, in which the containers B1, B2 are fluidically connected to one another by means of the connecting arrangements 3A', 3B'. For this purpose, the first connecting arrangement 3A' or its opening region 4A' and the second connecting arrangement 3B' or its opening region 4B' are shown open in each case.

Figure 23:
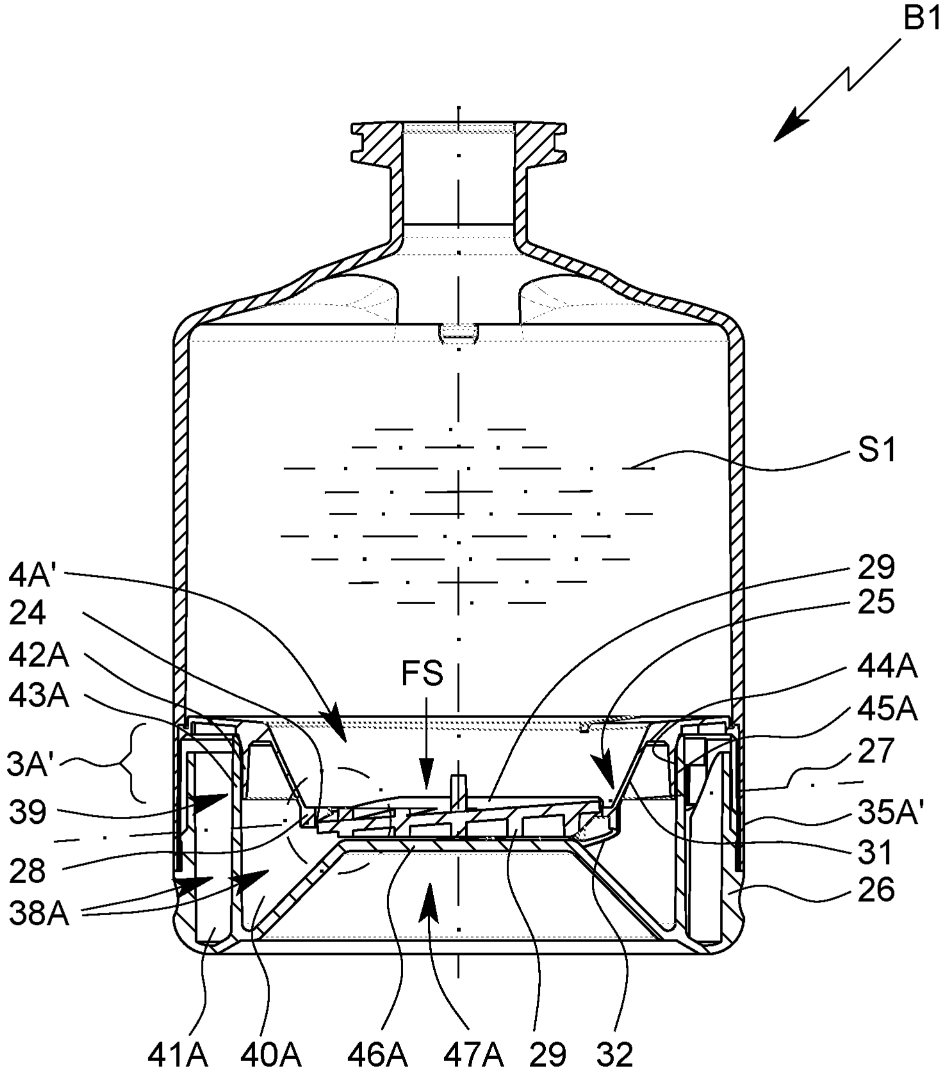
FIG. 23 shows a schematic longitudinal section through a container of the container system according to FIG. 22 in the initial state.
Figure 24:
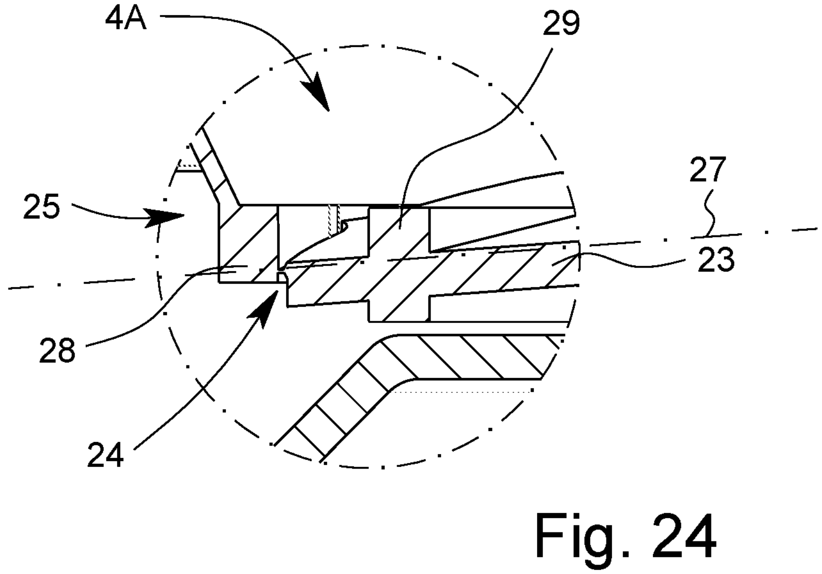
FIG. 24 shows a magnified detail of the schematic longitudinal section through a container from FIG. 23.
Figure 25:
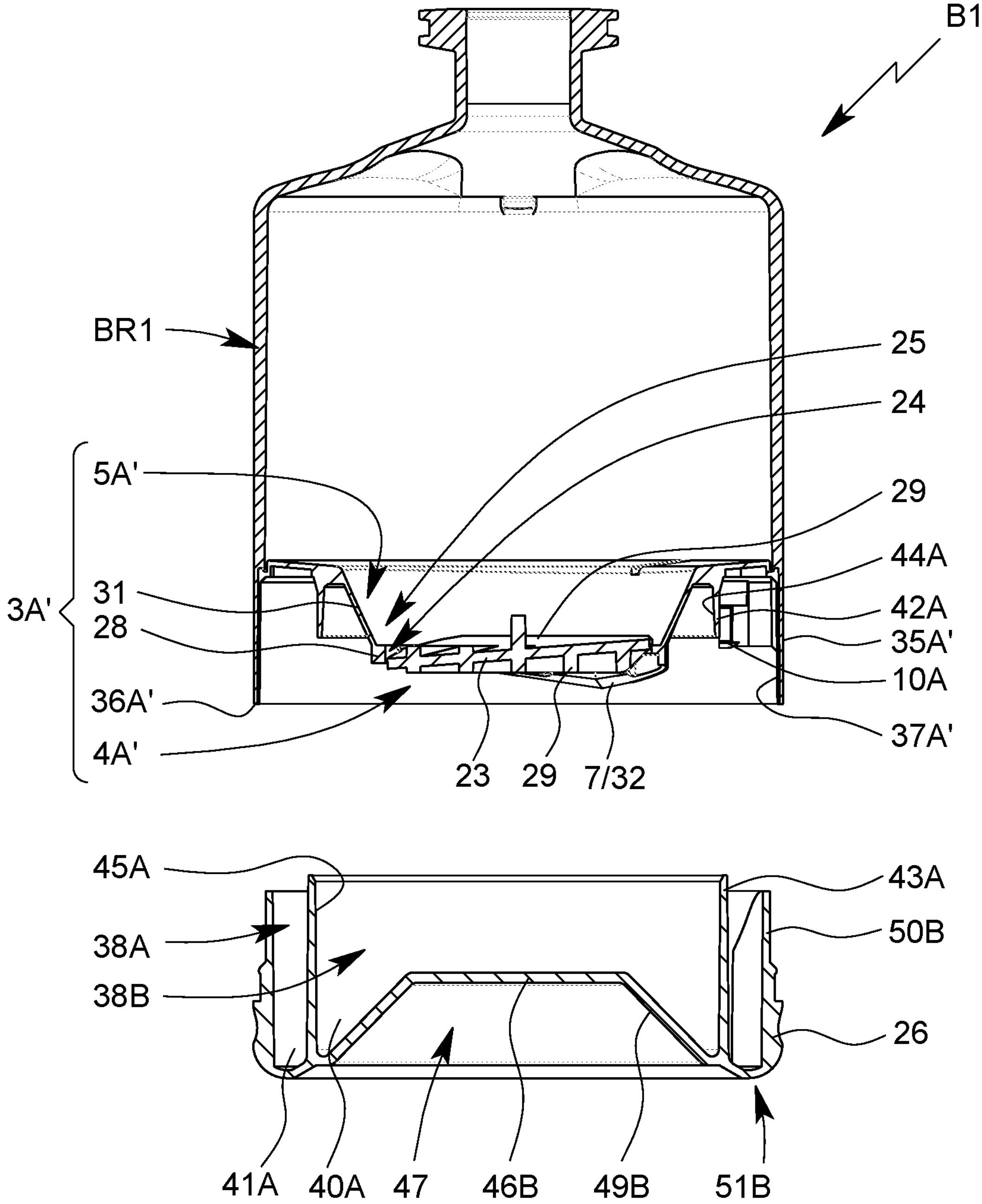
FIG. 25 shows a schematic longitudinal section through the container according to FIG. 23 with the cover device removed.
Figure 26:
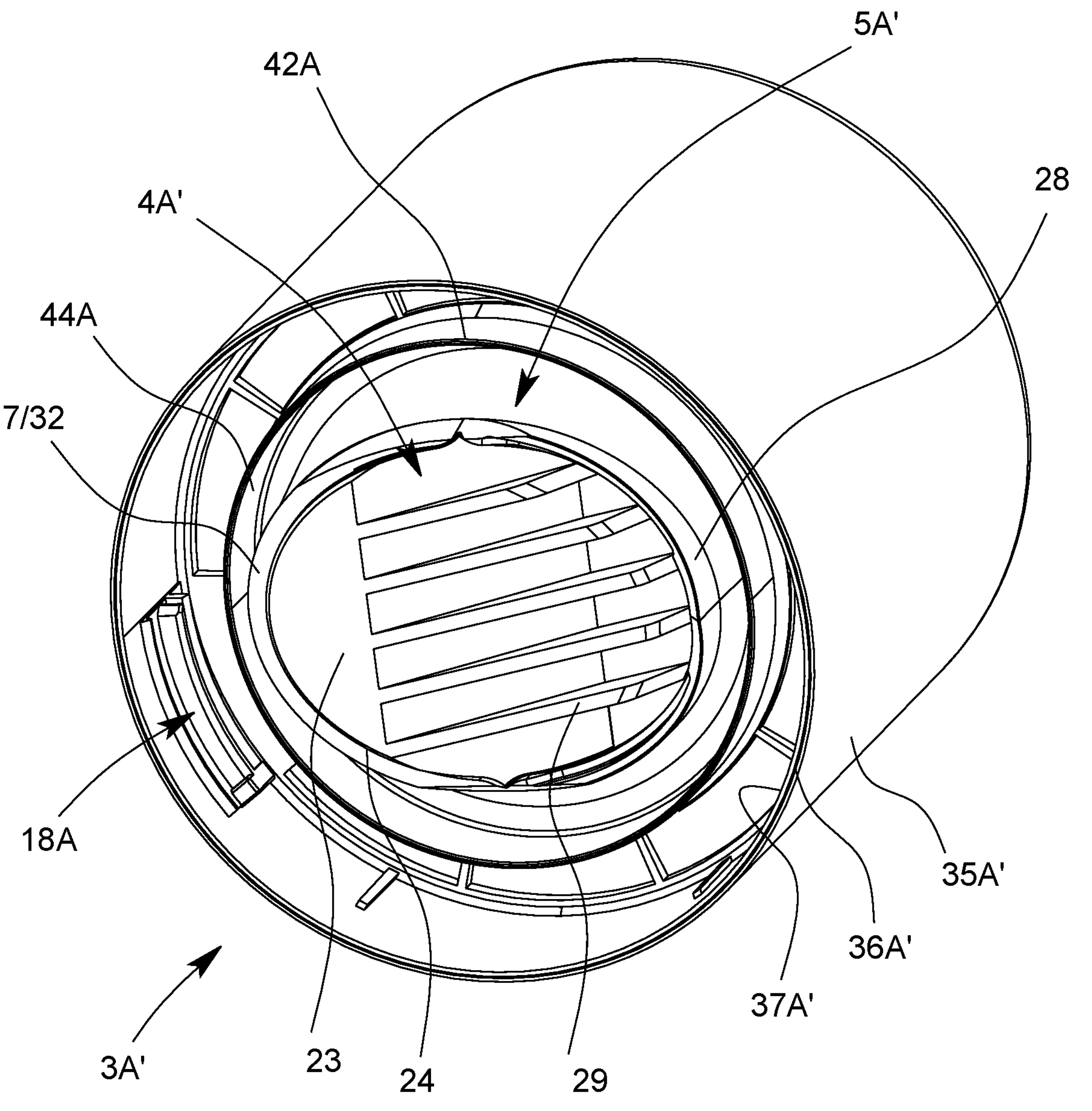
FIG. 26 shows a perspective view of the container according to FIG. 23 looking at the connecting arrangement thereof.

For the following explanations, reference is additionally made to FIG. 23 to 26, while FIG. 23 shows a longitudinal section through the first container B1 with the first connecting arrangement 3A' in an initial state with the opening region 4A' closed. FIG. 24 shows a magnified detail of a partial region of the closure device 23 and of the holding portion 25 with the frangible point 24 between them. In the embodiment shown according to FIG. 23 the opening region 4A' is covered by a preferably cap-like cover device 26. The cover device 26 has been removed in the embodiment shown in FIG. 25. FIG. 26 shows a perspective representation of the first connecting arrangement 3A' as part of the first container B1 without the cover device 26.

The closure device 23 is preferably configured and/or held by means of the frangible point 24 such that the closure device 23 is inclined as the holding portion 25 is deformed.

Preferably, the frangible point 24 or a surface or plane 27 formed or defined by the frangible point 24 is inclined relative to the central axes or axes of symmetry 9. This enables or facilitates pushing, rotation and/or further inclination of the closure device 23 during the opening process or prevents blockade of the closure device 23 relative to the holding portion 25.

During the opening process the closure device 23 may slide over the holding portion 25 as a result of the deformation of the holding portion 25, particularly while being inclined or tilting.

The holding portion 25 preferably comprises a frame 28 or is of a frame-like construction. The closure device 23 is preferably inclined relative to the frame 28 in the initial state. As a result, the frame 28 and the closure device 23 are each partially offset from one another, with the result that an offset directly adjacent the frangible point 24 may form this or an offset region. The offset is preferably aligned in opposite directions on opposite sides. The advantage of the offset is that during deformation of the holding portion 25 the closure device 23 is able to slide along the frame 28 or tuck in behind it. This makes the opening process easier because blocking of the deformation of the holding portion 25 by the closure device 23 is prevented and as a result the opening of the opening region 4A' is made easier.

Preferably, particularly as a result of the step-like offset of the frame 28 relative to the edge of the closure device 23 adjacent the frangible point 24 and/or as a result of the inclination of the closure device 23 and/or the frangible point 24 relative to the central axis 9, a shearing action of the closure device 23 relative to the frame 28 is made possible, or is achieved during deformation. Such a shearing action advantageously makes it possible to apply a strong mechanical stress to the frangible point 24, in relation to the degree of deformation of the holding portion 25, particularly by producing tensile and/or shear stresses, thus making the severing or tearing of the frangible point 24 easier. Overall, this provides a comfortable and reliable method of opening the opening region 4A' of the first connecting arrangement 3A'.

According to a further aspect of the present invention the closure device 23 is formed in a ramp shape starting from the frangible point 24 provided on the edge thereof. This may be achieved by increasing the material thickness, preferably in relation to a surface or plane 27 defined by or extending through the frangible point 24. Alternatively, or additionally the closure device 23 is formed in a ramp shape starting from the offset region. In this way it is possible to incline the closure device 23 increasingly as the deformation of the holding portion 25 progresses. The ramp-like portion of the closure device 23 can slide along the holding portion 25 and thereby produce an increasing inclination.

The closure device 23 itself preferably comprises a reinforcement 29, in the embodiment shown in the form of ribs or some other added material or added thickness of material that will improve mechanical stability. This reinforcement 29 may be formed at the edge of the closure device 23 or may be configured like a ramp, starting from the frangible point 24 provided at the edge, particularly such that the closure device 23 is increasingly inclined as deformation progresses.

As may be seen for example, in the perspective view in FIG. 26, the holding portion 25 is preferably non-round perpendicularly to the central axis or axis of symmetry 9, particularly oval in shape, as explained previously in connection with FIG. 5 to 13. The same also applies alternatively, or additionally to the frangible point 24 and/or an encircling edge of the closure device 23 or such an edge adjoining the frangible point 24 and/or to the frame 28.

The frangible point 24, particularly the thin point, is preferably so fragile that deformation of the holding portion 25 can cause tearing of the frangible point 24 and hence opening of the connecting arrangement 3A'.

In the embodiment shown the frangible point 24 is only ten microns thick, preferably less than 300 microns, more preferably less than 200 microns or less than 150 microns. The distance between the holding portion 25 and the closure device 23, which is tightly bridged by means of the frangible point 24, is preferably less than 3 mm, particularly preferably less than 2 or 1 mm, in the embodiment shown less than 0.5 mm. It is also preferable if the distance between the closure device 23 and holding portion 25 or the length of the frangible point 24 does not exceed, or only slightly exceeds, corresponding values in the entire area surrounding the closure device 23. The frangible point 24 thus preferably has an at least substantially constant length and/or material thickness in its extent around the closure device 23. The frangible point 24 thus preferably surrounds the closure device 23 at least substantially completely.

The holding portion 25 is preferably deformable by insertion in a deforming device 30 of at least substantially complementary shape and subsequent rotation of the holding portion 25 relative to the deforming device 30 about the central axis and/or axis of symmetry 9. In particular, the holding portion 25 is radially deformable in relation to and/or in the direction of the central axis and/or axis of symmetry 9.

Figure 27:
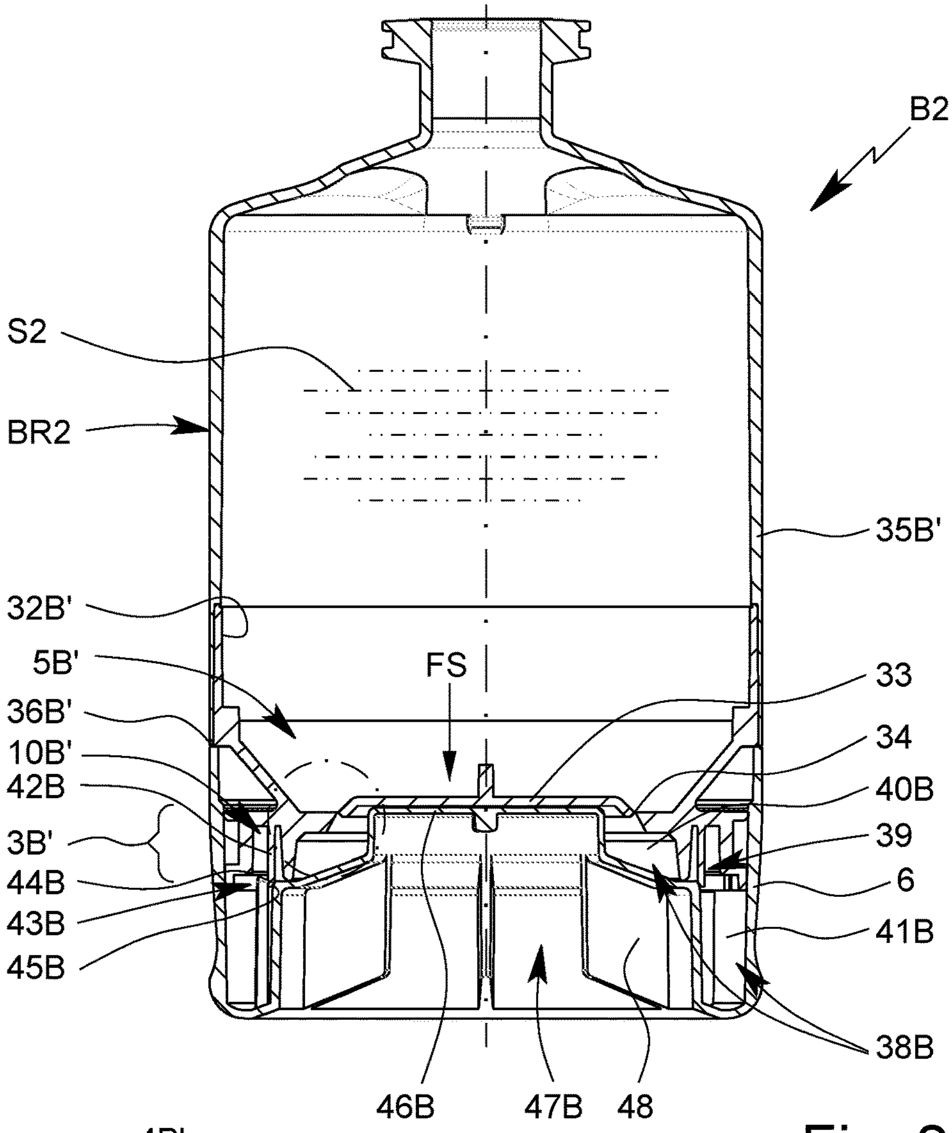
FIG. 27 shows a schematic longitudinal section through the other container of the container system according to FIG. 22 in the initial state.
Figure 28:
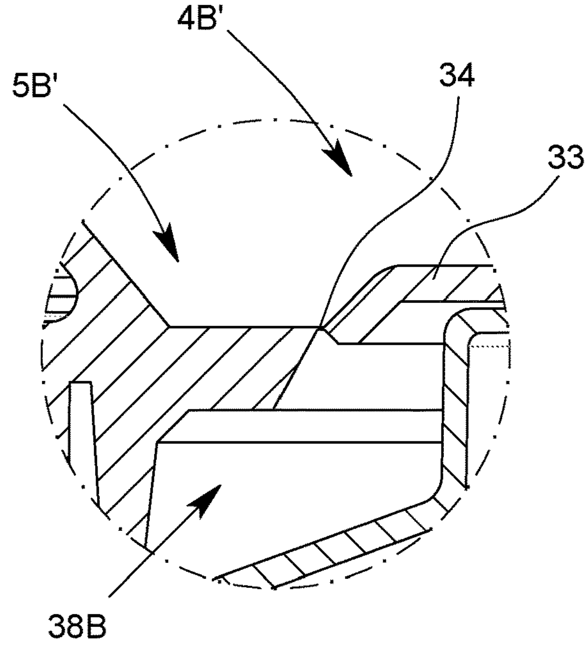
FIG. 28 shows a magnified detail of the schematic longitudinal section through a container from FIG. 27.
Figure 29:
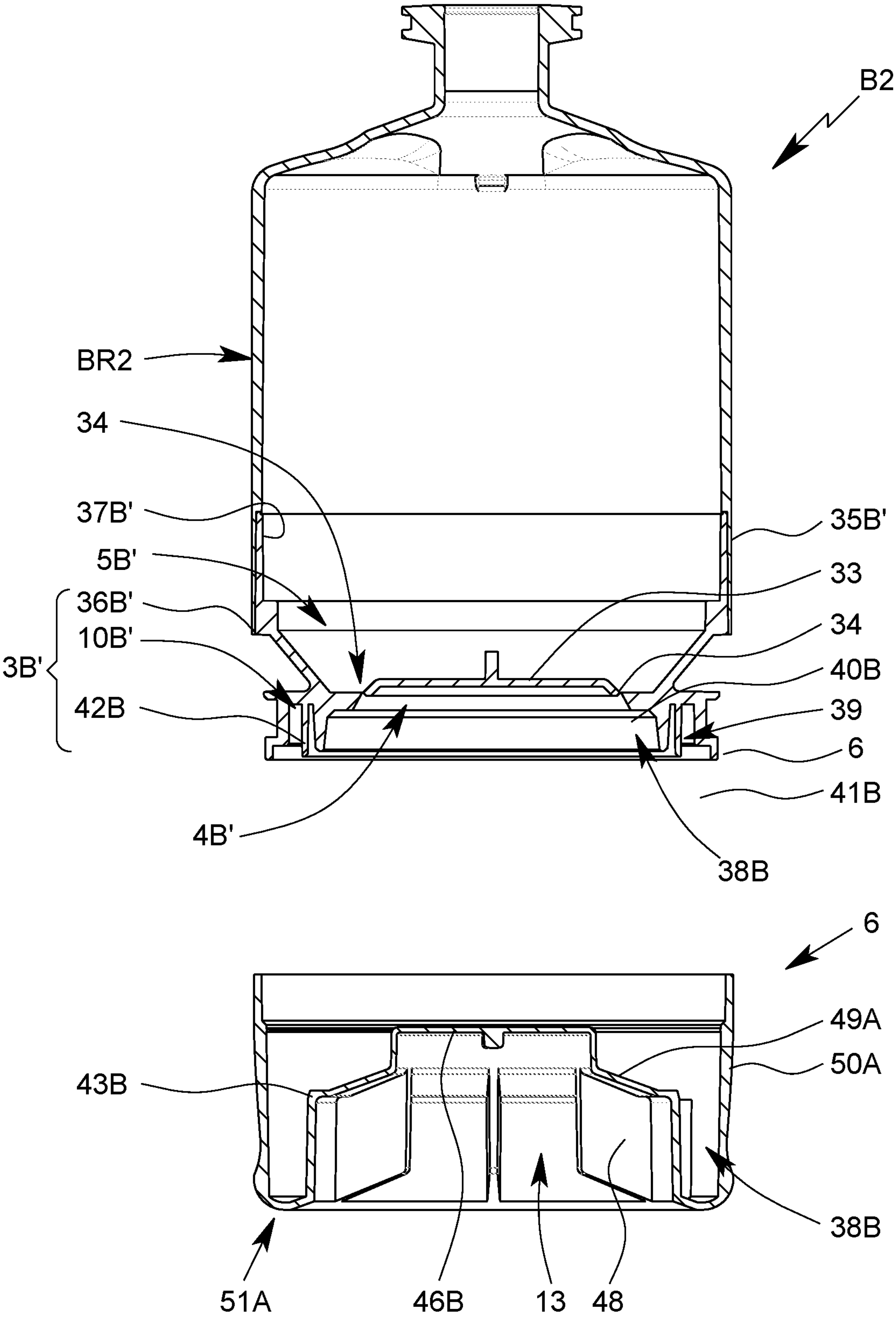
FIG. 29 shows a schematic longitudinal section through the container according to FIG. 27 with the cover device removed.
Figure 30:
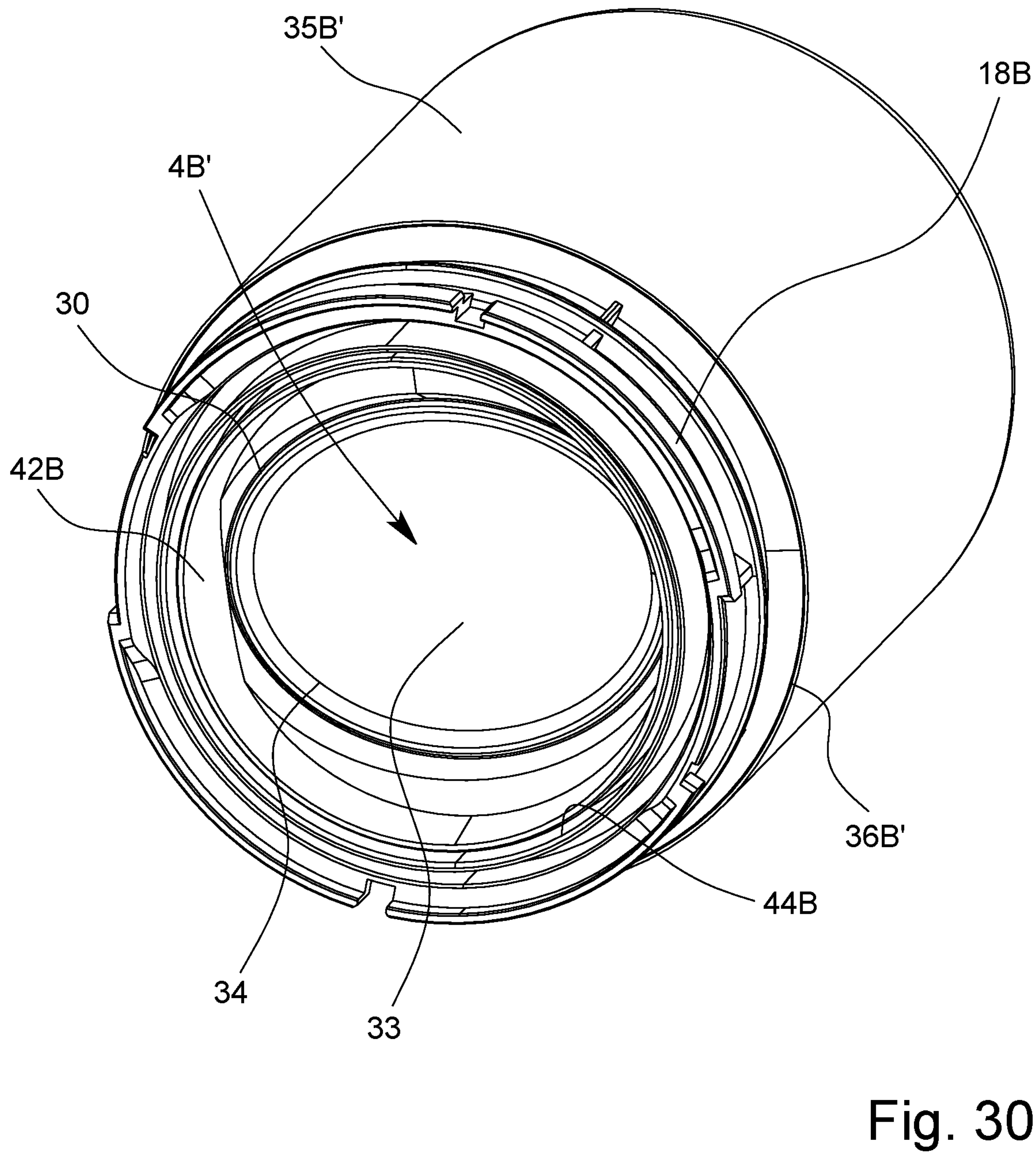
FIG. 30 shows a perspective view of the container according to FIG. 27 looking at the connecting arrangement thereof.

FIG. 27 shows a section through a second container B2 with the second connecting arrangement 3B' and FIG. 28 shows a magnified detail thereof. FIG. 29 shows the second container B2 with the cover device 6 removed and FIG. 30 shows a perspective view of the second connecting arrangement 3B'.

The deforming device 30 is particularly preferably formed by the second connecting arrangement 3B', particularly its mouth-like portion 5B'. For this, reference is made to the corresponding explanation in connection with FIGS. 5 to 13 and to the following explanations of the second connecting arrangement 3B' from the embodiment shown in FIG. 22 *ff.*

The holding portion 25 of the first connecting arrangement 3A' is preferably in the shape of a neck, collar and/or tube with, and in particular by means of, a flexible deformable wall 31. In the embodiment shown in FIG. 22 *ff.* the wall 31 forms a preferably at least substantially conical shape converging towards the frame 28, which may form the mouth-like portion 5A' in the present case. However, other solutions are also theoretically possible here.

It is also preferable that the holding portion 25, particularly the frame 28, has a piercing and/or cutting edge 32 or other severing element 7. The piercing and/or cutting edge 32 is preferably attached to the frame 28, formed by the frame 28, particularly in one piece and/or by molding on. The piercing and/or cutting edge 32 is preferably formed by an at least substantially axially extending strip preferably forming a point.

The piercing and/or cutting edge 32 is preferably configured to open the second connecting arrangement 3B', particularly as a result of the opening region 4B' of the second connecting arrangement 3B' being perforated or pierced by means of the piercing and/or cutting edge 32. Preferably, during an axial movement of the connecting arrangements 3A', 3B' to one another, the opening region 4B of the second connecting arrangement 3B' is first of all pierced by the piercing and/or cutting edge 32 projecting axially outwards relative to the opening region 4A', particularly of the closure device 23, and only afterwards can the opening region 4A' of the first connecting arrangement 3A' be opened by the rotation of the connecting arrangements 3A', 3B' relative to one another in the manner described. By comparison with the embodiment in FIG. 5 to 13, however, in the present case the holding portion 25 or the mouth-like portion 5A' is configured to pierce the opening region 4B' of the second connecting arrangement 3B'. In this respect, reference is made to the previous explanations for supplementary information.

In the present embodiment, by comparison with the previous embodiment, the piercing and/or cutting edge 32 is provided on the mouth-like portion 5A', as is also possible in the previous embodiment and advantageous for easier opening of the opening region 4B' of the second connecting arrangement 3B'.

In the present embodiment, the opening region 4B' of the second connecting arrangement 3B' is closed off by an, in particular, at least substantially rigid, dimensionally stable and/or plate-shaped closure device 33, particularly a closure plate or disc, which is preferably sealingly held on the mouth-like portion 5B, particularly by means of a frangible point 34. Other constructions are also theoretically possible here, for example, as described in connection with FIG. 7.

The use of the closure device 33, in a similar manner to the closure of the first connecting arrangement 3A' with the closure device 23, however, makes it easier to open the second connecting arrangement 3B' in the opening region 4B'.

The piercing and/or cutting edge 32 preferably corresponds in its orientation and position to the frangible point 34 of the second connecting arrangement 3B', such that bringing the connecting arrangements 3A', 3B' together leads to the piercing and/or cutting edge 32 being applied to the frangible point 34, as a result of which the frangible point 34 can be severed, starting at the initial point of application of the piercing and/or cutting edge 32. Preferably, the connecting arrangements 3A', 3B' are correspondingly guided to one another.

The frame 28 and/or the piercing and/or cutting edge 32 preferably has a rounded and/or chamfered portion, so that when the piercing and/or cutting edge 32 acts on the frangible point 34 the frangible point 34 is partially spared, so that preferably an intact part of the frangible point 34 still holds the closure device 33 against the mouth-like portion 5B' after opening, particularly in the manner of a film hinge. This ensures that the closure device 33 is not detached and prevents blockage of one of the removal openings E1, E2.

In the embodiment shown, in the initial state, the closure device 33 is aligned with the mouth-like portion 5B' at least substantially perpendicular to the central axis or axis of symmetry 9. It is certainly possible to have an inclined alignment, as with the closure device 23 of the first connecting arrangement 3A', but this is not absolutely necessary, as the second connecting arrangement 3B' is preferably opened primarily by the piercing and/or cutting edge 32 and not by deformation of the mouth-like portion 5B'.

The mouth-like portion 5B' is preferably sufficiently stable in its construction and hold so that when the connecting arrangements 3A', 3B' are rotated after being inserted in one another, deformation takes place at least substantially or in any case predominantly in the region of the mouth-like portions 5A' or in the holding portion 25. A certain deformation of the mouth-like portion 5B' and/or the deforming device 30, of the second connecting arrangement 3B' is possible, however.

According to a further aspect of the present invention the container(s) B1, B2 is or are (each) formed from a container blank BR1, BR2 and the respective connecting arrangement 3A', 3B'. The same may also apply to the previous embodiment.

In the embodiment shown the container blanks BR1, BR2 are upper container or bottle parts, configured for connection to the respective connecting arrangement 3A', 3B' on a side or end remote from or opposite to the removal opening E1, E2. In particular, they are container blanks BR1, BR2 without bases, the resulting open region being closed off during manufacture by means of the respective connecting arrangement 3A', 3B' to form the respective container B1, B2.

Container blanks BR1, BR2 are thus particularly structures with a removal opening E1, E2 and another open point which can be closed off by the respective connecting arrangement 3A', 3B'.

Preferably, the respective connecting arrangement 3A', 3B' is tightly connected to a wall of the container blank BR1, BR2 by material engagement, particularly preferably by welding, adhesive bonding, injection molding or by some other method. The connecting arrangements 3A', 3B may consequently be used in all kinds of containers B1, B2 or may also be used independently of containers B1, B2, for example, in order to fluidically connect a container B1, B2 to another structure such as a pipe, a connector or the like. However, the connection of containers B1, B2, B3 to one another is particularly preferred.

Preferably, the (respective) connecting arrangement 3A', 3B' is configured to be connected to the container blank BR1, BR2 so that a container B1, B2 is formed. It is also preferable that the container blank BR1, BR2 should have a wall 35A', 35B' with an open edge 36A', 36B', forming a receptacle for the connecting arrangement 3A', 3B', into which the respective connecting arrangement 3A', 3B' can be inserted and tightly connected to the container blank BR1, BR2.

In another aspect the present invention relates to a connecting system 1 with the first connecting arrangement 3A' comprising the holding portion 25 and the frangible point 24 and a second connecting arrangement 3B' comprising the deforming device 30 corresponding to the holding portion 25, wherein the connecting arrangements 3A', 3B' can be inserted sealingly into one another and, as the connecting arrangements 3A', 3B' are rotated relative to one another, as a result of the deformation of the holding portion 25 by the deforming device 30, the first connecting arrangement 3A' can be opened in order to produce the fluidic connection 2.

In another aspect which may also be implemented independently, the present invention further relates to one or more containers B1, B2, B3, particularly bottles (each) having a connecting arrangement 3A', 3B' according to the present invention, preferably on a side or end remote from a container opening or removal opening E1, E2, another connecting arrangement 3A', 3B' or a base.

In another aspect which may also be implemented independently, the present invention further relates to a container system B with at least two containers B1, B2, B3, wherein a first container B1 comprises the first connecting arrangement 3A' and a second container B2, B3 comprises the second connecting arrangement 3B', which corresponds to the first connecting arrangement 3A'.

The connecting arrangements 3A', 3B' are preferably configured as described hereinbefore. In particular, it is preferable for the first connecting arrangement 3A' to have the piercing and/or cutting edge 32 by means of which the second connecting arrangement 3B' can be opened.

Alternatively, or additionally the second connecting arrangement 3B' comprises the mouth-like portion 5B' or the deforming device 30, for opening the first container B1 by means of the first connecting arrangement 3A' by deformation of the holding portion 25 or of the mouth-like portion 5A'.

It is also preferable that the connecting arrangements 3A', 3B' should enable the formation of the fluidic connection 2 by mutual opening, the first connecting arrangement 3A' opening the second connecting arrangement 3B' and the second connecting arrangement 3B' opening the first connecting arrangement 3A', thus forming the fluidic connection 2.

In another aspect of the present invention which may also be implemented independently, the connecting arrangements 3A', 3B' are used to prepare a mixture of substances, preferably a medicament, particularly a vaccine or combined vaccine, to produce a fluidic connection 2 and/or to mix starting materials or substances S1, S2 which have been stored separately.

The invention further relates to a method, which may also be implemented independently, for producing one of the connecting arrangements 3A', 3B' or the connecting system 1 and/or a container B1, B2, B3, in which the closure device 23, 33, the frangible point 24, 34 and the holding portion 25 or the mouth-like portion 5A', 5B' are injection molded in a common step. This has proved advantageous in terms of reliable production of the frangible point 24, 34.

In the method, it is also preferable if, in a container blank BR1, BR2 having an open end, particularly a bottle blank with a removal opening E1, E2 in addition to the open end, the open end is sealed off by the separately produced connecting arrangement 3A', 3B'.

The connecting arrangement 3A', 3B' preferably comprises a collar-shaped and/or tubular portion 37A', 37B' which delimits the (respective) connecting arrangement 3A', 3B' radially outwards and corresponds to the wall 35A', 35B' of the respective container B1, B2 or container blank BR1, BR2, in order to be inserted therein and connected to the container blank BR1, BR2.

Another aspect of the present invention which may also be implemented independently relates to the sealing concept, based on a combination of the connecting arrangements 3A', 3B' with one another, or of one of the connecting arrangements 3A', 3B' with a preferably cap-like cover device 6, 26.

It is provided that a container B1, B2, B3 is provided with a connecting arrangement 3A', 3B' for producing a fluidic connecting arrangement 2 of the container B1, B2, B3 with another container B1, B2, B3. In an initial state the connecting arrangement 3A', 3B' may be fluidically sealed in an opening region 4A', 4B' and can be opened in order to form the fluidic connection 2. The opening region 4A', 4B' is covered with a cap-like cover device 6, 26 and/or another connecting arrangement 3A', 3B'. This aspect thus relates particularly to an individual container B1, B2, B3 or a connecting arrangement therefor, of the container system B combined with the cap-like cover 6, 26 and/or the (corresponding) connecting arrangement 3A', 3B'.

In another aspect which may also be implemented independently it is envisaged that the cover device 6, 26 or the other connecting arrangement 3A', 3B' is sealingly held on the proposed container B1, B2, B3, thus forming a sealed chamber 38A, 38B, 38C. Moreover, the proposed container B1, B2, B3 comprises a sealing arrangement 39 surrounding the opening region 4A', 4B' thereof, which seals off a volume 40A, 40B, 40C of the chamber 38A, 38B, 38C in direct contact with the opening region 4A', 4B'. Particularly preferably, the sealing arrangement 39 seals off the inner volume 40A, 49B, 40C from an outer volume 41A, 41B, 41C of the chamber 38A, 38B, 38C. This advantageously covers the opening region 4A', 4B', particularly by means of a double closure. This enhances the barrier preventing the ingress of substances, particularly germs.

It is provided, in particular, that foreign substances can only reach the inner volume 40A, 40B, 40C by passing through the outer volume 41A, 41B, 41C. The sealing arrangement 39 is preferably mechanically decoupled from the environment by an outer seal of the cover device 6, 26, so that any force acting on the cover device 6, 26 may affect the tight seal of the outer volume 41A, 41B, 41C, but the inner volume 40A, 40B, 40C will remain sealed even in such a case, preferably in airtight manner, particularly in germ-proof or bacteria-proof manner. In this way it is possible to guarantee a sterile environment at the opening region 4A', 4B'.

Alternatively, or additionally the sealing arrangement 39 seals off the inner volume 40A, 40B, 40C surrounding the opening region 4A', 4B' by means of the cover device 6, 26 or the other connecting arrangement 3A', 3B' when there is uninterrupted movement of the cover device 6, 26 or the other connecting arrangement 3A', 3B' relative to the connecting arrangement 3A', 3B' of the proposed container B1, B2, B3. In this way, during the process of inserting the connecting arrangements 3A', 3B' into one another and/or during the assembly or removal of the cover device(s) 6, 26, the opening region 4A', 4B' can be protected from the ingress of foreign substances, particularly germs.

It is particularly preferable to combine the two aspects, i.e., to form the chamber 38A, 38B, 38C, which is divided by the sealing arrangement 39 into an inner volume 40A, 40B, 40C and an outer volume 41A, 41B, 41C, the sealing arrangement 39 being configured to prevent the ingress of foreign substances, particularly germs, into the inner volume 40A, 40B, 40C, during, in particular, axial movement of the cover device 6, 26 or other connecting arrangements 3A', 3B'.

The sealing arrangement 39 preferably comprises sealing portions 42A, 42B, 43A, 43B corresponding to one another, a first sealing portion 42A, 42B being associated with the connecting arrangement 3A', 3B' and a second sealing portion 42A, 42B. 43A, 43B being arranged on the cover device 6, 26 and/or on the other connecting arrangement 3A', 3B', particularly being formed in one piece therewith.

The sealing portions 42A, 42B, 43A, 43B preferably comprise sealing surfaces 44A, 44B, 45A, 45B corresponding to one another, which abut closely on one another when the cover device 6, 26 is placed on the connecting arrangement 3A', 3B' or the connecting arrangements 3A', 3B' are fitted into one another.

The sealing surfaces 44A, 44B, 45A, 45B preferably have a similar shape in cross-section (perpendicular to the central axis or axis of symmetry 9) and/or are round and/or rotationally symmetrical to the common axis of symmetry and/or central axis 9.

Preferably, the sealing portions 44A, 44B, 45A, 45B are configured and/or correspond to one another such that it is possible to rotate the cover device 6, 26 and/or the other connecting arrangement 3A', 3B' relative to the container B1, B2, B3.

Preferably, one of the connecting arrangements 3A', 3B' comprises a sealing surface 44A, 44B, which corresponds to both the sealing surface 44A, 44B of the other connecting arrangement 3A', 3B' and to the sealing surface 45A, 45B of the cover device 6, 26 corresponding to the connecting arrangement 3A', 3B'. The sealing arrangement 39 may thus be formed on the basis of a connecting arrangement 3A', 3B' both with the corresponding cover device 6, 26 and with the other connecting arrangement 3A', 3B'. In this way it is possible to obtain a seal over the cover device 6, 26 during transporting and over the other connecting arrangement 3A', 3B' during use, using the same means or re-using the same means.

Another aspect of the present invention which may also be implemented independently relates to the connecting system 1 for producing the fluidic connection 2 between the containers B1, B2, B3 and/or a container B3, the connecting system 1 or the container B3 having at least two connecting arrangements 3A', 3B' configured to produce the fluidic connection 2, namely a first connecting arrangement 3A' and a second connecting arrangement 3B', which are each fluidically sealed in an initial state or fluidically close off the container B1, B2, B3 and can be opened in an opening region 4A', 4B' in order to produce the fluidic connection 2.

In another aspect it is provided that the connecting arrangements 3A', 3B' form the sealed chamber 38C and comprise the sealing arrangement 39, while a volume 40C in direct contact with the opening regions 4A', 4B' is sealed off from a volume 41C of the chamber 38C separated from the opening regions 4A', 4B' by means of the sealing arrangement 39.

Alternatively, or additionally the connecting system 1 comprises a sealing arrangement 39 which uninterruptedly seals off a volume 40C in direct contact with the opening regions 4A', 4B' as the connecting arrangements 3A', 3B' are moved relative to one another.

It is also preferable if the connecting arrangement 3A', 3B' comprises at least two positions for connection to one another, which are occupied one after the other in terms of time and location when the connecting arrangements 3A', 3B' are pushed or fitted into one another. In the first connecting position a non-releasable connection is made between the connecting arrangements 3A', 3B' and the fluidic connection 2 is only produced, or able to be produced, in the second connecting position. For further details, reference may be made to the previous embodiments.

It is particularly preferable that the sealing arrangement 39 seals or closes off the inner volume 40C without interruption in the first connecting position, in the second connecting position and between the first and second connecting positions and/or seals or separates the inner volume 40C from the outer volume 41C without interruption.

For further details of the connecting system 1 in connection with the sealing arrangement 39, reference is made to the previous discussion in particular with regard to the sterile or sterilizable covering in connection with, e.g., FIGS. 16, 17 and 20 and/or in connection with the proposed container B1, B2, B3 with the sealing arrangement 39.

Another aspect of the present invention which may also be implemented independently relates to a connecting arrangement 3A', 3B' and/or a container B1, B2, B3 having this connecting arrangement 3A', 3B', wherein the opening region 4A', 4B' of the connecting arrangement 3A', 3B' is fluidically closed in an initial state and can be opened to form the fluidic connection 2. In this aspect the connecting arrangement 3A', 3B' comprises a cover device 6, 26, which can preferably be latched to the container B1, B2, B3 or the connecting arrangement 3A', 3B' and/or is in the form of a cap and/or is removable, and which covers the opening region 4A', 4B'.

The cover device 6, 26 according to this aspect preferably comprises a support portion 46 which corresponds to the opening region 4A', 4B' and is directly or so closely adjacent to the opening region 4A', 4B' that a force FS acting on the opening region 4A', 4B' in the direction of the support portion 46 is absorbed by the contact of at least part of the opening region 4A', 4B' on the support portion 46 such that opening of the opening region 4A', 4B' is prevented.

In the embodiment according to FIG. 23 the cover device 26 closes off the connecting arrangement 4A' in corresponding manner. The support portion 46A here is arranged directly adjacent the closure device 23. When a force FS acts on the closure device 23 from the interior of the container B1, for example, when the container B1 flies open in the region of the cover device 26 in the event of being overturned or the like and thus the substance S1 present in the container suddenly exerts the force FS on the opening region 4A', particularly the closure device 23, the closure device 23 can be supported by the support portion 46A, while the force FS is in any case partially absorbed, caught and/or diverted by the support portion 46A. In this way the opening region 4A' is protected from accidental opening, particularly by impact or overturning.

A corresponding mechanism of activity is preferred with reference to FIG. 27 by means of the support portion 46B of the cover device 6 combined with the opening region 4B' or the closure device 33. In addition, the protection against opening provided by the support portion 46A, 46B as described can also be applied to the previous embodiments and aspects, by correspondingly replacing the cover device 6 or the closure 14 with cover devices 6, 26 which have a support portion 46A, 46B.

The support portion 46 is preferably at least substantially held, or capable of being held, on a wall of the container B1, B2, B3 and/or on the connecting arrangement 3A', 3B'. In this way it is possible to divert a force FS introduced into the support portion 46A, 46B. Particularly preferably, the support portion 46A is at least substantially rigidly connected to the mouth-like portion 5A', 5B' or holding portion 25 by means of the connecting arrangement 3A', 3B' and/or the container B1, B2, B3, by virtue of its construction or by mechanical means.

The opening region 4A', 4B' is thus preferably held on the container B1, B2, B3 or on the wall of the container B1, B2, B3 via the mouth-like portion 5A' or the holding portion 25 and the support portion 46A, 46B is held at least substantially rigidly on the same container B1, B2, B3 or on the same wall of the container B1, B2, B3. Thus, the force FS directed onto the opening region 4A', 4B' or the closure device 23, 33 in the direction of the support portion 46A, 46B or outwardly in relation to the container volume can be absorbed and diverted by the support portion 46A, 46B. As a result, the force FS does not have to be diverted through or via the frangible point 24, 34, or not solely through or via the frangible point 24, 34. By removing the load from the frangible point 24, 34 in the event of any forces FS being exerted, the respective connecting arrangement 3A', 3B' is prevented from accidental opening.

The support portion 46A, 46B preferably corresponds to the closure device of the respective opening region 4A', 4B', in particular to the respective closure device 23, 33, and/or is arranged adjacent thereto. The support portion 46A, 46B may form a plateau which is configured and/or aligned to be at least substantially parallel and/or corresponding to a side of the closure device 23, 33 facing the support portion 46A, 46B. It is also preferable that a movement of the closure device 23, 33 towards the support portion 46A, 46B leads to flat contact and/or contact that counteracts an inclination of the closure device, particularly in connection with forces exerted on the closure device by impact or inversion.

The support portion 46A, 46B is preferably formed by the base of an indentation 47 or receptacle 13 of the cover device 6, 26, which is accessible from outside when mounted on or connected to the container B1, B2, B3 or the connecting arrangement 3A', 3B'. With regard to the receptacle 13 reference is also made to the description of the previous embodiments, for supplementary information. In particular, it may be envisaged that the receptacle 6, indentation 26 or recess corresponds to a removal opening E1, E2 or a bottle neck F1, F2 of the container B1, B2, B3, so that the latter can be accommodated in the receptacle 6, the indentation 26 or the recess, particularly for transporting and/or as a support foot.

The cover device 6 preferably comprises rib-like reinforcing elements 48, which preferably assist with the supporting of the support portion 46B or stabilize the support portion 46B. Alternatively, or additionally the reinforcing elements 48 correspond to the bottle neck F1, F2 so as to accommodate, hold and/or stabilize it. In principle, the cover device 26 may also comprise corresponding or similar reinforcing elements 48, even though they are not provided in this embodiment.

The support portion 46A, 46B is preferably supported by a sloping or at least substantially conical strip 49 against movement or deformation in axial directions or directions along the central axis or parallel thereto and/or the axis of symmetry 9.

It is also preferable that the cover device 6, 26 is sealed onto the container and/or the connecting arrangement 3A', 3B' by means of the sealing arrangement 39. The sealing device 39 preferably closes off a side of the support portion 46A, 46B facing the opening region 4A', 4B'. Alternatively, or additionally the sealing arrangement 39 is provided on a wall of the container B1, B2, B3 provided, in addition to the sealing and/or latching mounting of the cover device 6, 26. In this way, a chamber 38A, 38B, the inner volume 40A, 40B and/or volumes 40A, 40B, 41A, 41B separated from one another may be formed within the cover device(s) 6, 26 that are, or may be, attached to the container B1, B2, B3 or the connecting arrangement 3A', 3B'.

In another aspect which may also be implemented independently, the present invention further relates to the cap-like cover device 6, 26 as such and/or a combination thereof with a connecting arrangement 3A', 3B' in order to form a fluidic connection 2, particularly between containers B1, B2, B3, the cover device 6, 26 having a side wall 50A, 50B and a base 51A, 51B which adjoins the side wall 50A, 50B.

On the side wall 50A, 50B is provided a holding device for releasably holding the cover device 6, 26 by interlocking and/or frictional engagement. In particular, this is one or more regions configured to seal and/or otherwise attach by interlocking and/or frictional engagement one or more, preferably one, encircling connection to the container B1, B2, B3, particularly without interruption, in the form of a bead or by some other means.

Preferably, the base 50 comprises a receptacle 13, indentation 47 or recess into which a bottleneck-shaped removal opening E1, E2 of the container B1, B2, B3 can be inserted.

Alternatively, or additionally, a base region of the receptacle 13, indentation 47 or recess directed to the opening of the cover device 6, 26 comprises a plateau-like support portion 46A, 46B for supporting an opening region 4A', 4B' of a connecting arrangement 3A', 3B', a container B1, B2, B3 or a part thereof.

Alternatively, or additionally the base 51A, 51B of the cover device 6, 26 comprises an encircling strip-like sealing portion 43A, 43B which is configured to form a plurality of closed-off volumes 40A, 40B, 40C, 41A, 41B, 41C and/or to subdivide a chamber 38A, 38B and/or to support the base 51A, 51B.

The support portion 46A, 46B is preferably supported or strengthened by, in particular, rib-like reinforcing elements 48, preferably so that the cover device 6, 26 is stiffened for diverting a force FS acting on the support portion 46A, 46B into a wall of the container B1, B2, B3.

In another aspect which may also be implemented independently, the invention relates to the use of the cap-like cover device 6, 26 comprising the support portion 46A, 46B, which is arranged immediately adjacent to or at such a small spacing from an opening region 4A', 4B' of a container B1, B2, B3 that a force FS acting on the opening region 4A', 4B' in the direction of the support portion 46A, 46B is absorbed by the flat contact of at least part of the opening region 4A', 4B' with the support portion 46A, 46B, in order to protect against accidental opening under the effect of external forces, preferably forces of acceleration, particularly as a result of impact on or overturning of the container B1, B2, B3 that is or may be connected to the cover device 6, 26, and/or connecting arrangement 3A', 3B', which is provided for the container B1, B2, B3 or forms a part thereof.

With reference to FIGS. 31 to 34 it will be explained once again, in connection with the present embodiment, how the containers B1, B2, B3 are connected to one another by means of the first and second connecting arrangements 3A', 3B' shown by way of example in FIG. 26 and FIG. 30 in order to form the fluidic connection 2. The procedure corresponds at least substantially to the procedure already described in connection with FIG. 5 to 13 or vice versa.

Preferably, first of all the cover devices 6, 26 are taken off, thereby exposing the connecting arrangements 3A', 3B'. A cover device 6 may act as a stand.

Figure 31:
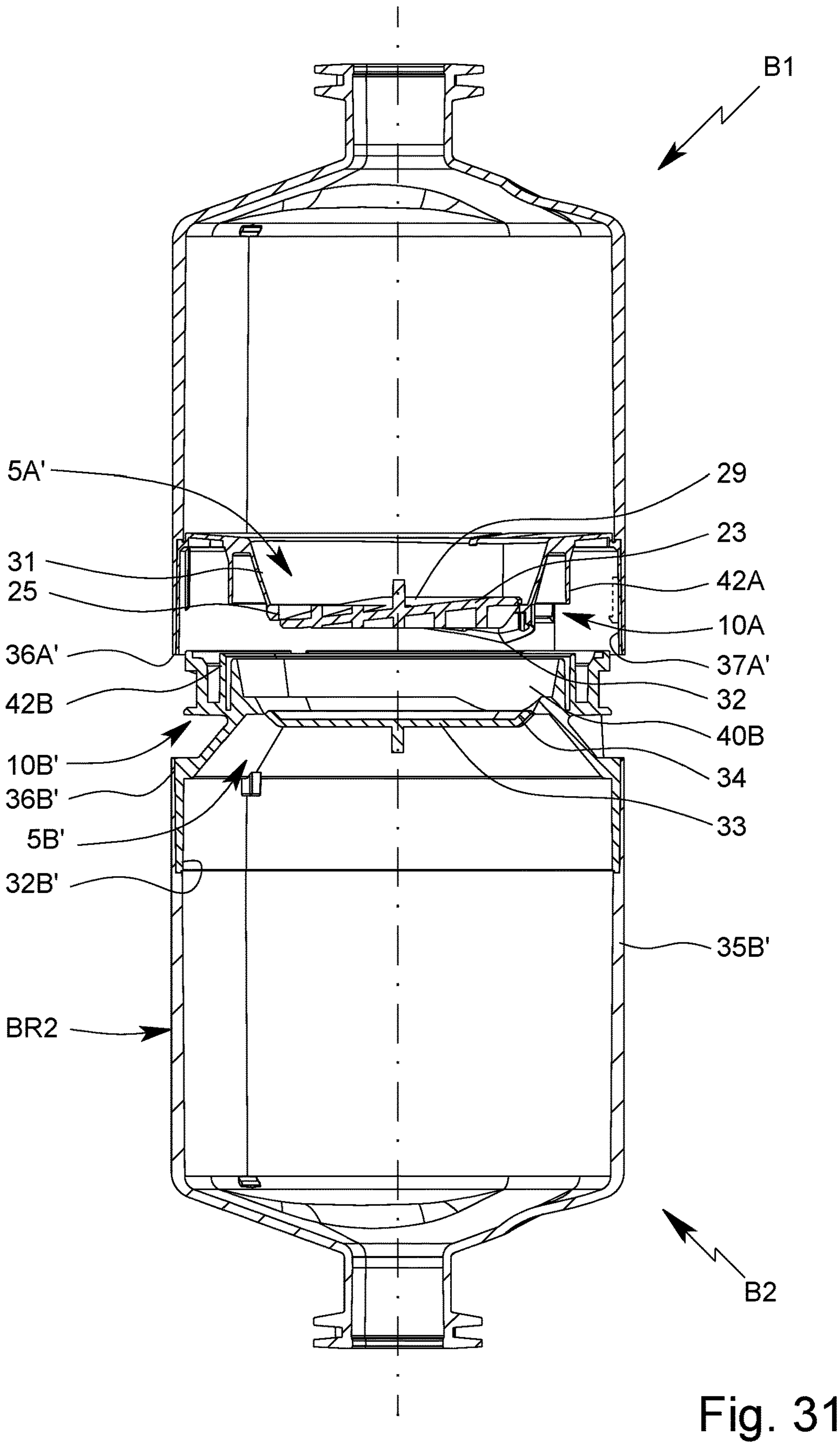
FIG. 31 shows a schematic longitudinal section through a container system according to FIG. 22 in the initial state.
Figure 32:
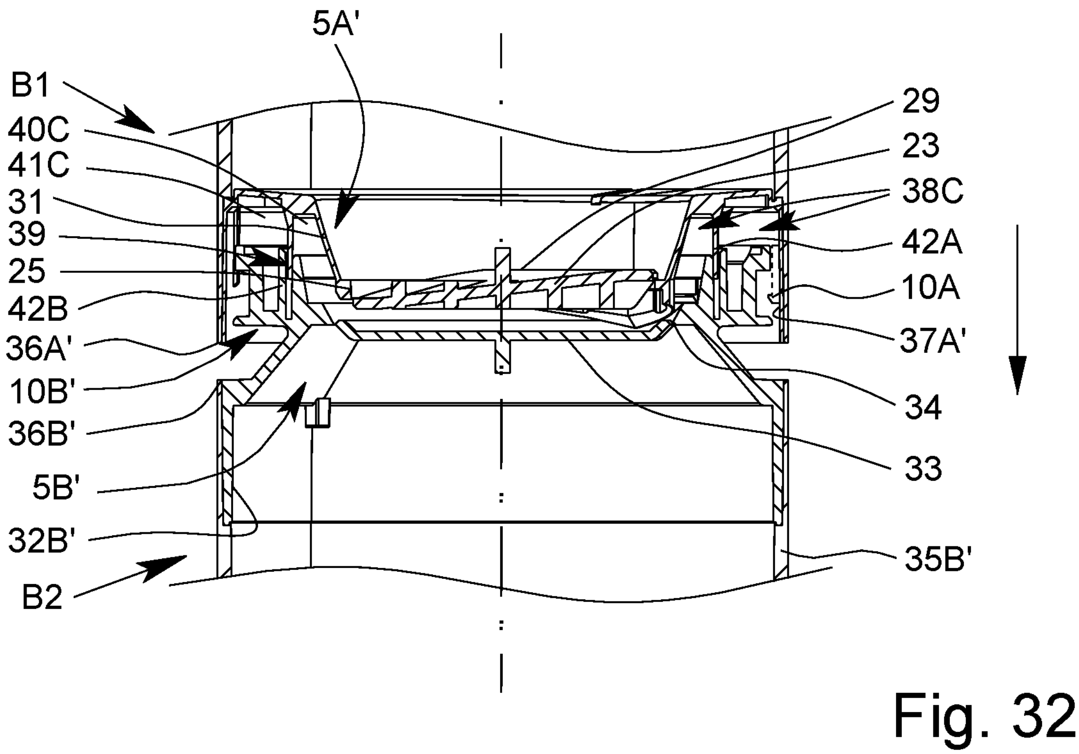
FIG. 32 shows a detail of a schematic longitudinal section through the container system according to FIG. 22 in a first connecting position.
Figure 33:
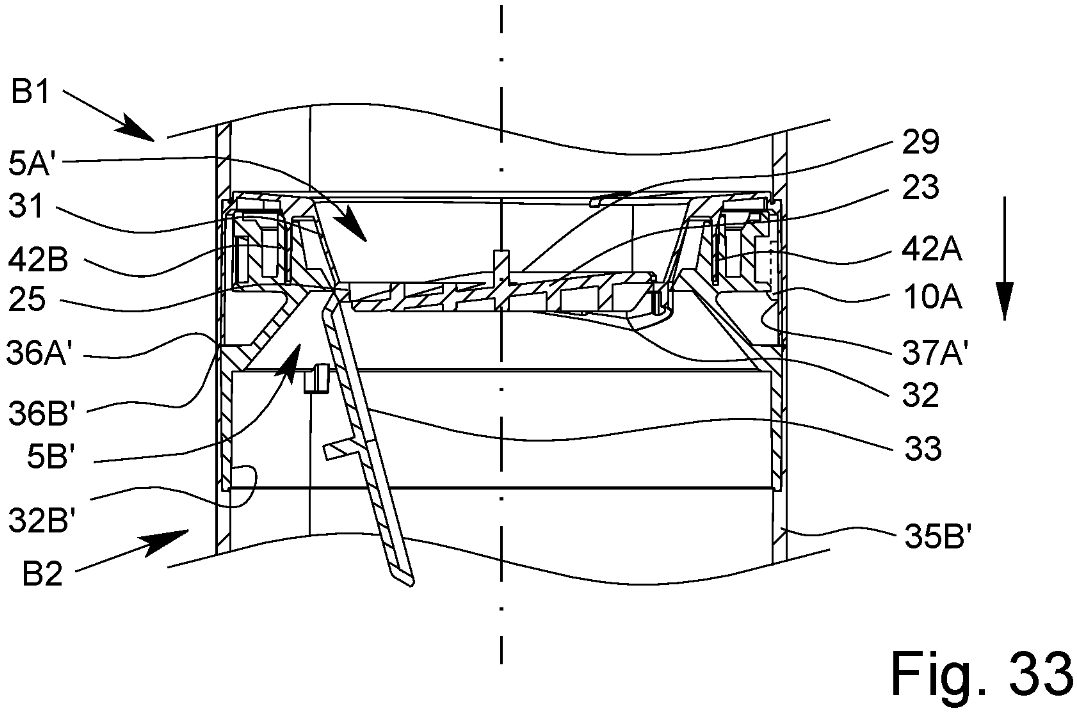
FIG. 33 shows a detail of a schematic longitudinal section through the container system according to FIG. 22 in a second connecting position.

The connecting arrangements 3A', 3B' are then brought axially closer to one another and inserted in one another, as shown by way of example in FIG. 31 to 33.

Optionally, a preliminary latching stage shown in FIG. 32 is reached as the first connecting position, in which the connecting arrangements 3A', 3B' or their opening regions 4A', 4B' still are or remain closed, the connecting arrangements 3A', 3B' or containers B1, B2, B3, however, are already held on one another, particularly by interlocking engagement, particularly non-releasably. For details of this, reference may be made to corresponding explanations of the previous embodiments.

FIG. 33 shows how the first connecting arrangement 3A opens the opening region 4B' of the second connecting arrangement 3B', in this case preferably with the piercing and/or cutting edge 32 or some other severing element 7. For this, the piercing and/or cutting edge 32 is applied axially to the frangible point 34 which holds the closure device 33. As movement continues, the frangible point 34 is severed, particularly cut by means of the piercing and/or cutting edge 32 or torn. This therefore initially opens the opening region 4B' of the second connecting arrangement 3B'.

Figure 34:
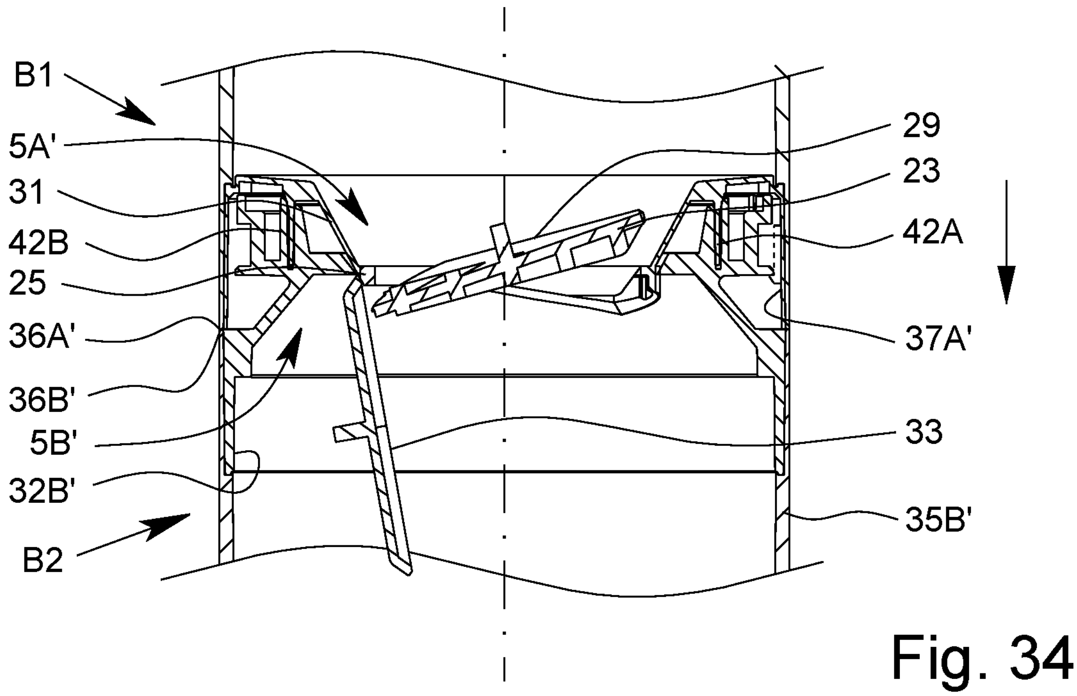
FIG. 34 shows a detail of a schematic longitudinal section through the container system according to FIG. 22 in a third connecting position.

In the following step the connecting arrangements 3A', 3B' or containers B1, B2, B3 are rotated relative to one another about the common central axis or axis of symmetry 9, as a result of which the holding portion 25 or the mouth-like portion 5A' of the first connecting arrangement 4A' is deformed and consequently the opening region 4A' of the first connecting arrangement 3A' is also opened, as shown in FIGS. 22 and 34 in a final opening position.

The connecting arrangements 3A', 3B' are preferably connectable to one another by a bayonet-type action, in which an at least substantially or purely axial movement along the central axis or axis of symmetry 9 after the connecting arrangements 3A', 3B' have been pushed one inside the other is supplemented by a rotational movement of the connecting arrangements 3A', 3B' to one another about the central axis or axis of symmetry 9.

This bayonet-type movement is preferably guided by the connecting arrangements 3A', 3B'. In particular, as can be seen for example, in the perspective representations of the first connecting arrangement 3A' in FIG. 26 and the second connecting arrangement 3B' in FIG. 30, corresponding guide devices or guides 18A, 18B are provided, which preferably guide the bayonet-type movement described above. In particular, the first connecting arrangement comprises a strip-like guide device or guide 18A, which preferably extends at least substantially in or along a plane perpendicular to the central axis or axis of symmetry 9. The guide device or guide 18 B of the second connecting arrangement 3B' is preferably of corresponding, preferably complementary construction. It may comprise a guide groove in which the corresponding guide device or guide 18A can be guided.

The guide devices or guides 18A, 18B may also be configured to pre-define an alignment about the central axis or axis of symmetry 9 as the connecting arrangements 3A', 3B' are brought towards each other. This alignment is preferably selected so that the opening regions 4A', 4B', which are oval, for example, in the embodiments shown, correspond to one another or are located in a similar orientation to one another.

The guide means or guides 18A, 18B are preferably configured to prevent rotation of the connecting arrangements 3A', 3B' about the central axis or axis of symmetry 9 by interlocking engagement while the connecting arrangements 3A', 3B' are being moved towards one another. As soon as the connecting arrangements 3A', 3B' have been inserted in one another, particularly thereby opening the opening region 4B' of the second connecting arrangement 3B', the guide devices 57A, 57B enable rotary movement of the connecting arrangements 3A', 3B' relative to one another about the common central axis or axis of symmetry 9. This rotation leads to the above-mentioned deformation of the mouth-like portion 5A' or holding portion 25 of the first connecting arrangement 3A' and consequently to the opening of the opening region 4A of the first connecting arrangement 3A, thus forming the fluidic connection 2.

The guide devices or guides 18A, 18B are preferably also embodied to block the relative position of the connecting arrangements 3A', 3B' in the axial direction, i.e., in the direction of the central axis or axis of symmetry 9, particularly by interlocking engagement, by or after rotation of the connecting arrangements 3A', 3B' relative to one another.

Alternatively, or additionally, securing means may be provided which prevent reverse rotation. This ensures that after the fluidic connection 2 has been produced the connecting arrangements 3A', 3B' cannot be moved apart again, particularly in order to guarantee the sterility of the fluidic connection 2.

In another aspect which may also be implemented independently, the invention relates to a container system B with two containers B1, B2, B3, B4 which are fluidically separated from one another in an initial state and are fluidically connectable to one another by a movement of the containers B1, B2, B3, B4 relative to one another, while in an initial state a securing device 52 blocks the, in particular, partially and/or initially axial movement of the containers B1, B2, B3, B4 or their connecting arrangements 3A', 3B' relative to one another.

Figure 35:
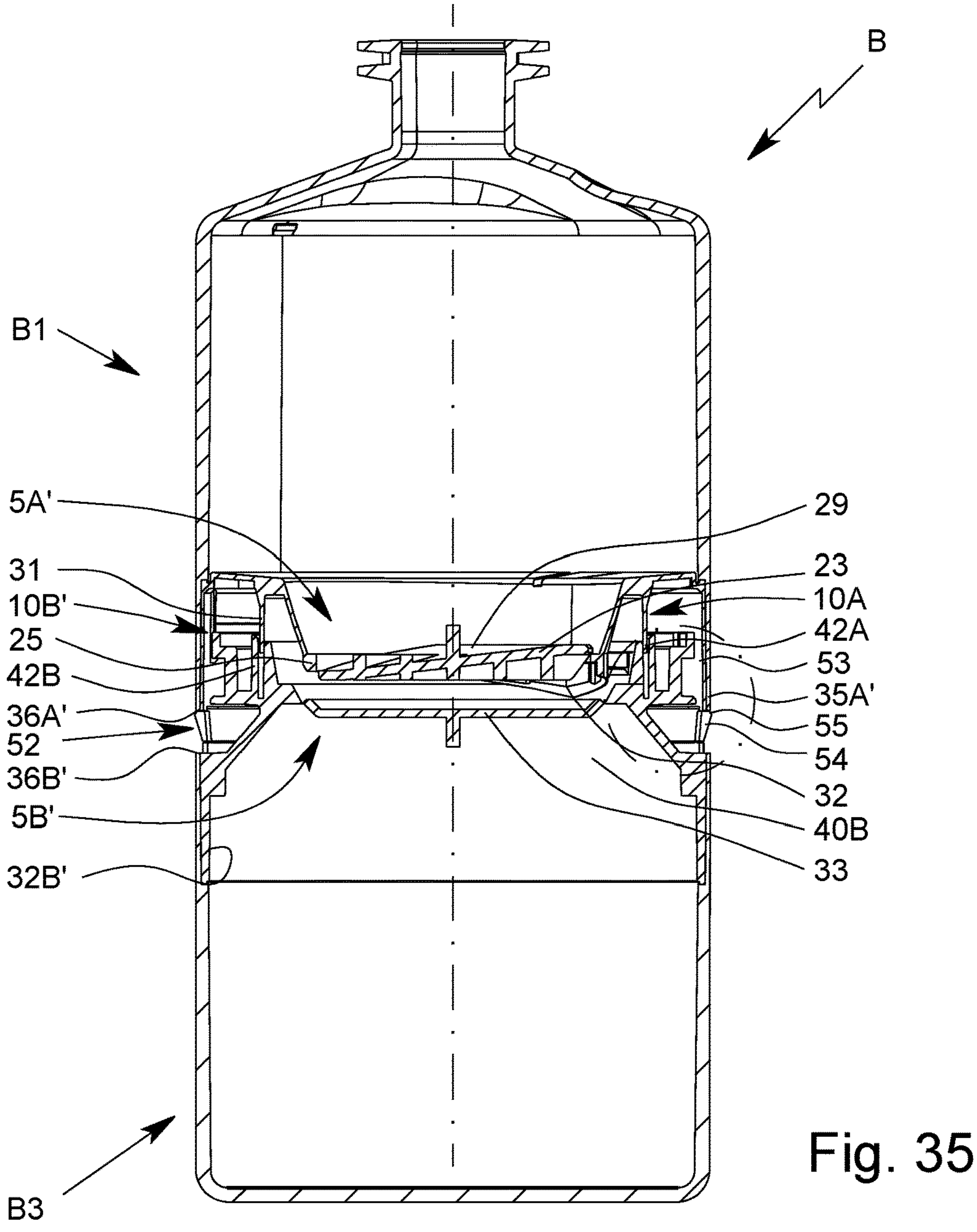
FIG. 35 shows a schematic longitudinal section through a container system with a proposed securing device in an initial position.

In the embodiment shown in FIG. 35 a first container B1 is shown by way of example with a further container B4 and a securing device 52. The further container B4 has only one possible access, in the embodiment shown, which is formed by the second opening device 4B'. However, other solutions are also possible, for example, using the containers B2, B3 described hereinbefore.

FIG. 35 shows the securing device 52 in the initial state, in which the containers B1, B4 are not connected to one another. In this initial state the securing device 52 prevents movement of the containers B1, B4 relative to one another, as required for opening or production of the connection between the containers B1, B4. In the present instance, the securing device 52 braces the containers B1, B4 against one another, thus preventing the containers from moving axially towards one another.

Figure 36:
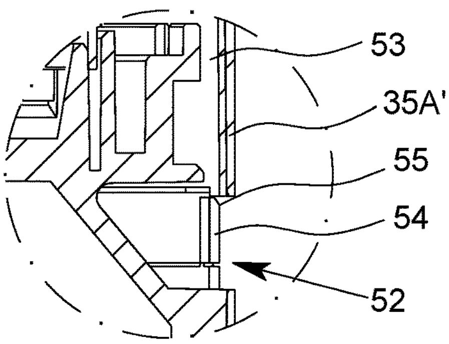
FIG. 36 shows a detail of a schematic longitudinal section through the container system according to FIG. 35 with the securing device actuated.

FIG. 36 shows a magnified detail from the embodiment according to FIG. 35, in which the securing device 52 is activated or actuated. In this state the containers B1, B4 are free to move relative to one another so that the fluidic connection 2 can be formed. For this it is particularly preferable for the opening regions 4A, 4B, 4A', 4B' to be opened on the basis of the connecting arrangement 3A, 3A', 3B, 3B' described hereinbefore by an initially axial or transitory and then rotary movement of the containers B1, B4 relative to one another.

Figure 37:
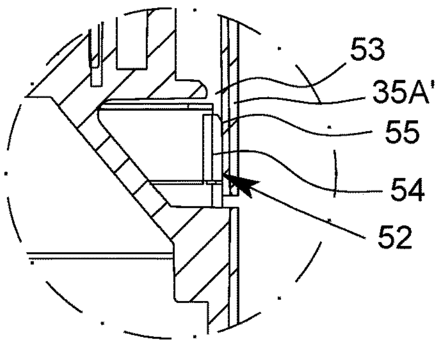
FIG. 37 shows a detail of a schematic longitudinal section through the container system according to FIG. 35 in a connecting position.

FIG. 37 shows magnified detail from the embodiment according to FIG. 35 in a state after the relative movement has taken place.

Figure 38:
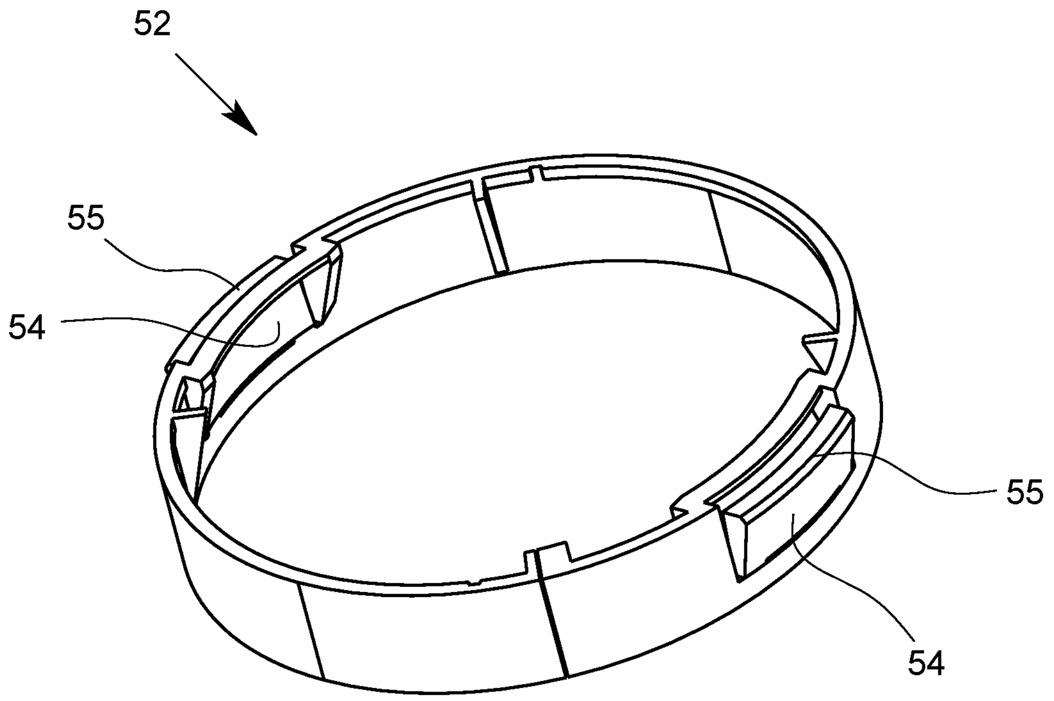
FIG. 38 shows a perspective view of the securing device from the embodiment according to FIG. 35 in the initial position.

FIG. 38 shows the securing device 52 in perspective view.

For the present aspect it is preferable if the containers B1, B4 can be connected to one another by means of the proposed connecting arrangements 3A', 3B'. In principle, however, other connecting methods may also be considered.

The container system B preferably comprises a receptacle 53, particularly a pocket, for the securing device 52, into which the securing device 52 can be received, particularly by pushing it in, as a result of or during the relative movement.

In the embodiment shown, in order to open the second connecting arrangement 3B', in particular, the connecting arrangements 3A', 3B' are moved axially relative to one another. This relative axial movement is prevented by the securing device 52 in an initial state and can be permitted by the securing device 52.

The receptacle 53 is preferably provided behind a wall 35A', 36A' of one of the containers B1, B4 and/or behind a collar-shaped and/or tubular portion 37A', 37B' of one of the connecting arrangements 3A', 3B', viewed from the outside. In the embodiment shown this wall is a wall of the container B1, which preferably forms a tubular or collar-like extension of a wall of the container B1 delimiting the inner chamber, more particularly is aligned therewith.

In the embodiment shown the receptacle 53 is formed between the wall 35A', 36A' or collar-like portion 37A, 37B and the mouth-like portion 5A', 5B' or opening region 4A', 4B' of the container B1. Alternatively, or additionally, however, this may also be the case with other containers B2, B3, B4.

The container system B is preferably configured so that, during or as a result of or after actuation, the securing device 52 can protrude into or be aligned with the receptacle 53 in the axial direction based on the central axis and/or axis of symmetry 9 of the container system B.

It is also preferable that the securing device 52 is arranged in the starting position between edges 36A', 36B' of the containers B1, B2, B3, B4 or connecting arrangements 3A', 3B', that are, in particular, opposite one another or correspond to one another, such that the edges 36A', 36B' are supported on one another by means of the securing device 52.

The securing device 52 is preferably at least partially deformable, as a result of which the relative movement can be allowed. In particular, it is provided that by actuation of the securing device 52 an interlocking engagement can be undone, so that the containers B1, B2, B3, B4 are no longer supported on one another, thus allowing relative movement to take place.

In the embodiment shown the securing device 52 is ring-like or annular, particularly formed by a ring, particularly a securing ring, or comprises one such, which is at least partially deformable or deformable in certain areas to release the connection. However, this is not essential and can also be achieved by some other method, although the use of a ring has advantages from the point of view of manufacturing and assembly.

The securing device 52 preferably comprises at least one, preferably flap-like or wing-like, blocking member 54 or is formed thereby. In a starting position the blocking member 54 blocks the movement of the connecting arrangements 3A', 3B' relative to one another by interlocking engagement. Moreover, the blocking member 54 is preferably deformable and/or depressible, so as to release the blockade and permit the relative movement.

In the embodiment shown the blocking member 54 or the blocking members 54 comprise(s) an edge 55 that forms the interlocking engagement and is movable, preferably deformable, at least substantially in the radial direction (with respect to or in the direction of the central axis or axis of symmetry 9) in order to release the blockade. In particular, the blocking member 54 is molded on at one end, formed in one piece with the securing device 52 and/or of wing-like configuration.

The receptacle 53 preferably corresponds to the shape of the securing device 52 or vice versa, and may thus comprise, or be formed by, a cavity or a pouch, which is particularly also ring-like or annular, in complementary manner to the securing device 52. This cavity or pouch preferably comprises an opening towards the securing device 52 or towards the connecting arrangement 3A', 3B' opposite the receptacle 53.

The securing device 52 is preferably formed of plastics, particularly a thermoplastic material. The securing device 52 may thus be a plastics ring. The blocking members 54 are preferably elastically deformable. Alternatively, release may also be effected by plastic deformation of the blocking members 54.

In the initial state the securing device 52 is preferably arranged between the containers B1, B2, B3, B4 in such a way that relative movement in the axial direction in relation to the central axis and/or axis of symmetry 9 of the container system B is blocked and by partial deformation of the securing device 52 radially in the direction of the central axis and/or axis of symmetry 9 of the container system B the relative movement can be freed up.

The securing device 52 preferably cannot be taken off and/or removed. Instead, the securing device 52 is received in the receptacle 53 during or after actuation and advantageously therefore does not result in a separate part that has to be disposed of separately, thus improving the handling and operational reliability.

In the embodiment shown the securing device 52 is rotatable, particularly mounted to be rotatable about the central axis and/or axis of symmetry 9. The securing device 52 is held on a tapered portion and/or by interlocking engagement on the container system B.

In another aspect which may also be implemented independently, the invention relates to a method of preparing a mixture of substances, particularly a vaccine, in which starting substances in the form of a first substance S1 and a second substance S2 are provided separately from one another in two fluidically connectable containers B1, B2, B3, B4 and the containers B1, B2, B3, B4 are fluidically connectable by movement relative to one another, preferably an axial relative movement with respect to a central axis and/or axis of symmetry of the container system B.

Preferably, during the process, the receptacle 53 is provided and the securing device 52 is arranged or formed between the containers B1, B2, B3, B4, blocking the movement of the containers B1, B2, B3, B4 relative to one another in the initial state. In the process the securing device 52 is actuated and the securing device 52 is pushed into the receptacle 53 as a result of the actuation and/or the relative movement.

In the embodiment shown the securing device 52 is arranged, by way of example, between the first container B1 and the fourth container B4. However, these may theoretically also be replaced by other types of container, particularly as described hereinbefore. Thus, during the formation of the receptacle 53, the securing device 52 can theoretically also be used in the first connecting position according to FIG. 32 in the same way as in the embodiment according to FIGS. 22 to 33.

FIG. 37 shows a magnified detail in the region of the securing device 52 and the receptacle 53, in which the relative movement has taken place. As a result, the securing device 52 or the blocking member 54 or the blocking members 54 have each been pushed partially or at least substantially into the receptacle 53. In particular, the edge 55 has been pushed into the receptacle 53. Preferably, this prevents the securing device 52 from entering into another interlocking engagement. In the embodiment shown the securing device 52 is arranged in the receptacle 53 between a tubular or apron-like extension of the wall 35A' of the first container B1 and the first connecting arrangement 3A'.

FIG. 38 shows a schematic perspective view of the proposed securing device 52 on its own. This Figure clearly shows the wing-like blocking members 54 which are formed in the manner of film hinges or are hinged to the securing device 52 by means of a film hinge-like connection. In the embodiment shown in FIG. 39 the pivot axis of the blocking member 54 is at least substantially in a plane formed by the securing device 52.

Figure 39:
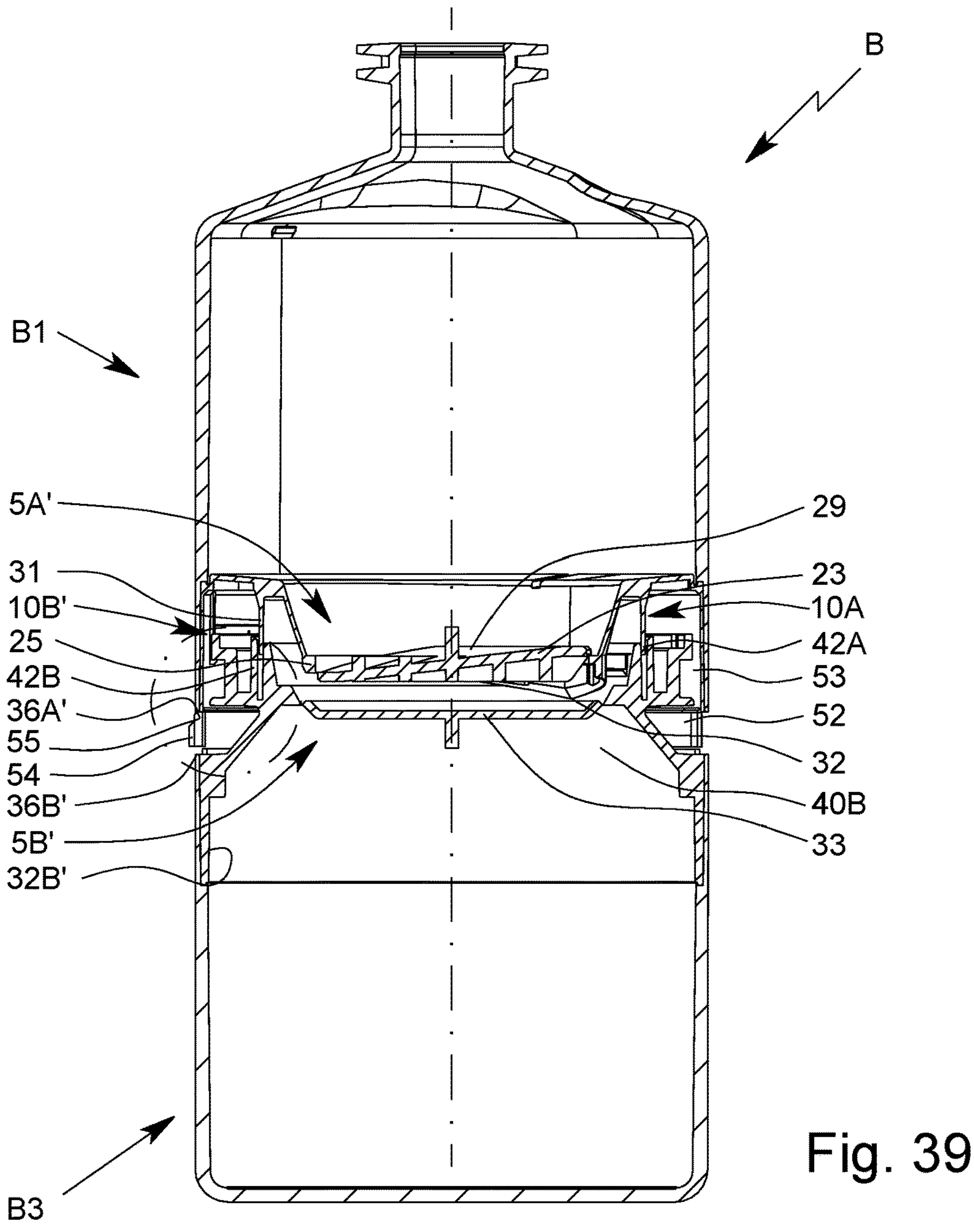
FIG. 39 shows a schematic longitudinal section through a container system with a proposed securing device according to a second embodiment in an initial position.

FIG. 39 shows the schematic section through a container system B with a securing device 52 according to a second embodiment. The second embodiment functionally resembles the first embodiment and therefore reference is made to the foregoing description relating to FIGS. 35 to 38 for further details. Therefore only the differences from the previous embodiment will be explained hereinafter.

FIG. 39 shows the container system B or the securing device 52 in a starting or blocking position. In this position, the blocking member 54 acts between the containers B1, B4, so that they are supported on one another and in this way prevent the relative movement.

Figure 40:
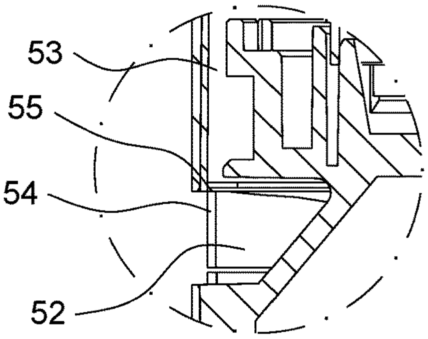
FIG. 40 shows a detail of a schematic longitudinal section through the container system according to FIG. 39 with the securing device actuated.

FIG. 40 shows the container system B with the securing device 52 actuated, while the relative movement is enabled. For this, the blocking member or members 54 are deformed or displaced such that they or the securing device 52 can be accommodated in the receptacle 53, particularly by pushing them into it.

Figure 41:
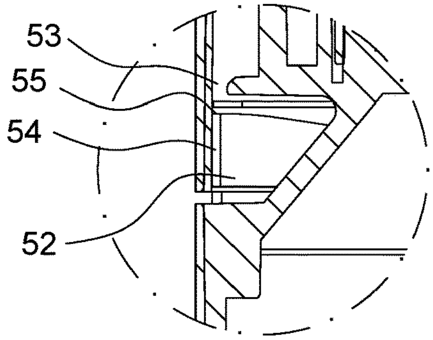
FIG. 41 shows a detail of a schematic longitudinal section through the container system according to FIG. 39 in a connecting position.

FIG. 41 shows the container system B during or after the relative movement or a part thereof, in the course of which, or as a result of which, the securing device 52 has been pushed into the receptacle 53.

Figure 42:
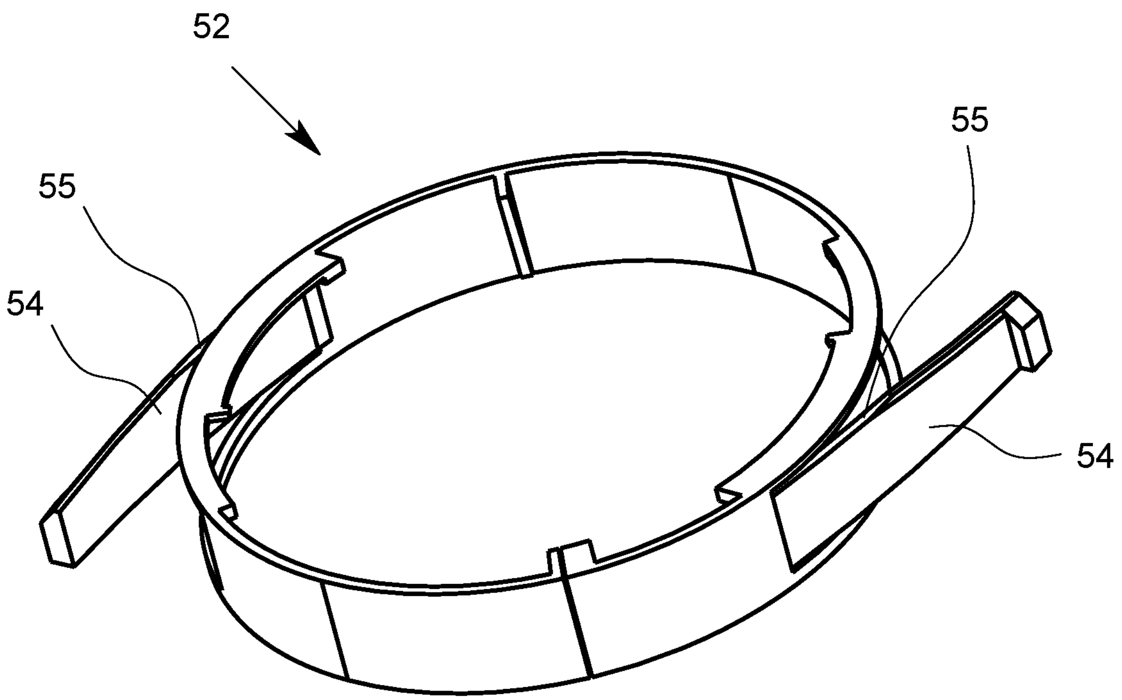
FIG. 42 shows a perspective view of the securing device from the embodiment according to FIG. 39 in the initial position.

FIG. 42 shows the securing device 52 of the second embodiment in perspective view on its own. One or more blocking members 54 are of wing-like configuration. The blocking members 54 in the initial state project at least substantially tangentially along a circumferential line of the securing device 52 or container B1, B4. In other words the blocking member 54 can be bent about one or more axes extending at least substantially parallel to the central axis or axis of symmetry 9 and/or can be deformed by winding it into a shape which corresponds to the shape of the receptacle 53 or permits the relative movement.

The objective in both embodiments is to achieve unlocking by forming the blocking member 54 into a shape and/or bringing it into a position in which the securing device 52 corresponds to the receptacle 53 and in which relative movement is made possible, so that the securing device 52 can be pushed into the receptacle 53 as a result of or during the relative movement.

In the embodiments according to FIG. 35 to 42 the securing device 52 is realized as a distinct part separately from the connecting arrangements 3A, 3A', 3B, 3B' and/or containers B1, B2. Hereby, the securing device 52 can be arranged between the connecting arrangement 3A, 3A', 3B, 3B' or the containers B1, B4 during assembly if required.

Alternatively, or additionally, it is possible that securing arrangement 52 is formed by the container B1, B4 and/or by the connecting arrangement 3A, 3A', 3B, 3B' or is connected to it in a fixed and/or permanent manner.

In this case, the receptacle 53 and the securing device 52, in particular the one or more blocking members 54, are provided at different containers B1, B4 or connecting arrangements 3A, 3A', 3B, 3B', preferably opposing one another. By this measure the securing device 52 and/or the one or more blocking elements 54 can be shifted into the receptacle 53 during or after activation of the securing device 52.

The securing device 52, in particular the one or more blocking members 54, can be connected to the container B1, B4 or the connecting arrangement 3A, 3A', 3B, 3B' by positive locking, frictional connection and/or bonding or can be formed integrally herewith. Particularly preferably the securing device 52 and/or the blocking members 54 are fitted, injected and/or formed in a common production step with the container B1, B4 or the connecting arrangement 3A, 3A', 3B, 3B', in particular by injection molding. However, it is possible that the securing device 52 is hold by snap fitting or by other measures at the container B1, B4 or the connecting arrangement 3A, 3A', 3B, 3B'.

The blocking members 54 preferably are held at the container B1, B4 and/or the connecting arrangement 3A, 3A', 3B, 3B' in a film hinge like manner. Alternatively, or additionally, the blocking members 54 can be configured and/or fixed deformably. This lunables operation of the blocking members 54 also without a separately realized securing device 52. Here, the blocking members 54 can be configured like depicted in FIGS. 38 and/or 42 or differently.

In another aspect which may also be implemented independently, the invention relates to the use of the connecting arrangements and/or containers for mixing viscous liquids, particularly vaccines, preferably with a dynamic viscosity at 23° C. and a shear rate of 1 $s^{-1}$ (particularly measured in the Brookfield viscometer RVT with spindle no. 4) of more than 1.5 or 2 Pa·s, preferably more than 4 Pa·s, particularly more than 6 Pa·s or 10 Pa·s, and/or less than 100 Pa·s, particularly less than 70 Pa·s, preferably less than 50 Pa·s, and/or in the range from 1 Pa·s to 100 Pa·s, particularly from 2 Pa·s to 70 Pa·s, preferably from 5 Pa·s to 50 Pa·s. The viscosities specified above within the scope of the present invention may be determined in particular by the method according to EN ISO 2884-1:2006. Viscous liquids in particular benefit from the large hydraulic minimum cross-section of the connection compared with the known solutions.

The aspects of the present invention can be combined with one another. In particular, aspects of the embodiments from FIGS. 1 to 20 may also be used accordingly in the embodiment according to FIGS. 21 to 37 and vice versa.

For example, the aspects relating to the sealing arrangement 39 and/or the support portion 46A, 46B may also be present in the cover device 6 from the embodiments in FIGS. 1 to 20. The cover devices 6, 25 may make it possible to obtain an, in particular, repeated or multi-stage sterile and/or sterilizable closure, while the aspects explained in connection with FIG. 17 can be combined with the aspects concerning the sealing arrangement 39, which were described in connection with FIGS. 22 to 34. Alternatively, or additionally, the aspects relating to the deformation-based opening as explained in connection with FIGS. 6 to 15 can be combined with aspects relating to the closure device 33 or vice versa. These examples make it clear that there are numerous preferred combinations of aspects which may form the subject of the present invention even if the combination is not expressly described.

What is claimed is:

1. A container system, comprising:

two containers, the container system having an initial state in which the two containers are fluidically separated from one another and a connected state in which the two containers have been fluidically connected together by a relative movement of the containers, a securing device which prevents said relative movement of the containers in said initial state, a receptacle in which the securing device can be accommodated for enabling said relative movement, wherein the securing device is formed by a securing ring and the receptacle is annular, the securing ring being partially or predominantly accommodatable in the receptacle, and wherein the securing device comprises at least one blocking member which is adapted for blocking said relative movement by interlocking engagement and is deformable or depressible in order to release the blocking member so as to allow said relative movement.

2. The container system according to claim 1, wherein the receptacle is pocket-shaped.

3. The container system according to claim 1, wherein the securing device extends into or is aligned with the receptacle in an axial direction or along an axis of symmetry or a central axis of the container system.

4. The container system according to claim 1, wherein the receptacle is formed by and/or behind a wall or a wall-shaped, collar-shaped or tube-shaped section of a connecting arrangement or an extension of one of the containers.

5. The container system according to claim 1, wherein, for connecting the containers, the securing device is arranged between end edges of the containers with the edges of the containers supported on one another via the securing device, and held by an interlocking arrangement.

6. The container system according to claim 5, wherein the interlocking engagement is releasable by actuation of the securing device for allowing said relative movement.

7. The container system according to claim 1, wherein the securing device is deformable at least in parts for enabling said relative movement of the containers.

8. The container system according to claim 1, wherein the securing device is adapted to block linear or axial movement of the containers relative to one another in said initial state.

9. The container system according to claim 1, wherein the securing device is adapted for blocking only a linear or axial movement of the containers relative to one another in said initial state.

10. The container system according to claim 1, wherein the blocking member comprises an edge or end face which forms the interlocking engagement and is radially movable to effect the release.

11. The container system according to claim 1, wherein the blocking member is molded on at one end or formed in one piece with the securing device.

12. The container system according to claim 1, wherein the blocking member is of a wing-shaped configuration.

13. The container system according to claim 1, wherein the receptacle and the securing device have complementary shapes.

14. The container system according to claim 1, wherein the securing device is formed of a plastic material.

15. The container system according to claim 1, wherein the securing device is arranged between the containers in the initial state such that the relative movement is blocked in an axial direction in relation to or along a central axis or axis of symmetry of the containers, and wherein the axial relative movement is producible by partial deformation of the securing device radially in a direction of the central axis or axis of symmetry of the containers.

16. The container system according to claim 1, wherein the securing device is held on the container system permanently or non-releasably or such that it cannot be taken off or removed or rotated or is held on a tapered portion or by interlocking engagement.

17. Method for preparing a mixture of substances, comprising:

providing substances to be mixed separately from one another in a respective one of two containers that can be fluidically connected to one another, placing the containers in a connecting orientation with a securing device arranged between the containers in a manner preventing a relative connecting movement between the containers, wherein the securing device is formed by a securing ring comprising at least one blocking member which blocks said relative connecting movement by interlocking engagement and is deformable or depressible in order to release the blocking member so as to allow said relative connecting movement, and releasing the securing device by depressing or deforming said blocking member, and pushing the securing device into a provided annular receptacle for enabling the containers to be fluidically connected to one another by said relative connecting movement between the containers.

* * * * *